United States Patent

Hakemi

[11] Patent Number: 5,843,333
[45] Date of Patent: Dec. 1, 1998

[54] METALLO ORGANO LIQUID CRYSTALS IN A POLYMER MATRIX

[75] Inventor: Hussan Ali Hakemi, Lissone, Italy

[73] Assignee: Sniaricerche S.c.p.A, Pisticci Scalo, Italy

[21] Appl. No.: 392,823

[22] PCT Filed: Jun. 29, 1994

[86] PCT No.: PCT/EP94/02147

§ 371 Date: Jun. 12, 1995

§ 102(e) Date: Jun. 12, 1995

[87] PCT Pub. No.: WO95/01410

PCT Pub. Date: Jan. 12, 1995

[30] Foreign Application Priority Data

Jun. 30, 1993 [IT] Italy ............................ MI93 A 001400

[51] Int. Cl.⁶ .......................... C09K 19/00; G02F 1/1333
[52] U.S. Cl. ............................. 252/299.5; 252/299.01; 349/92; 428/1
[58] Field of Search ................... 252/299.01, 299.2, 252/299.5; 428/1; 349/92

[56] References Cited

U.S. PATENT DOCUMENTS

| | | | |
|---|---|---|---|
| 4,728,547 | 3/1988 | Vaz et al. | 428/1 |
| 4,970,021 | 11/1990 | Nakatsuka et al. | 252/299.01 |
| 5,087,387 | 2/1992 | Mullen et al. | 252/299.5 |
| 5,124,183 | 6/1992 | Nakano et al. | 428/1 |

OTHER PUBLICATIONS

CAPLUS 1992: 561412, 1992.

*Primary Examiner*—Shean C. Wu
*Attorney, Agent, or Firm*—Popovich & Wiles, P.A.

[57] ABSTRACT

Polymeric dispersed liquid crystal composites containing a polymeric continuous phase and a discontinuous phase comprising a metallo organic mesogen. Also included are electro-optical films of such compositions and electro-optical devices containing such compositions. The continuous phase is a thermosetting or thermoplastic polymeric composition. The discontinuous phase may also contain non-metal containing liquid crystals that are compatible with the metallo organic mesogen.

74 Claims, 2 Drawing Sheets

METALLO ORGANO LIQUID CRYSTALS IN A POLYMER MATRIX

BRIEF DESCRIPTION OF THE INVENTION

This application is 371 of PCT/EP94/02147, on Jun. 29, 1994. A composite of one or more metallo organo moieties as part of a liquid crystal phase that is uniformly and discretely dispersed in a polymer matrix, processes for making the composite, and liquid crystal devices containing the liquid crystal mixture, and the composite.

BACKGROUND TO THE INVENTION

The nature of liquid crystal materials may be summarized as follows. The three common states of matter are the solid, liquid, and gas states in which the randomness of geometrical arrangement of the molecules increases from the solid to the liquid to the gas. The gas and the ordinary liquid are both isotropic, having the same physical properties in all directions. Most solids are found to be crystalline; that is, their molecular units are arranged in a regular repeating geometrical pattern of lattice units and consequently are frequently anisotropic in that their physical properties vary depending upon the direction of measurement with respect to different crystal axes. Certain organic solid compounds exhibit a peculiar behavior such that upon melting a turbid melt results that changes abruptly to clear isotropic liquid upon heating to a higher temperature. In this temperature range, these compounds are anisotropic with respect to all physical properties, as well as transmission of light. Thus, the characteristics of these compounds are partly those of the isotropic liquid since they exhibit liquid flow and partly those of the anisotropic solid. Therefore, these materials are often called "liquid crystals" or, more accurately, "crystalline liquids" and are sometimes classified as a fourth state of matter referred to as the mesomorphic state or mesophase, being a state or phase intermediate that of the anisotropic crystal and that of the isotropic liquid. All liquid crystals have two indices of refraction: an extraordinary index of refraction $n_e$ measured along the long axis of the liquid crystals, and a smaller ordinary index of refraction $n_o$ measured in a plane perpendicular to the long axis. The long axis of the liquid crystal defines its optic axis. There are essentially two major classes of liquid crystals, the "nematic" state and the "smectic" state. The nematic liquid crystal materials generally consist of rod-shaped molecules that tend to align parallel to a common direction resulting in anisotropy for many of the bulk properties.

When the liquid crystal alignment is "homeotropic" (perpendicular to, e.g., a supporting glass surface), a sample of the liquid crystal is optically clear (pseudo-isotropic). However, when a critical voltage is applied (typically 2 to 20 volts per mil) to the liquid crystal film, a critical current flow disrupts the uniform alignment causing scattering or refraction of incident light, termed "dynamic scattering." Dynamic scattering is one casee where the dielectric anisotropy of liquid crystals is negative ($A^{31}<0$). With "twisted nematic," with $A^{31}>0$, which is mostly used in liquid crystal display technology, the original alignment is homogeneous (parallel to the substrate surface) and is scattering in field-off and clear in field-on states. As a consequence of this scattering, the light intensity transmitted through the liquid crystal cell decreases. The smectic state is a more highly ordered state than the nematic state. The smectic state does not exhibit dynamic scattering in response to an electric field. Smectic materials of appropriate chemical structure exhibit a very low crystal-to-mesomorphic transition temperature and often may exist in a mesomorphic state at room temperatures. However, mixtures of smectic and nematic materials may be produced which are effective in dynamic scattering at room temperatures. Further, mixtures of crystalline liquids, such as cholestric liquid crystals and the like, can be used for purposes of tint or coloration. An ordinary nematic liquid crystal or smectic C phase can be converted to a cholesteric by adding an optically active compound.

The compositing of liquid crystals in a polymer matrix is well known in the art. An early development in the use of such composites is described by Elliot in French Patent 2,139,537. He used polymers as binders for liquid crystals by emulsifying the liquid crystals in a polymer and casting the composite into films. Elliot states: "it is advantageous to select a liquid crystal substance which has a refraction index similar to that of the film substrate and the binder, to avoid undesirable light diffusion effects from the emulsion film." He notes that "most organic compounds of this type have a similar refraction index to that of numerous substances among the polymers which could be used for the film or for the binder (i.e. about 1.5)." That technology was adopted by Fergason and called nematic curvilinearly aligned phases ("NCAP") liquid crystal by Fergason, see Fergason, et al., U.S. Pat. No. 4,789,858.

Churchill, et al., U.S. Pat. No. 3,578,844, amplifies the type of polymers that are employable in NCAP-type structures. They point out that "various natural and synthetic polymeric materials can be employed to constitute the polymeric matrix, layer, sheet, film or coating in and/or upon which the encapsulated cholesteric liquid crystal material is located. Any transparent or substantially transparent polymeric material with adequate electrical insulation properties and capable of positioning and adhering the encapsulated liquid crystals, e.g., to the first and second electrodes, can be used. Suitable polymeric materials for this purpose include, but are not limited to, the following: acrylates and polyalkyl acrylates polyvinyl alcohol, gelatin, latex (natural rubber and synthetic rubber latexes), zein, polyethylene homo- and copolymers, polypropylene homo- and copolymers, etc.

Churchill expanded the emulsion system by an apparently neat addition of an encapsulated system in a thermoplastic polymer, characterized in the following terms:

> Alternately, the encapsulated liquid crystal can be spray dried and then mixed with a thermoplastic material before deposition of a composite film by draining or casting. Uniform distribution of the liquid crystal capsules can be secured by stirring the matrix polymer well before application or by other conventional mixing and distribution techniques. For such procedures, homopolymeric or copolymeric monoolefins (for example polyethylene, polypropylene, ethylene-propylene copolymers, and ethylene-propylene terpolymers with conjugated or nonconjugated $C_4$ to $C_6$ diene comonomers, can also be used). One satisfactory thermoplastic film matrix is "Lucite," which is a polymethyl methacrylate. Other conventional procedures for incorporating the capsules into the polymer matrix will be apparent to those skilled in the art.

Churchill, et al., U.S. Pat. No 3,816,786 points out that "[S]ince an extremely small droplet size of cholesteric liquid crystal material can be maintained in an emulsion, coatings of films prepared therefrom allow a good optical resolution and have a smooth surface(s)."

Another process for making composites of liquid crystals in polymers is called polymer dispersed liquid crystals (PDLC). It involves a number of phase separation processes like emulsification for making uniform liquid crystal droplets in a polymer binder. They include:

[1] Phase Separation By Polymerization (PIPS)

Phase separation by polymerization is useful when prepolymer materials are miscible with low molecular weight liquid crystal compounds. A homogeneous solution is made by mixing the prepolymer with the liquid crystal. Polymerization is achieved through a condensation reaction, as with epoxy resins, through free radical polymerization, as with a vinyl monomer catalyzed with a free radical initiator such as a benzoylperoxide, or through a photo-initiated polymerization. The solubility of the liquid crystal decreases in the lengthening polymers until the liquid crystal phase separates, forming droplets. The droplets isolated from each other and form a discontinuous phase within the polymer phase. The polymer phase is a continuous phase. The droplets grow until gelation of the polymer locks in the droplet morphology. According to *Doane* et al., "Polymer Dispersed Liquid Crystals for Display Application," Mol. Cryst. Liq. Cryst. 1988, vol. 165, pp. 511–532, 512, droplet size and morphology are determined during the time between droplet nucleation and gelation of the polymer. Size is controlled by the rate of polymerization, the relative concentrations of materials, the types of liquid crystal and polymers used, and by such physical parameters as viscosity, rate of diffusion, and solubility of the liquid crystal in the polymer. The rate of polymerization is controlled by cure temperature for thermally cured polymers or by light intensity for photochemical polymerization. During the phase separation, a portion of the liquid crystal is retained in the polymeric continuous phase and acts as a plasticizer of the polymer.

[2] Phase Separation By Thermal Processes (TIPS)

This process is useful for thermoplastics which melt below their decomposition temperature. A binary mixture of polymer and liquid crystal forms a solution at elevated temperature. Cooling the solution causes phase separation The droplet size of the occluded material is governed by the rate of cooling and depends upon a number of material parameters, which include viscosity, chemical potentials, etc. As with the previous process, the liquid crystal droplets form a discontinuous phase and the polymer, the thermoplastic, forms a continuous phase. Also, some of the liquid crystal dissolves in the polymer and acts as a plasticizer.

[3] Phase Separation By Solvent Evaporation (SIPS)

This is useful with thermoplastics which melt above the decomposition temperature of the thermoplastic or the liquid crystal, or where solvent coating techniques are used. The liquid crystal and polymer are dissolved in a common solvent forming a solution. The solvent is then removed by evaporation, resulting in phase separation and polymer solidification. In this case as with the others, the liquid crystal droplets form a discontinuous phase and the polymer forms a continuous phase.

Phase separation techniques are described by Taylor, U.S. Pat. No. 3,935,337, who discloses the preparation of a liquid-crystal containing structure by incorporating a liquid crystal substance into a polymeric matrix so as to form a thin, layer-like structure of controlled thickness. Taylor states that the liquid-crystal substance may be incorporated into the polymeric matrix by mixing liquid crystals with a polymerizable monomer or prepolymer followed by polymerization, using a polymer (or polymerizable monomer) as the medium (solvent) in which liquid-crystal synthesis is carried out. In the latter, the monomer medium, if it is a solvent, would, of course, be expected to dissolve the liquid crystal. Taylor's approaches includes dissolving or dispersing the liquid crystal forming material in a polymer solution or molten polymer, then fabricating the polymer by a suitable technique (solution casting, molding, extrusion, etc.). Following solvent evaporation and/or cooling of molten polymer, the polymer acts as a binder and protective matrix for the liquid crystals.

Taylor includes a method of incorporation of liquid crystals into polymer matrices that involves the preparation of a mixture of the liquid crystal and a polymerizable monomer or prepolymer, followed by polymerization. This technique permits "embedment" of liquid crystals in matrices of thermosetting plastics, including phenol-formaldehyde resins; urea-formaldehyde resins; melamine-formaldehyde resins; epoxy resins; polyurethanes; unsaturated polyesters; thermosetting acrylic resins.

Refinements to this technology are set forth in U.S. Pat. Nos. 4,671,618; 4,673,255; 4,685,771; 4,688,900; 4,890, 902; 4,994,204; 5,004,323; 5,087,387; 5,093,471; and 5,093,735.

The prime function of these technologies is to create a matrix system in which the liquid crystals are discretely and uniformly dispersed and where the matrix does not interfere with the function of the liquid crystals. In each of the above procedures, the structural relationship of the liquid crystal droplets to the polymer is, in essential respects, the same.

Schmidt, U.S. Pat. No. 4,425,030 effects a liquid crystal display by encapsulating the liquid crystal with a layer formed of poly-para-xylylene, 2-chloro-poly-para-xylylene or 2,2'-dichlor-poly-para-xylylene. The encapsulation is produced in accordance with this parylene method at a deposition rate $\geq 10 Å/sec$.

U.S. Pat. No. 5,087,387 achieves a light modulating material of a liquid crystal phase formed within an hydroxy-functional acrylic resin matrix provided with titanates, zirconates and mixtures of them, and a cross-linking agent such as diisocyanates for reacting with the hydroxy-functional acrylic resin to form a urethane acrylic copolymer that undergoes cure over a period of days. The patent indicates that the light modulating material is capable of reversibly switching between a substantially translucent state and a substantially transparent state when subjected to an electric or magnetic field. The titanates and zirconates are thought to become part of the polymer matrix during phase separation.

The titanates and zirconates described are not liquid crystal forming materials. In addition, all of the examples in the patent provide for the separate addition of liquid crystals. According to the patent, at col. 7, lines 31–37, the titanates and zirconates are "added to the initial solution to reduce the time required to orient the liquid crystal phase, normally by an order of magnitude such as from about 250 milliseconds to about 10 milliseconds or less." In other word, the titanates and zirconates reduce the turn-on time of the liquid crystal phase. As an alternative, the patentee says they "reduce the voltage required to achieve substantial transparency."

U.S. Pat. No. 4,066,569 describes adding dopants formulated from mixtures of metallocenes and cyano-organic compounds to nematic liquid crystals, nematic liquid crystal mixtures, and cholesteric-nematic liquid crystal mixtures. Metallocenes found to be useful were ferrocenes. Ruthenocenes may also be useful. Conjugated cyano-organic compounds found to be useful were 7,7'8,8'-tetracyanoquinodimethane and (2,4,7,-trinitro-9-fluorenylidene) -malononitrile. The advantages cited are an alteration of the electrochemical characteristics of the liquid crystals by increasing their lifetime, increasing the dynamic scattering efficiency of the liquid crystals, lowering the threshold voltage of the liquid crystals and improving the response characteristics of the liquid crystals.

Saito, et al., Calif., 105: 216811z describes a benzene-dithiol metal complex of the formula:

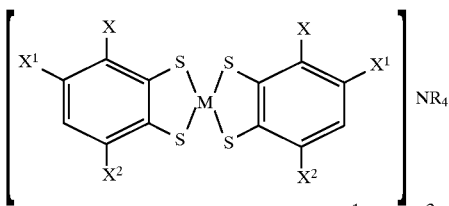

where M is Ni, Pd or Pt, X is Cl or Br, $X^1$ and $X^2$ are H or Cl when X is Cl and H or Br when X is Br, and R is alkyl. The complex is useful in heat-mode laser addressed display using IR. It shows quick response to a laser beam. It is mixed with conventional non-metallic containing liquid crystals. A composition containing EN-24 (nematic liquid crystal) 42.5%, N-24 (nematic liquid crystal) 42.5%, cholesteryl chloride 10%, and compound I. (X–X2 =Cl; R=Bu; M=Ni) 5%, was used to prepare a display device. Using a semiconductor laser, the writing speed was 10 ms/dot vs. 30 ms/dot with a composition without I.

Two survey articles have been published recently about metallomesogens: Giroud-Godquin and Maitlis, "Metal-lomesogens: Metal Complexes in Organized Fluid Phases," *Angew. Chem. Int. Ed. Engl.* 30 (1991) pages 375–402, and Bruce, "Metal-containing Liquid Crystals," *Inorganic Material*, Bruce and O'Hare, Ed., (1992) John Wiley & Sons, Ltd., Baffins Lane, Chichester, West Sussex PO19 1UD, England. The disclosures of these articles are incorporated by reference.

OBJECTIVES OF THE INVENTION

The objective of this invention is to improve electrooptical properties of liquid crystal-polymer composites in which a select class of liquid crystals are in the discontinuous phase. An objective of this invention is to improve the chemical, physical, optical, electrical and morphological properties of the liquid crystal droplets and/or the polymer matrix of a liquid crystal-polymer composite where the liquid crystal is in a discontinuous phase and the polymer is in the continuous phase. The improvement in such properties serves to reduce the applied switching voltages and times by virtue of control of the resistivity/conductivity of the liquid crystal and the polymer, and control of the dielectric constants of the liquid crystal and the polymer.

Another objective of this invention is to improve the refractive indices (index matching) of the liquid crystal in the droplets and the polymer matrix to reduce the residual angular scattering (haze). This is accomplished through modification of the $n_o$, $n_e$, and birefringence of the liquid crystal component and through modification of the refractive index of the polymer matrix.

A further objective is a stable colored polymer dispersed liquid crystal film as a substitute for unstable existing pleochroic dyes.

An additional objective involve improvements in the operating temperatures of polymer dispersed liquid crystal films by modification of their nematic-isotropic transition temperatures.

An adjunctive objective is the control of the kinetics of phase separation and resin curing to improve the contrast ratio (transparency/opacity) of polymer dispersed liquid crystal films by controlling (i) the solubility of liquid crystal in the resin, (ii) the rate of droplet formation, (iii) controlling the rate of polymer solidification, and (iv) controlling the liquid crystal droplet morphology (size, density).

Last, but not least, it is the objective of the invention to improve the electrooptical performances of polymer dispersed liquid crystal films by frequency variations through frequency modulated resistivity changes in polymer dispersed liquid crystals.

Another object of the invention is polymer dispersed liquid crystal films that contain metallomesogen that provide the advantages of the above objectives and find application in internal and external privacy panels/windows for building in general, such as offices, hospitals, banks, restaurants and homes; solar control windows, such as skylights, slope glazing, and the like, for office and residential buildings; light/energy control shutters for external and internal uses; privacy and light control windows in transportation vehicles, such as airplanes, automobiles, trucks and ships; dynamic road, street, station, sporting event and airport signs, as well as advertising billboards; large and small low- and high-definition displays, such as billboards, television and advertising, and the like.

THE INVENTION

The invention encompasses the use of metallomesogens, especially metallo organo mesogens ("MOM" or metallo organo liquid crystal) in liquid crystal devices, especially electro-optical (inclusive of display) devices. Novel compositions are described of a metallo organo liquid crystal-polymer composite in which the liquid crystal is present as a dispersed discontinuous phase and the polymer is the continuous phase of the composite. Additionally, this invention relates to devices containing non-metal containing liquid crystal as part of composites in which MOMs are discretely and uniformly dispersed in a polymer matrix.

In one aspect of this invention, a composite structure, suitable for any liquid crystal device, is formed containing discontinuous and continuous phases wherein the discontinuous phase is liquid crystal that is wholly or partially MOM and the continuous phase is an organo thermoset or thermoplastic polymer matrix. The MOM may be randomly distributed in the discontinuous phase when mixed with another, but non-metallic, liquid crystal. To the extent that MOM exists in the continuous phase, it may be randomly distributed in the continuous phase. However, it is preferred to have the metallo organo liquid crystal compound uniformly distributed in the discontinuous phase. In a preferred embodiment of the invention, the liquid crystal discontinuous phase is a compatible mixture of a major amount of a non-metallo organic liquid crystal and a minor amount of a metallo organic liquid crystal, preferably an eutectic mixture of the liquid crystals such as eutectic mixtures of the MOMs, MOMs and conventional liquid crystals (non-metal containing), or conventional liquid crystals in which the MOM(s) does not contribute to the eutectic melting point.

The objectives of this invention are achieved by modifying liquid crystal-polymer composites to include one or more metallo organo compounds as part of the liquid crystal phase that is uniformly and discretely dispersed in the polymer matrix. The invention relates as well to processes for making the composite and liquid crystal devices containing the composites and processes for using the devices. The devices of the invention as defined by the objectives, contemplate structures already in the art with the substitution of the composite composition of the invention.

The metallo organo compounds are liquid crystal materials that represent at least a portion of the liquid crystal discontinuous phase of the composite. To the extent that the metallo organo compound is part of a liquid crystal discontinuous phase, it is at least compatible with the remaining portion of the liquid crystals in the discontinuous phase to the extent that its presence contributes to the properties of the whole of the discontinuous phase. The metallo organo compound's compatibility may range from forming solutions to fine dispersions with the remaining liquid crystal components of the continuous phase.

The metallo organo liquid crystal material may comprise, as noted, all or part of the liquid crystal phase of the composite. Preferably, the amount of the metallo organo liquid crystal in the discontinuous phase may range from about 0.1 to about 100 weight percent of the weight of the discontinuous phase, and the remainder is the other liquid crystal(s). When the metallo organo liquid crystal is part of the discontinuous phase, then it may be present in the discontinuous phase in an amount ranging from about 0.01 to about 99.99 weight percent of the weight of the discontinuous phase and the remaining liquid crystal may range from about 99.99 to about 0.01 weight percent of the weight of discontinuous phase. Preferably, in the case of such mixtures, the metallo organo liquid crystal comprises from about 0.05 to about 50 weigh percent of the weight of the discontinuous phase and the remaining liquid crystal (non-metal containing) may range from about 50 to about 99.95 weight percent of the weight of the discontinuous phase. Most preferably the weight ratio of the two types of liquid crystals are about 0.1 to about 30 weight percent. The remaining liquid crystal may be any of those known in the art other than metallo organo liquid crystals provided that they possess the requisite compatability with the metallo organo liquid crystal and have the crystalline form desired for the device. The MOMs may contain nematic, smectic, cholesteric and discotic phases. Cholesteric forms (or chiral nematics) of MOMs may be combined with nematic MOMs to combine the color effects of each to achieve another color form. The presence of the light absorption qualities of metal and the reflective attributes in the visible range of cholesteric "pitch" provides the possibility to modify or vary the color of the polymer dispersed liquid crystal film.

The metallo organo liquid crystal compounds, commonly referred to as organometallic liquid crystal compounds, comprises a metal moiety such as those from Groups 5–11 of the Periodic Table of Elements, new notation, published by the CRC Handbook of Chemistry and Physics, 67th Edition, CRC Press, Inc., 1986. The metals included are vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, the lanthanides, or uranium, and the like.

The choice of organometallic liquid crystal compound in practicing the invention includes an array of materials known in the art. Bruce, supra, describes the chemical nature of thermotropic mesogens at pages 415–417, and that disclosure is incorporated herein by reference. For example, organometallic liquid crystal compounds are usually polycyclic containing structures, typically containing one or more aromatic groups and a metallic moiety covalently-, ionically-, coordination complex-bonded (such as $\pi$-complexes) therewith. Heterocyclic structures containing unsaturation are considered aromatics. The aromatic structures may be part of a fused ring, and are typically interbonded to another aromatic structure or to an alicyclic structure, e.g., cycloalkyl, bicycloalkyl, and cubane, through one or more of a covalent bond, polyfunctional organic groups such as alkylene, alkenylene, alkylidene, alkenylidene, alkylidyne, alkynylidene, alkynylene, carbonyloxy ester, carbonylimino, azomethine, and the like, and inorgano polyfunctional groups such as amino, azino, azo, azoxy, diazoamino, sulfide, disulfide, polysulfide, ether (oxy), keto, diketo, and the like. The selection of the organometallic liquid crystal compound is not narrowly critical.

It has been found that many of the organometallic liquid crystal composition contribute color to the discontinuous liquid crystal phase. That color is stable and functions as a substitute for unstable existing pleochroic dyes.

The composites of this invention are thermally, electrically, magnetically and/or electromagnetically addressable so that in a device, it may be reversibly switched between a light scattering mode and a light transmissive mode. This is all effected with advantages of modified response times and voltages, dielectric constants, resistivity and index matching of both continuous and discontinuous phases. As with conventional PDLC and NCAP composites, the composite of the invention is (i) optically responsive to strain, whereby under tension it acts as a polarizer that transmits one component of plane polarized light while scattering the other component and (ii) when cured in the presence of an electric or magnetic field, it acts as an electrically addressable polarizer.

Films made from the composites of the invention can be sandwiched between conducting plastic films, glasses, as well as a layer of film and a layer of glass, to form continuous sheets. They are highly scattering in the OFF state and window-glass dear in the ON state. They do not require surface alignment layers, polarizers or cell seals. They are durable and aesthetically pleasing.

The discontinuous phase of the composite comprises micron-size droplets of the liquid crystal comprising the organometallic liquid crystal alone or in combination with at least one other liquid crystal. The continuous phase is the polymer which may contain other formulated ingredients, such as plasticizers, colorants, hardeners, catalysts, and the like. It is a binder for the discontinuous phase. The continuous phase may contain dissolved conventional liquid crystal and MOM, to the extent any is extracted from the discontinuous phase into the continuous phase. The other liquid crystal may be any of the conventional ones in the art so long as there is present a compatible organometallic liquid crystal component. Overall, the other liquid crystals are monomeric, and to that extent, they have a relatively low molecular weight. The composite comprises from about 30 to about 70 weight percent discontinuous phase with the remainder being the continuous phase. The liquid crystal may be nematogenic, smectogenic or cholesterogenic. Nematic liquid crystals are preferred.

The standard size of the droplets (such as nematic liquid crystal droplets) in the composite is usually on the order of the UV-visible-NIR/HIR range, about 200–1000 nanometers in diameter. In the preferred practice of the invention, the size of the nematic droplets are controlled to a predetermined size, from as low as 0.1 $\mu$m to as high as 10 $\mu$m. Because of the characteristics of the metallo organic liquid crystal, control of the particle size of the droplet allows improvement of the refractive indices (index matching) of the liquid crystal in the droplets and the polymer matrix to reduce the residual angular scattering (haze). This is accomplished through modification of the $n_o$, $n_e$ and birefringence of the liquid crystal component and through modification of the refractive index of the polymer matrix. Index matching may be verified by direct measurement of the refractive index of the polymer dispersed liquid crystal composite in the on-state and compare it with the refractive index of the $n_o$ of the liquid crystals of the discontinuous phase and $n_p$ fo the polymer (before and after curing). A simple technique for index matching is by a "finger-print" type electrooptic evaluation. This involves comparing the behavior of transmittance-angle curves of the polymer dispersed liquid crystals as illustrated in FIG. 1 hereof. Although catalysts and hardeners can contribute to the cure rate, and thus to the droplet size of the discontinuous phase, size distribution and number density, the morphology may be controlled (depending on method of curing and phase separation) through the selection of curing time, temperature, UV radiation intensity, solvent evaporation rate, rate of cooling, and/or a combination of them, depending on the mechanism of cure, when a cured resin is the polymer of choice.

Index matching is controlled by the choice of the initial liquid crystal and polymer selections from their respective refractive indices. Birefringence is inherent in liquid crystals, but the polymer is isotropic with one value of refractive index, $n_p$. In the art of making polymer dispersed liquid crystals, the $n_p$ of the polymer should be equal to that of $n_o$ of the liquid crystal. After curing, the $n_p$ is changed (generally mostly increased) by the presence of plasticizing liquid crystal dissolved in the polymer continuous phase, and the birefringence of the liquid crystal discontinuous phase is altered by migration into it of low molecular weight components derived from the polymer component of the continuous phase. In such circumstances, MOMs with their own $n_o$ and $n_e$ have the capacity of contributing their unique properties thus contributing to the refractive indices of the liquid crystal discontinuous phase and even to the refractive index of the matrix continuous phase The increase of transmission at larger angles is a result of (a) increase of the $n_p$ of the matrix, (b) decrease of $n_o$ and $n_e$ of the liquid crystal, or (c) both.

One advantage of the use of organometallic liquid crystals in the composite is the provision of control over the kinetics of phase separation and resin curing to improve the contrast ratio (transparency/opacity) of polymer dispersed liquid crystal films. This is accomplished through manipulation of (i) the solubility of liquid crystal in the resin, (ii) the rate of droplet formation, (iii) controlling the rate of polymer solidification, and (iv) controlling the liquid crystal droplet morphology (size, density). It has been determined that (i) The nematic to isotropic transition temperature $T_{ni}$ of liquid crystal in the droplets forming the discontinuous phase are found to be generally higher with MOMs present.

(ii) The $T_{ni}$ of liquid crystal droplets in polymer dispersed liquid crystal compositions typically increases with aging, however, in the liquid crystal droplets containing MOMs, this value reaches that of pure (non-metal containing) liquid crystal mixtures. This is due to the fact that $T_{ni}$ of MOM is higher (150°–200° C.) than that of the pure liquid crystal mixture.

(iii) In epoxy-based polymer dispersed liquid crystal compositions, full cure is not immediate and the epoxy matrix continues to post-cure gradually within a range of few months to a year on standing. This gradual curing has a direct effect on the electrooptics of the polymer dispersed liquid crystal composition, such as increasing the applied voltages with time. In the case of the invention, the rate of voltage increase with time is slower with MOMs present. This effect may arise either from retardation or increase in curing rate of the matrix by virtue of the presence of the the MOMs.

The type and intensity of color contributed by the presence of MOMs in the polymer dispersed liquid crystal system of the invention, depends on the chemical structure and type of bound metal and its absorption wavelength. The color of MOMs will be seen in the on-state, in most cases, indicating in those instances, that the MOMs are partly dissolved and not phase separated. Aside from aesthetic effects, the color of the MOMs contributes to the reduction of haze. Most polymer systems with conventional liquid crystal and free of MOMs are colorless. The existance of on-state colored transparency is an indication of plasticization of the polymer matrix by MOMs. When the amount of MOMs in the liquid crystal is less than about 1 weight percent, the film usually does not exhibit a detectable color on standard visual examination.

The composite film is placed between substrates having a transparent conducting electrode, such as indium tin oxide, to form a shutter. Imposing a voltage across the electrodes of the shutter, the composite film switches from an opaque, light scattering state to a clear, transparent state. Because of the presence of the organometallic liquid crystal component in the composite, reaching the ON state is relatively quicker and achieved with less voltage. The applied electric field aligns the droplets so that their refractive indices match that of the polymer, substantially reducing the light scattered by the droplets. The liquid crystals in droplets return to their original alignment and the film returns to the scattering state upon removal of the field.

DETAILED DESCRIPTION OF THE INVENTION

Figure 1:
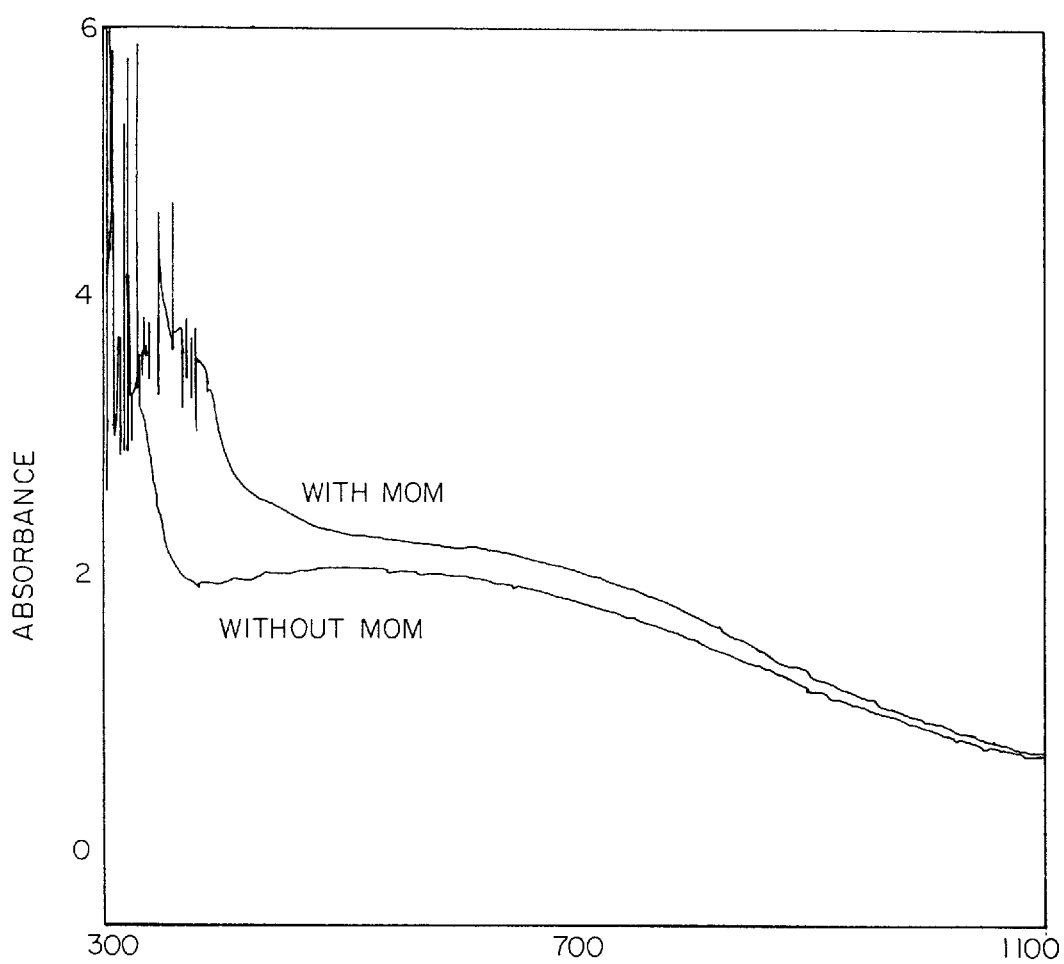

The invention contemplates composites of a liquid crystal discontinuous phase in polymer matrix continuous phase, where the liquid crystal phase is solely an organometallic liquid crystal composition or a compatible mixture with organic metal-free mesogens. As pointed out by Giroud-Godquin and Maitlis, supra, at page 398:

Both disk- and rodlike metallomesogens of many different types are known. Most of the mononuclear systems have the metal at or near the center of gravity of the molecule; this is true of the discotic mesogens (e.g., phthalocyanines, β-diketonates, and of the dinuclear carboxylates) as well as for the nematic and smectic calamitic mesogens.

The basic requirement for a metal complex to show mesomorphism are not dissimilar to those for many organics. Thus, a calamitic mesogen will typically have a long rigid group, which, frequently, but not essentially, corresponds to the core of the molecule containing the metal atom and two trans-ligands containing aromatic rings, carrying n-alkyl (or n-alkoxy) tails in the p-positions. Shorter tails tend to give rise to nematic mesogens, longer ones to smectic mesogens, while the stretched S-shape with the "outboard dipoles" characteristic of many organic compounds forming $S_c$ phases—is also found in many $S_c$ metallomesogens with n-alkyloxyphenyl tails. In some cases it is possible to construct calamitic mesogens with only one long organic ligand; these often $S_A$ phases-.

A discotic molecule will usually have a flattish platelike form with the metal in the center surrounded by a highly unsaturated organic ligand bearing at least four and preferably six or eight n-alkyl (or n-alkoxy) substituents. A great many of the metallomesogens known to date are of the columnar discotic type, including carboxylates, β-diketonates, and phthalocyanine-. By contrast, the complexes of salicylaldiminato ligands-, especially those with longer hydrocarbon tails, tend to give smectic phases. Both for calmitic compounds as well as for discotic compounds, the tails usually need to be at least five atoms long to show mesomorphism; and the presence of an extra phenyl is te tail is often advantageous.

The structure of the organometallic liquid crystal compound comprise a metal bonded multi-aromatic unit of at least two aromatic groups covalently joined, either directly or through other polyvalent organic or inorganic connecting groups. Generally, there are at least two multi-aromatic units bonded to the metal. Illustrative of such a structure is the following:

$$R^1—R^2—R^3 \quad (1)$$

where $R^1$ and $R^3$ are the same or different moieties, each of which provides at least one covalently joined aromatic group (aromatic groups include the unsaturated heterocyclic structures), and $R^2$ contains a polyvalent metal, bonded to $R^1$ and $R^3$ by covalent, ionic or weaker bonding forces. $R^2$ may contain a ring atom of a saturated structure or an unsaturated heterocyclic structure and thus constitutes part of the aromaticity of the composition. Suitable polyvalent metals are those from Groups 5–11 of the Periodic Table of Elements, new notation, published by the CRC Handbook of Chemistry and Physics, 67th Edition, CRC Press, Inc., 1986. The metals included are vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, rare earth metals, or uranium, and the like. The compound (1) may be an anionic or cationic component of a salt in which the counterion is a structure that does not adversely affect the liquid crystal properties of compound (1) or combines with compound (1) to provide the liquid crystal properties.

Particularly preferred organometallic liquid crystal compositions useable in the practice of this invention comprise those of the formula:

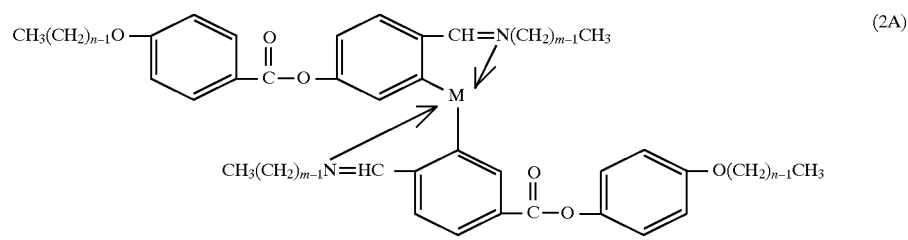

(2A)

in which M is copper, nickel, vanadyloxide and palladium and n and m are positive numbers such that compound (2) is a liquid crystal, and preferably nematogenic. In general, n and m each have a value of 2 to about 15, sufficient that the compound is mesogenic, preferably such that the compound possesses enantiotropic, monotropic, smectic, nematicand/or cholesteric phases. These compositions are described by Caruso, et al., *Liquid Crystals*, 1990, vol. 7, no. 3, pp. 421–430 and *Liquid Crystals, 1991*, vol. 10, no. 1, pp. 85–93.

Similar mesogens have the following formulae:

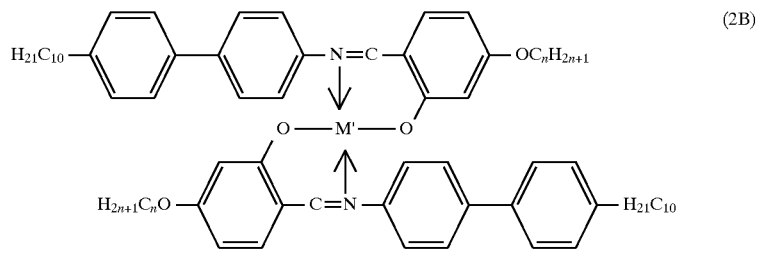

(2B)

where n is defined above, and M' is oxyvanadium and platinum. See Sadashiva, et al., Abstract, International LCC, Pisa, Italy, 1992, A-P16, p. 38.

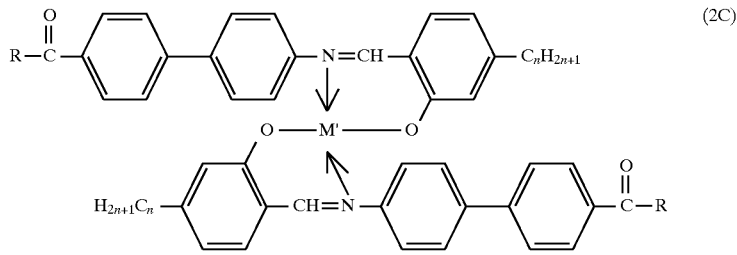
where R is organo such a aryl, alkyl, alkoxyaryl and the like, and n is defined above. M is defined above, and is preferably copper.
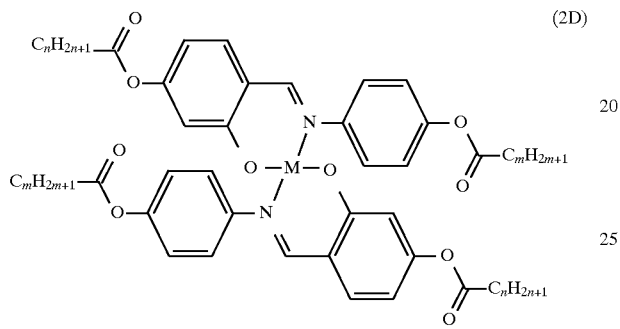
Another compound is described by Giroud-Godquin and Maitlis, supra, at pages 394–395, of the formula:
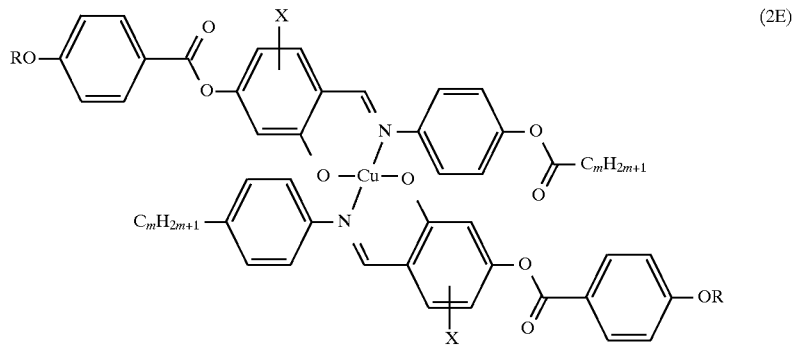
where R is alkyl ($C_{1-20}$), m is 1–20, and X is alkyl ($C_{1-4}$). Similar compounds are described by Giroud-Godquin and Maitlis, supra, at pages 395–396, of the formulae:
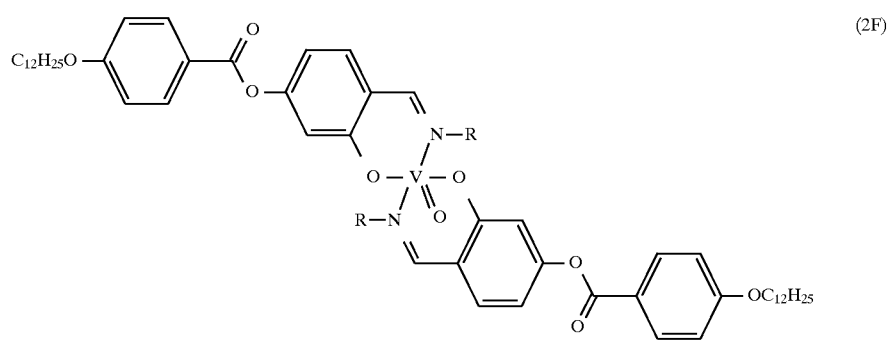
and

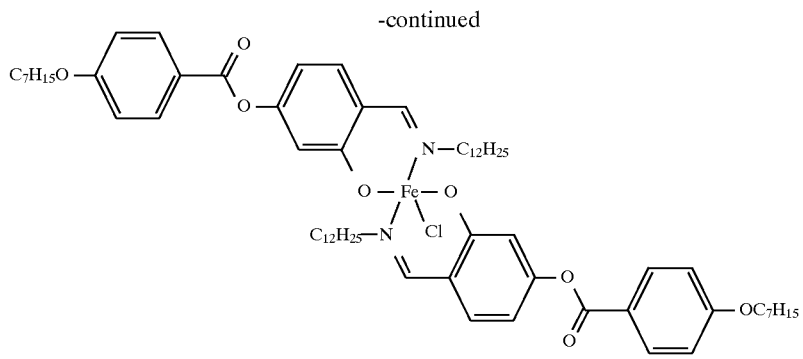

In summary of the compounds of formula (2), M is copper, nickel, vanadyloxide and palladium and n and m are positive numbers of a value such that the compound is a liquid crystal, M' is oxyvanadium and platinum, R is aryl, alkyl and alkoxyaryl and X is alkyl.

Another preferred organometallic liquid crystal compositions useable in the practice of this invention relates to a class of liquid crystal compounds formed by ionic interaction of mesogenic cations with mesogenic anions. Either may contain a metal. One type can be represented by the general formula

$$L_2MX_2 \quad (3)$$

where L represents an organo-nitrogen mesogen, M is defined above, X represents halide. (See Maitliss, et al. WO87/02693, Publ'd: May 7, 1987) Preferred embodiments of compounds (3) are obtained when the metal is palladium or platinum. Another organometallic mesogens suitable in practicing the invention are those represented by the general formulae:

$$LRh(CO)_2X \quad (4)$$

$$LAuX \quad (5)$$

where L and X are defined above (see Bruce, et al., *J. Chem. Soc., Chem. Comm.*, 1985, 581; Adams, et al., *Liquid Crystal*, 1987, 2, 38). Other suitable ionic mesogens are encompassed by the formulae:

$$[L_2Ag]^+BF_4^- \quad (6)$$

$$[L_2Ag]^+Y^- \quad (7)$$

$$X^+Y^{31} \quad (8)$$

where L is as defined above, $Y^{31}$ is a mesogenic anion and $X^+$ is a mesogenic cation. Another class of organometallic mesomorphic compound is represented by the formula

$$[(R^4COO)_4M_2] \quad (9)$$

where $R^4$ represents an alkyl or aryl group, for example $C_{11}H_{23}$ and M is as defined above. Methods for making these organometallic mesogens are described by Maitliss, et al. WO87/02693, published May 7, 1987.

An additional class of preferred organometallic liquid crystal compounds are complexes of the formula:

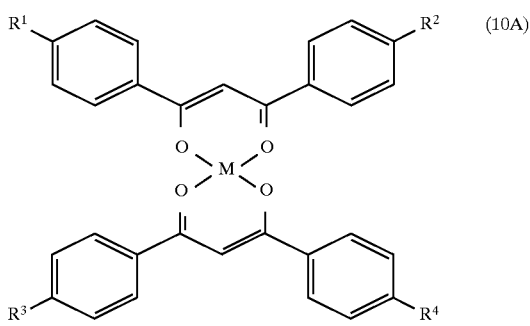

where $R^{1-4}$ are the same or different alkyl ($C_{1-30}$), alkoxy ($C_{1-30}$), aryloxy or cyano groups, and M is described above. A description of these compounds is set forth in, Chemical Abstracts, 97:6461k and by Giroud-Godquin in French Patent 2,486,946. The same author, (CA, 91:177447F) and French Patent 2,393,839, describes compounds of the formula:

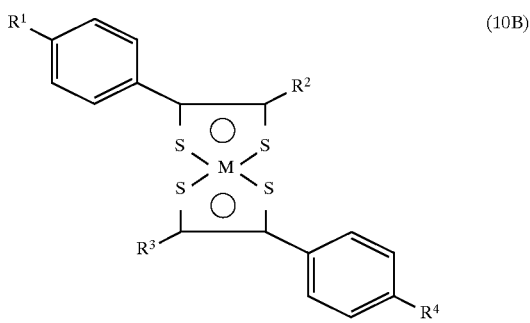

where $R^{1,4}$ are the same or different alkyl ($C_{1-14}$), alkoxy ($C_{1-14}$) or aryl groups, $R^{2,3}$ are hydrogen or the same or different alkyl ($C_{1-4}$) groups and M is described above where R is alkyl, alkoxy or aryl, R' is H or alkyl, M is described above, preferably platinum, cobalt or vanadium. In that same family of compounds is the mesomorphic transition metal complexes of the formulae:

(10C)

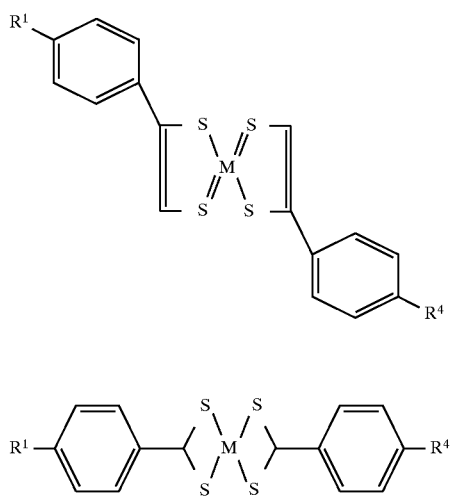

(10D)

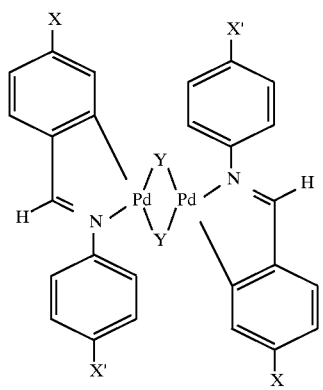

where $R^{1,4}$ and M are defined above. See Bruce, et al., *J. Mater. Chem.*, 1991, 1(5), 857–861.

Another class of desirable organometallic mesogens for use in the practice of the invention, has the formula:

(11A)

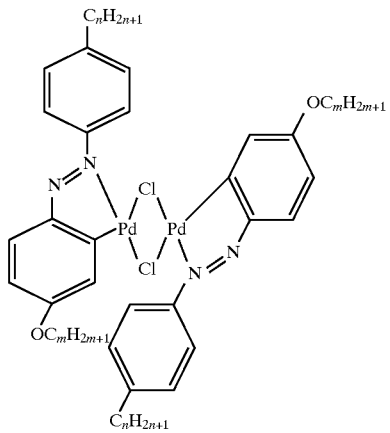

-continued (11B)

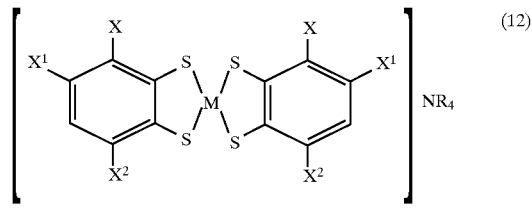

where Y is halogen, preferably chlorine, X is hydrogen, alkyl ($C_{1-14}$), alkoxy ($C_{1-14}$), halogen (preferably chlorine, bromine or iodine), cyano, nitro, and the like, and X' is alkyl ($C_{1-14}$) or alkoxy ($C_{1-14}$), and n and m are 0 to 8. These compounds are generally described in Ros, et al., *Liquid Crystal*, 1991, vol. 9, no. 1, 77–86, and Ghedini, et al., Chem. Mater., 1992, 4, (5) pp. 1119–1123.

Also included are the benzenedithiol metal complex of the formula:

(12)

$$\left[ \begin{array}{c} \text{structure} \end{array} \right] NR_4$$

where M is Ni, Pd or Pt, X is Cl or Br, $X^1$ and $X^2$ are H or Cl when X is Cl and H, or Br when X is Br, and R is $C_{1-14}$ alkyl. See Saito, et al., CA, 105:216811 z and U.S. Pat. No. 4,508,655.

Illustrative specific versions of compounds (2) are:

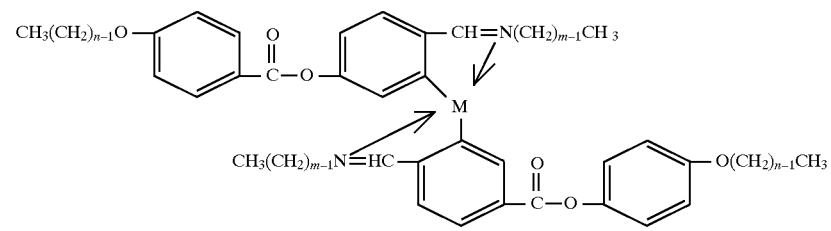

| where M = | n | m |
|---|---|---|
| Cu(II) | 6 | 1–15, 17 |
| Cu(II) | 10 | 1–15, 17 |
| Cu(II) | 7–14 | 8 |
| Cu(II) | 7–14 | 13 |
| Pd(II) | 8–11, 14 | 1 |
| Pd(II) | 7 | 13 |
| Pd(II) | 8 | 8, 13 |
| Pd(II) | 14 | 3 |
| Ni(II) | 8, 11, 14 | 1 |
| Ni(II) | 12 | 13 |

Specific illustrations of compounds (3)–(9) are the following:
1. bis (4-carbonitrile-4'-nonyloxybiphenyl) dichloropalladium
2. bis (4-carbonitrile-4'-octylbiphenyl) dichloroplatinum orange cis-dicarbonyl (4-carbonitrile-4'-nonyloxybiphenyl) chlororhodium
3. yellow bis(4-butoxy-4'-stilbazole) silver tetrafluoroborate
4. $[Mo_2(Cl_{12}H_{21}O_2)_4]$
5. green-blue complex $[Rh_2(Cl_{12}H_{21}O_2)_4]$
6. $X^+=[Me_3NC_{16}H_{33}]^{30}$, $Y^-=[SO_4C_{12}H_{25}]^{31}$
7. Bis(4-carbonitrile-4'-pentylbiphenyl)dichloropalladium
8. Bis(4-carbonitrile-4'-nonyloxybiphenyl) dichloropalladium (melts to give a mesophase at 119° C. which persists until an isotropic liquid is present at 147° C. On cooling from the isotropic liquid, a nematic phase is formed and the material is totally nematic at 130° C.)
9. Bis(4-carbonitrile-4'-octylbiphenyl)dichloroplatinum (melts to give a nematic phase at 170° C. which turns into an isotropic fluid at 190° C.)
10. The complex cis-dicarbonyl-(4carbonitrile-4'-nonyloxybiphenyl)chlororhodium (melts to give a nematic phase at 52° C. which turns into an isotropic liquid at 80° C.)
11. The complex bis(4-butoxy-4'-stilbazole) silver tetrafluoroborate (melts at 180° C. to a smectic phase which on heating to 305° C. becomes an isotropic liquid.)
12. Mixtures of $(C_3H_7C_6H_{10}CN)$ chloro palladium and $(C_5H_{11}C_6H_{10}CN)$chloro palladium (shows enantiotropic nematic phases whereas the second component only shows a monotropic nematic phase).

14. Illustrative of mesomorphic stilbazole complexes of rhodium and iridium are the following compound:

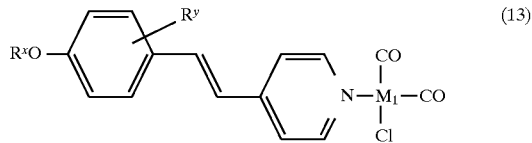

(13)

where $R^x$ and $R^y$ are the same or different alkyl ($C_{1-18}$), $R^y$ may be hydrogen, halogen, such as fluorine, chlorine, bromine and iodine, aryl such as phenyl, aroxy such as phenoxy, and $M_1$ is iridium or rhodium. For example, $R^y$ may be hydrogen, $R^x$ may be n-pentyl, and $M_1$ may be iridium.

The following compounds are illustrative of formula (11) compositions:

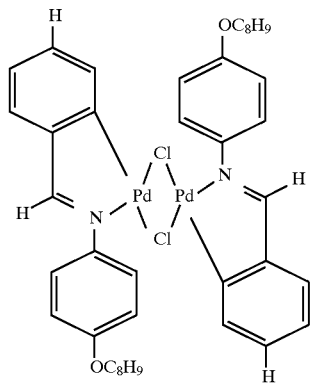

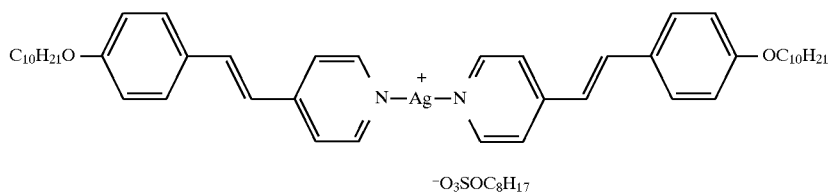

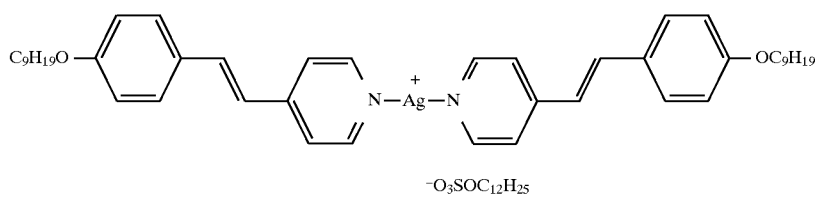

See Adams, et al., supra.

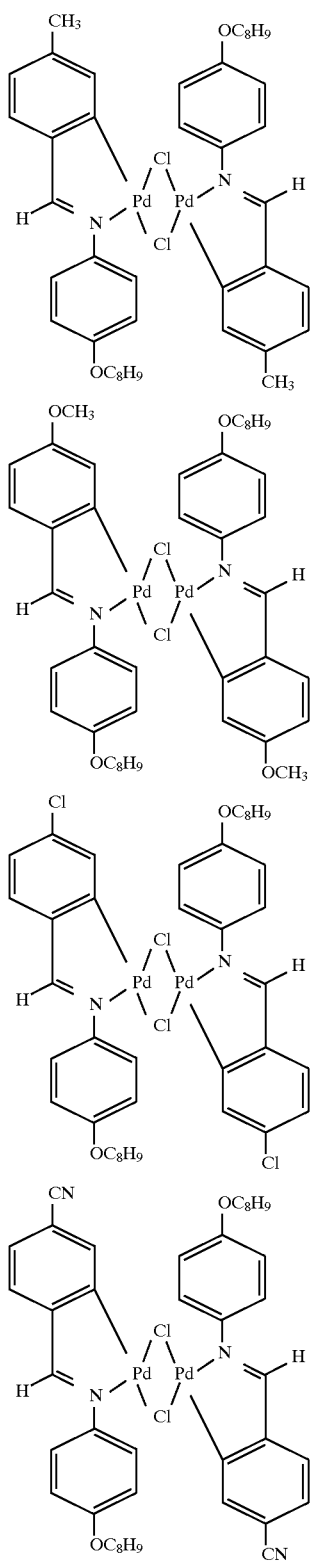
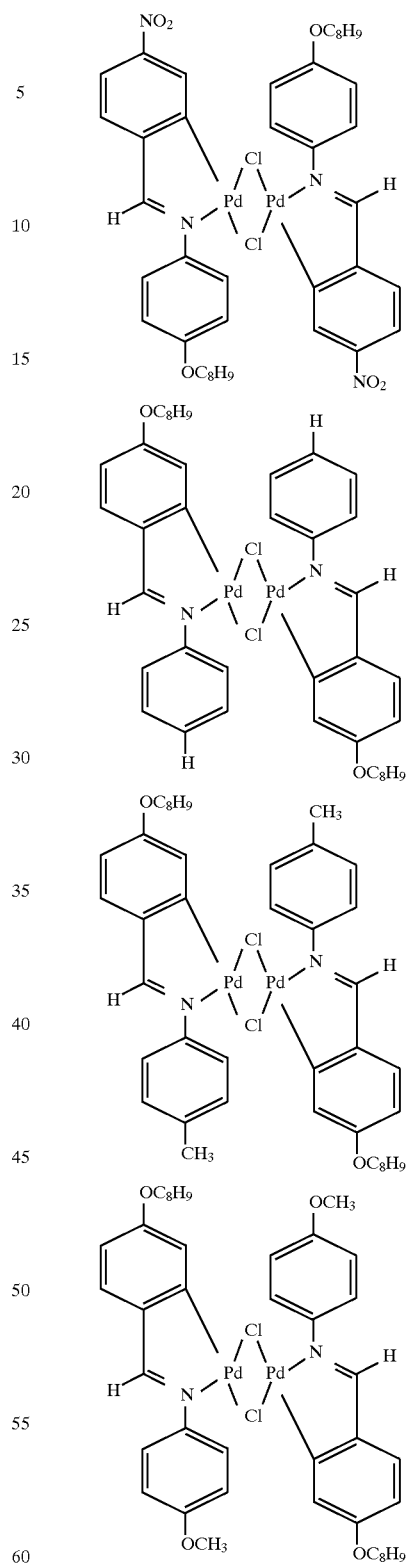

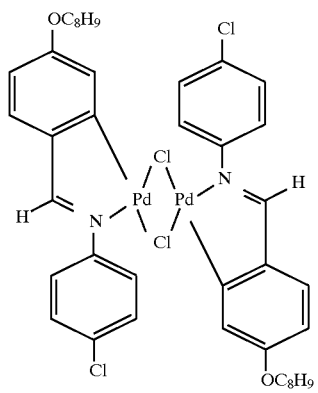

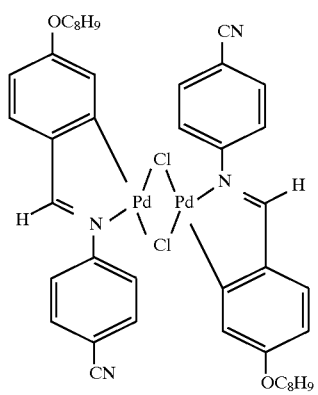

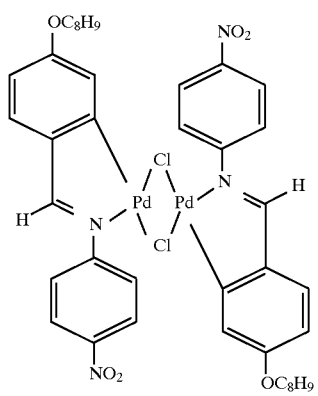

Giroud-Godquin and Maitlis, supra, at pages 397 and 398, describe another useful class of organometallic liquid crystal compounds suitably employable in the practice of the invention. One class is characterized by the formula:

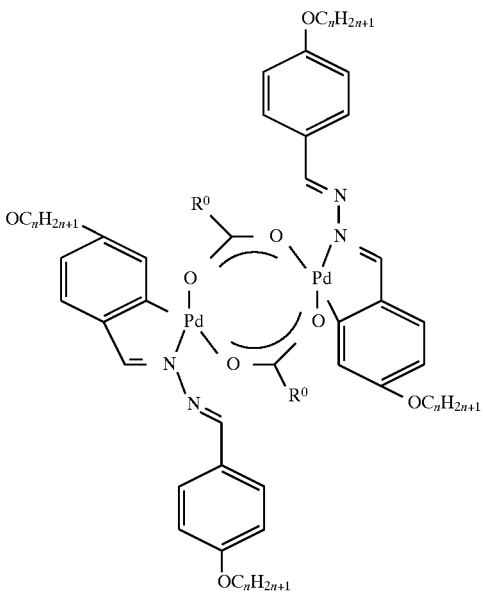

(14)

where $R^o$ is

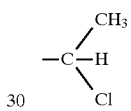

or $OC_mH_{2m+1}$, where m is 1 through 20.

Another series of MOMs are described by Versace et al., *Mol. Cryst. Liq. Cryst.*, 1992, vol. 212, pp. 313–318, having the formulae:

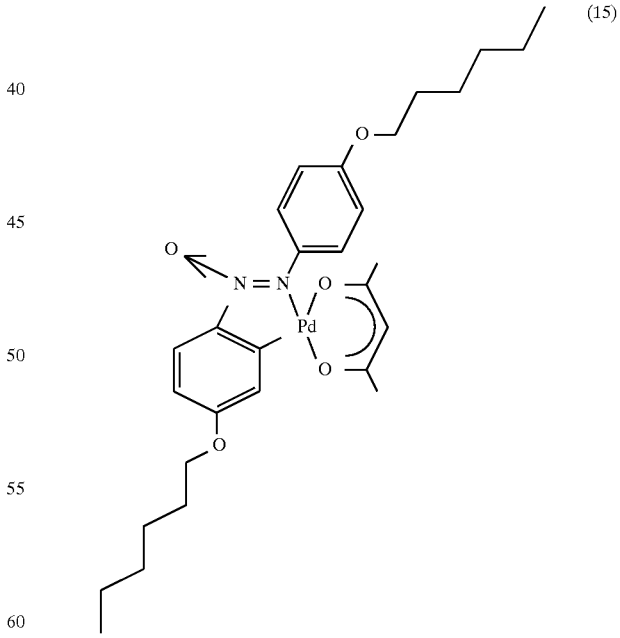

(15)

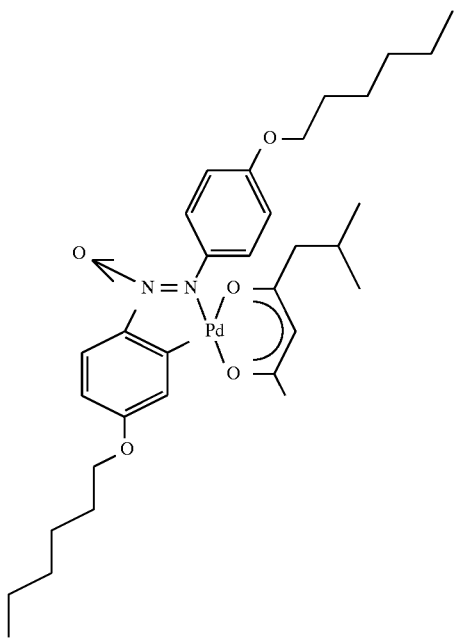
(16)

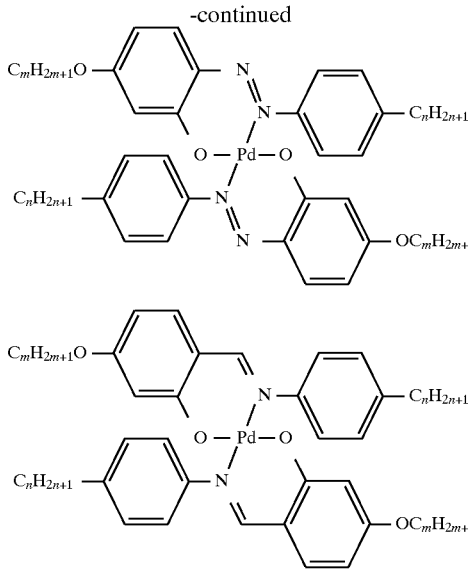
(19)

(20)

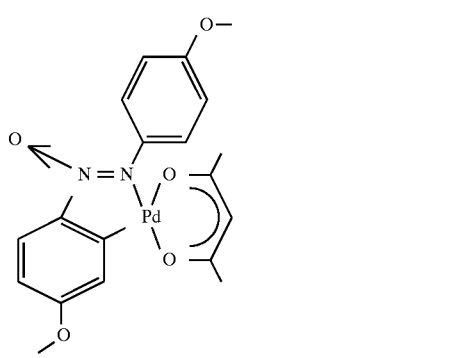
(17)

where n and m are whole numbers having a value of 1–20.

Another series of MOM's are copper complexes of phenacyl pyridines having the formula:

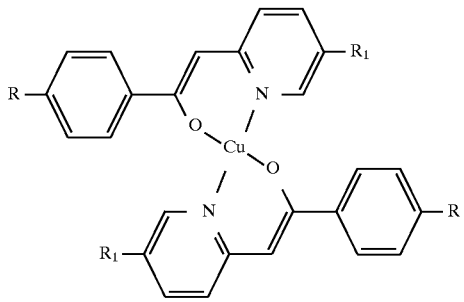
(21)

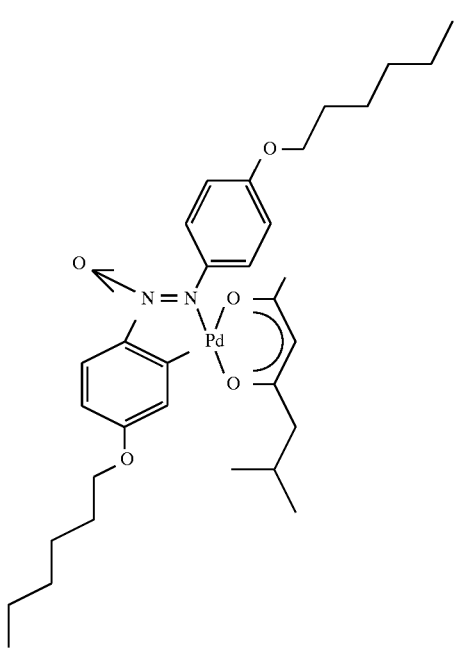
(18)

where R and $R_1$ may be the same or different, and each of R and $R_1$ may be H, —$OC_8H_{17}$, or —$OC_6H$—.

These complexes are synthesized by preparing a solution of 0.2 mmol of free phenacyl pyridine ligand in 4 ml of mixture of acetone/DMF and refluxing for 0.5 hour. 0.4 mmol of solid copper (II) acetate monohydrate is then added and the reaction mixture is refluxed for two hours. Upon cooling, brown crystals appear from the solution. The crystals are separated by filtration and washed with cold acetone.

Where R and $R_1$ are both H, the resultant copper (II) complex is Copper (II) 2 (phenacyl pyridine). Where R is —$OC_8H_{17}$ and $R_1$ is H, the resultant complex is Copper (II) 2-phenacyl-5-octyloxypyridine. Where both R and $R_1$ are —$OC_{8H17}$, the resultant complex is Copper (II) 2-(4-octyloxyphenacyl)-5-octyloxypyridine. Where both R and $R_1$ are —$OC_6H_{13}$, the resultant complex is Copper (II) 2-(4-hexyloxyphenacyl)-5-hexyloxypyridine.

Mixtures of these copper complexes of phenacyl pyridines may be prepared for use in the polymer dispersed liquid crystal composites of the present invention. The mixtures may comprise up to 100% of the liquid crystal discontinuous phase of the polymer dispersed liquid crystal composite, such mixtures containing no non-metallic organo liquid crystal. Mixtures of these copper complexes may also be prepared which include non-copper complexed ligands. The presence of the non-complexed ligands in such mixtures increases markedly the solubility of the copper complexes. The copper complex/ligand mixtures may comprise up to 100% of the discontinuous liquid crystal phase of the polymer composites of the present invention. Eutectic mixtures of these complexes may be prepared (see Example 21).

Another class of MOMs suitable for use in the polymer dispersed liquid crystal composite of the present invention are these of Cholesteric (chiral nematics) where the aliphatic group(s) of the chemical structures contain one or more asymmetric carbons.

The existence of a chiral group in the nematic forming compounds can result in a helicoidal structure in the mesophase. This helicoidal long range effect is identified with a twist or "pitch" factor, which can be measured optically or spectroscopically. If the "pitch" of the cholesteric structure falls within the visible range of the wavelength of light, it reflects the color associated with the "pitch" length and the phase will be colored. The "pitch" is affected by a number of factors; mostly the "concentration" and the temperature. Addition of either cholesteric (chiral nematic) MOM's, their ligands or other non-mesogenic solutes with chiral group to a nematic liquid crystal compound or mixture (including nematic MOM's) may create a "cholesteric" phase with a reflective color associated with the "pitch" of the cholesteric mixtures.

The use of "cholesteric" MOM's can provide the possibility of color matching in the mixtures of MOM's or with liquid crystal, where the "absorption" colors due to the metal-complex can be combined and/or matched with that of the "reflection" colors due to cholesteric pitch for a vast range of application in liquid crystal display technology. Descriptions of such cholesteric/chiral nematic MOM's may be found in M. Ghedini et al., Liq. Cryst, Vol. 15, 331 (1993); and M. Ghedini et al., Chem. Mater. 5,883 (1993).

Such cholesteric/chiral nematic compounds may be compounds of the following formulae:

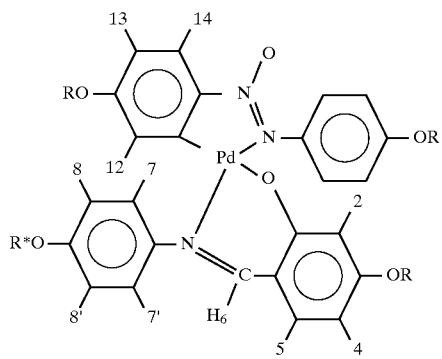
(22)

or

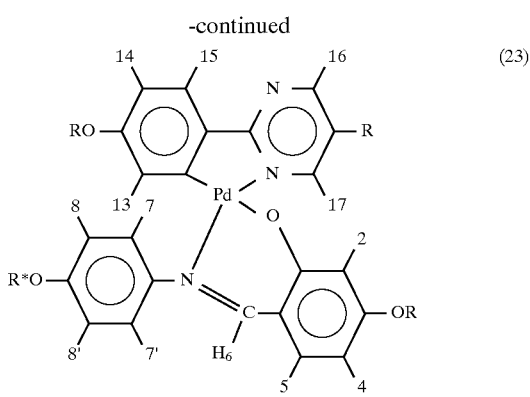
(23)

or

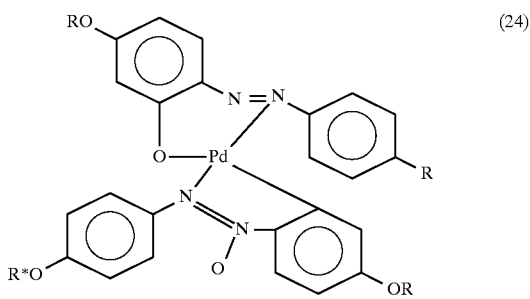
(24)

Where R is CH$_3$(CH$_2$)m—, where m=1–20, and where R* is

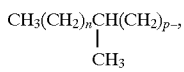

where n and p=1–10.

A description of the synthesis of the palladium complexes of the general formula 24 may be found in Italian patent application VE92A000003.

Other metalloorganic liquid crystal compounds suitable for use in the present invention include compounds of the formulae:

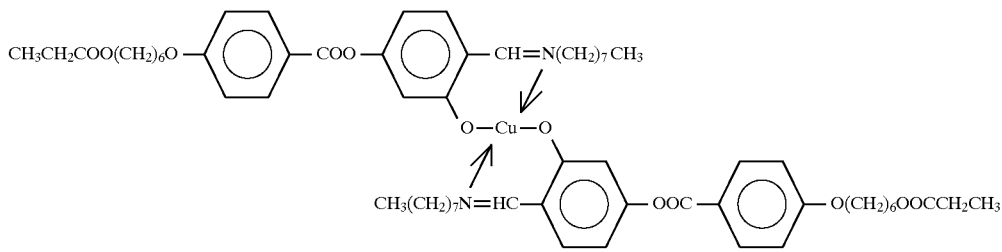

(25)

CuLC1

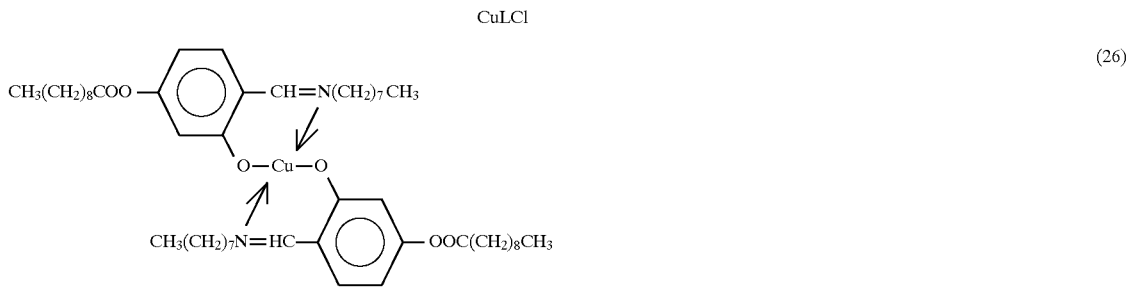

(26)

Cu1

The synthesis of Cu1 is described in Caruso et al., Macromolecules 24 p. 2606 (1991). CuLC1 may be synthesized as follows. 3.92 g of the following compound,

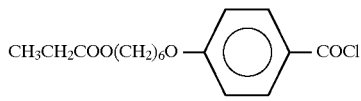

the synthesis of which is described in Caruso et al., Macromolecules 24, p. 2606 (1991), are dissolved in 80 mL dehydrated chloroform and reacted with 3.33 g of the following compound, also described in the above reference:

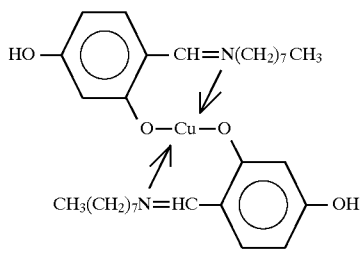

together with 1.92 g of tetrabutylammonium hydrogensulphate and 1.24 g KOH dissolved in 150 mL water. The reaction is performed in a blender for 10 min. The chloroformic phase is then treated several times with water, dried and evaporated to 30 mL volume. Crystallization of CuLC1 is obtained after addition of 150 mL ethanol. Yield: 4.49 g (90%).

Another metalloorganic mesogen suitable for use in the polymer dispersed liquid crystal composites of the preset invention includes compounds having the formula.

(27)

where R is $CH_3(CH_2)m—$, where m=1–20. These compounds are described in Italian patent application VE92A00003.

The invention also contemplates the use of polymeric forms of the aforementioned types of MOMs, such as characterized by Giroud-Godquin and Maitlis, supra, at page 396 (section 7.3).

As should be apparent to those working in this art, the difference in physical properties of the MOMs as compared to the non-metal containing liquid crystal traditionally used in polymer dispersed liquid crystal composites, provides a mechanism of control over the kinetics of phase separation and resin curing to vary and particularly to improve the contrast ratio (transparency/opacity) of polymer dispersed liquid crystal films by controlling (i) the solubility of liquid crystal in the resin, (ii) the rate of droplet formation, (iii) controlling the rate of polymer solidification, and (iv) controlling the liquid crystal droplet morphology (size, density). This is especially the case where MOMs are used in conjunction with conventional, non-metallic liquid crystals in the polymer dispersed liquid crystal composite.

In the preferred embodiment of the invention, the organometallic liquid crystal is used in combination with another compatible liquid crystal composition that is non-metallic. Preferably, these other liquid crystals are of the nematic form or operationally nematic which means that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic. More preferably, they also have a positive dielectric anisotropy.

In another preferred embodiment of the invention, the organometallic liquid crystal comprises 100% of the liquid crystal discontinuous phase. In these embodiments, mixtures of compatible organometallic liquid crystals are employed. Such mixtures may be eutectic mixtures of organometallic liquid crystals. In still other embodiments, mixtures (including eutectic mixtures) of organometallic liquid crystals and their ligands are employed. The inclusion of the ligands of the organometallic liquid crystals in mixtures of the organometallic liquid crystals may improve the solubility of the organometallic liquid crystals.

Where the organometallic liquid crystals are use in combination with non-organometallic liquid crystals, the organometallic liquid crystals should be compatible with the non-organometallic liquid crystals. Preferably, the organometallic liquid crystals should be soluble in the non-organometallic liquid crystals. The combination of the metallo organic mesogens and the conventional liquid crystals generally form an eutectic melting mixture. This is noted by the increase of the liquid crystal mixture's increase in $T_{ne}$. Suitable nematic liquid crystals in compositions typically contain a linear chain of at least one, preferably at least two, aromatic group preferably phenylene or heterocyclic aromatic groups, connected to a linking group such as a covalent bond, a carbonyloxy group, a vinylene group (—CH=CH—), a carbonylimino group, an ethynylene group (—C≡C—), an azomethine group (—CH=N—), an azo group (—N=N—), an azoxy group, and the like. Preferred non-metallic liquid crystals comprise cyanobiphenyls, and may be mixed with cyanoterphenyls and with various esters.

Typical organic classes of liquid crystal forming materials contemplated comprise both aromatic and aliphatic organic compounds such as benzylideneanilines generally prepared from the reaction of para-substituted benzaldehyde and parasubstituted aniline; N-(p-alkoxybenzylidene)-p-aminostyrenes prepared from the reaction of the appropriate aldehyde with p-aminostyrene; derivatives of beta sitosterol; active amyl ester of cyano benzylidene aminocinnamate; p-phenylene containing compounds such as p-phenylene p-alkoxybenzoates; aminoacetophenones; aminopropiophenones; phenylenediamines; chlorophenylenediamines; terephthals; p,p'-disubstituted bibenzyls; p,p'-disubstituted stilbenes; p,p'-disubstituted diphenylacetylenes; p,p'-disubstituted-1,4-diphenylbutadienes; p,p'-diisubstituted phenyl benzoates; substituted phenyl alkyl carbonates and diphenyl carbonates; p-n-alkyl benzoic acids; p-n-alkoxy benzoic acids; and Schiff bases prepared from p-substituted benzaldehydes and compounds of the following types: p-phenylenediamines, 4,4'-diaminobiphenyls, 4-phenylazoanilines, naphthylamines, and naphtylenediamines.

Specific liquid-crystal compounds include ethyl p-4-ethoxy-benzylideneaminocinnamate; p,p'-azoxybenzoic acid diethyl ester; N-(p-methoxy-benzylidene)-p-aminostyrene; N-(p-butoxybenzylidene)-p-aminosty-rene; p-azoxyanisole; p-hexyloxybenzalazine; p-azoxy-phenetole; p-anisylidene-p-biphenylamine; p-ethoxy-benzylidene-p-biphenylamine; p-anisylidene-p-aminophenyl acetate; p-ethoxybenzylidene-p-aminophenyl acetate; p-n-hexyloxybenzylidene-p-aminophenyl acetate; p-n-hexoloxy-benzylidene-p-aminophenyl acetate; deca-2,4-dienoic acid; 4,4'di-n-heptoxyazoxybenzene; 4,4'di-n-hexoxyazoxybenzene; 4,4'-di-n-hexoxyazoxybenzene; 4,4'-di-n-pentoxyazoxybenzene; 4,4'di-n-butoxyazoxybenzene; 4,4'diethoxy-azoxybenzene; undeca-2,4-dienoic acid; nona-2,4-dienoic acid; 4,4'dimethoxystilbene; 2,5-di(p-ethoxybenzylidene) cyclopentanone; 2,7-di-(benzylideneamino) fluorene; 2-p-methoxybenzylideneaminophenanthrene; 4-methoxy-4"-nitro-p-terphenyl; 4-p-methoxybenzylideneaminobiphenyl; 4,4'-di(benzylideneamino)biphenyl; p-n-hexylbenzoic acid; p-n-propoxybenzoic acid; trans-p-methoxycinamic acid; 6-methoxy-2-naphtholic acid p-phenylene di-p-anisate; p-phenylene di-p-ethoxy-benzoate; p-phenylene di-p-n-hexyloxybenzoate; p-phenylene di-p-n-heptyloxybenzoate; p-phenylene di-p-n-octyloxybenzoate; 1,4-bicyclo[2.2.2.] octylenedi-p-anisate; 1,4-bicyclo[2.2.2]octylene di-p-n-octyloxybenzoate trans-1,4-cyclohexylene di-p-n-butoxybenzoate; 4,4'-di(p-methoxybenzylideneamino) p,p'-diacetoxystilbene; 1,2-di(p-methoxyphenyl)-acetylene; p-(p-acetoxyazo) benzoic acid; 1,4-di-(p-methoxyphenyl)-butadiene; p-anisal-p-anisidine; p,p'dimethoxydibenzal-1,4-naphthalenediamine; p-n-butylbenzoic acid; p,p'-di-n-butyldiphenylpyridazine; p-(p-cyanobenzal)anisdine; p-(p-methoxybenzoxy benzoic acid, anisal-p-aminozobenzene; 1-(4'-anisalamino)-4-phenylazonaphthalene; N-(p-methoxybenzylidene)-p-n-butylaniline; N-(p-n-octyloxybenzylidene)-p-n-butylaniline; p-anisylidene-p-phenylazoaniline; N,N'-dibenzylidenebenzidine; N,N'-di(p-n-hexyloxybenzylidene)benzidine; p-bis(-heptyloxybenzoyloxy)benzene; p-n-propoxybenzoic acid; p-n-butoxybenzoic acid; p-n-amyloxybenzoic acid; p-n-hexyloxybenzoic acid; p-n-heptyloxybenzoic acid; p-n-octyloxybenzoic acid; butyl-p-(p-ethoxyphenoxycarbonyl) phenylcarbonate; p-(p-ethoxy-phenylazo)-phenylheptanoate; 4-[(p-hexyloxycarbonyloxybenzylidene) amino]-1-pentyloxybenzene; N-p-(pentyloxycarbonyloxy) benzylidene]-p-anisidine; p-[(p-butoxy-phenyl)azo]phenyl butyl carbonate; p-(p-ethoxyphenylazo)phenyl hexanoate; p-(p-ethoxy-phenylazo)phenyl valerate; p-[(p-ethoxybenzylidene)amine]benzonitrile; p-[(p-methoxybenzylidene)amono]benzonitrile; ethyl p-[(p-methoxybenzylidene)amino]cinnamate; p-(p-ethoxyphenylazo)-phenyl crotonate; p-[(p-methoxybenzylidene)amino]-phenyl p-toluate; p-[(p-methoxybenzylidene)amino]-phenylbenzoate; p-[(p-ethoxybenzylidene)amino]phenylbenzoate; N,N'-di(p-methoxybenzylidene)-αα'-biptoluidine; p-anisalazine; 4-acetoxy-3-methoxycinnamic acid p-acetoxycinnamic acid; 4'-[(p-pentyloxycarbonyloxybenzylidene)amino-valerophenone; diethyl p,p'-azoxydicinnamate; 4-butoxybenzylidene-4'-aminoacetophenone; 4-decyloxybenzylidene-4'-aminoacetophenone; 4-dodecyloxybenzylidene-4'-aminoacetophenone; 4-heptyloxybenzylidene-4'-aminoacetophenone; 4-hexyloxybenzylidene-4-methoxybenzylidene-4'-aminoacetophenone; 4-nonyloxybenzylidene-4'-aminoacetophenone; 4-octyloxybenzlidene-4'-aminoacetophenone; 4-pentyloxybenzylidene-4'-aminoacetophenone; 4-propoxybenzylidene-4'-aminoacetophenone; 4-butoxybenzylidene-4'-aminopropiophenone; 4-heptyloxybenxylidene-4'-aminopropiophenone; 4-methoxybenzylidene-4'-aminopropiophenone; 4-nonyloxybenzylidene-4'-aminopropiophenone; 4-octyloxybenzylidene-4'-aminopropiophenone; 4-pentyloxybenzylidene-4'- aminopropiophenone; 4-propoxybenzylidene-4'-aminopropiophenone; bis-(4-bromobenzylidene)-2-chloro-1,4-phenylenediamine; bis-(4-chlorobenzylidene)-2-chloro-1,4-phenylenediamine; bis-(4-n-decyloxybenzylidene)-2-chloro-1,4-phenylenediamine; bis-(4-n-dodecyloxybenzylidene)-2-chloro-1,4-phenylenediamine; bis-(4-n-hexyloxybenzylidene)-2-chloro-1,4-phenylenediamine; bis-(4-methoxybenzylidene)-2-chloro-1,4-phenylenediamine; bis-(4-nonyloxybenzylidene-2-chloro-1,4-phenylenediamine; bis-(4-n-octyloxybenzylidene)-2-chloro-1,4-phenylenediamine; bis-(4-n-pentyloxybenzylidene)-2-chloro-1,4-phenylenediamine; bis-(4-bromobenzylidene)-1,4-phenylenediamine; bis-(4-chlorobenzylidene)-1,4-phenylenediamine, bis-(4-n-decyloxybenzylidene)-1,4-phenylenediamine; bis-(4-n-dodecyloxybenzylidene)-1,4-phenylenediamine; bis-(4-fluorobenzylidene)-1,4-phenylenediamine; bis-(4-n-heptyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-hexyloxybenzylidene)-1,4-phenylenediamine; bis-(4-n-nonyloxybenzylidene)-1,4-phenylenediamine; bis-(4-n-octyloxybenzylidene)-1,4-phenylenediamine; bis-(4-n-pentyloxybenzylidene)-1,4-phenylenediamine; terephthal-bis-(p-bromoaniline); terephthal-bis-(p-chloroaniline); terephathal-bis-(p-fluoroaniline); terephthal-bis-(p-iodoanile), and the like.

Nematic liquid crystalline materials suitable for use with the organometallic liquid crystals include: p-azoxyanisole, p-azoxyphenetole, p-butoxybenzoic acid, p-methoxy-cinnamic acid, butyl-p-anisylidene-p-aminocinnamate, anisylidene p-amino-phenylacetate, p-ethoxy-benzalamino-α-methyl-cinnamic acid, 1,4-bis(p-ethoxybenzylidene) cyclohexanone, 4,4'-dihexyloxybenzene, 4,4'-diheptyloxybenzene, anisal-p-amino-azo-benzene, anisaldazine, α-benzene-azo-(anisal-α'-naphthylamine), n,n'-nonoxybenzetoluidine; anilines of the generic group (p-n-alkoxybenzylidene-p-n-alkylanilines), such as p-methoxybenzylidene p'-n-butylaniline, p-n-butoxybenzylidene-p'-aminophenylacetate, p-n-octoxybenzylidene-p'-aminophenylacetate, p-n-benzylideneproprionate-p'-aminophenylmethoxide, p-n-anixylidene-p'-aminophenylbuterate, p-n-butoxybenzylidiene-p'-aminophenylpeatoate and mixtures thereof. Conjugated cyano-organic compounds that are useful are 7, 7', 8, 8'-tetracyanoquinodimethane (TCNQ), (2,4, 7,-trinitro-9-fluorenylidene)-malono-nitrile (TFM), p-[N-(p'-methoxybenzylidene)amino]-n-butylbenzene (MBBA), p-[N-(p'-ethoxybenzylidene)amino]-butylbenzene (EBBA), p-[N-(p'-methoxybenzylidene)amino]phenyl butyrate n-butyl-p-(p'-ethoxyphenoxycarbonyl) phenylcarbonate, p-methoxy-p'-butylazoxybenzene, p-ethoxy-p'-n-butylazobenzene, p-[N-(p'-methoxybenzylidene) amino] benzonitrile (BBCA), p-[N-(p'-hexylbenzylidene)amino] benzonitrile (HBCA), pentylphenylmethoxy benzoate, pentylphenylpentyloxy benzoate, cyanophenylpentyl benzoate, cyanophenylpentyl benzoate, cyanophenylpentyloxy benzoate, cyanophenylheptyloxy benzoate, cyanophenyloctyloxy benzoate, cyanophenylmethoxy benzoate, and the like.

Desirable nematic liquid crystals frequently comprise cyanobiphenyls, and may be mixed with cyanoterphenyls and with various esters. There are commercially available nematic type liquid crystal mixtures, such as liquid crystal mixture "E7"(Licrilite® BL001 from E. Merck, Darmstadt, Germany, or its subsidiaries such as EM Industries, Hawthorne, N.Y. and Merck Industrial Chemical, Poole, England) that is a mixture of (by weight), 51% 4'-n-pentyl-n-cyanobiphenyl (5CB), 21% 4'-n-heptyl-n-cyanobiphenyl (7CB),, 16% 4'-n-octoxy-4-cyanobiphenyl,, 12% and 4'-n-pentyl-4-cyanoterphenyl that has a crystal to nematic liquid crystal phase transition temperature of −10° C. and a liquid crystal to isotropic phase transition temperature of 60.5° C. Illustrative of other such commercial liquid crystal mixtures are the following:

E-31 is a proprietary mixture of cyanobiphenyls and a non-cyano biphenyl ester available from E. Merck, supra, and having a crystal to nematic crystal phase transition temperature of −9° C. and a liquid crystal to isotropic phase transition temperature of 61.5° C. E-44 is a proprietary mixture of cyanobiphenyls, a cyanoterphenyl and a non-cyano biphenyl ester available from E. Merck, supra, and having a crystal to nematic liquid crystal phase transition temperature of −60° C. and a liquid crystal to isotropic phase transition temperature of 100° C. E63, from E. Merck, supra, is a liquid crystal mixture that is similar to the E7 with added cyclohexanes. It contains: significant amounts of the commonly known liquid crystal component 5CB, 7CB, lesser amounts of 5CT, lesser amounts of Benzonitrile,4-(4 propyl-1-cyclohexen-1-yl), commonly known as PCH3, lesser amounts of 4-carbonitrile,4'(4-pentyl-1-cyclohexen-1-yl)-1, 1'-biphenyl, commonly known as BCH5, and still lesser amounts of [1,1'-Biphenyl]-4-carboxylic acid, 4'heptyl-4'-cyano[1,1'-bipheny]-4-yl ester, commonly known as DB71. K-12 is 4-cyano-4'-butylbiphenyl and has a crystal to nematic liquid crystal phase transition temperature of 48° C. K-18 is 4-cyano-4'-hexylbiphenyl and has a crystal to nematic liquid crystal phase transition temperature of 14.5° C. and a liquid crystal to isotropic phase transition temperature of 29° C. K-21 is 4-cyano-4'-heptylbiphenyl and has a crystal to nematic liquid crystal phase transition temperature of 30° C. K-24 is 4-cyano-4'-octylbiphenyl and has a crystal to smectic A liquid crystal phase transition temperature of 21.5° C., a smectic C to nematic liquid crystal phase transition temperature of 33.5° C. and a nematic liquid crystal to isotropic phase transition temperature of 40.5° C. M-15 is 4-cyano-4'-pentoxybiphenyl and has a crystal to nematic liquid crystal phase transition temperature of 48° C. and a liquid crystal to isotropic phase transition temperature of 68° C. M-18 is 4-cyano-4'-hexoxybiphenyl and has a crystal to nematic liquid crystal phase transition temperature of 57° C. and a liquid crystal to isotropic phase transition temperature of 75.5° C. M-24 is 4-cyano-4'- octoxybiphenyl and has a crystal to smectic A liquid crystal phase transition temperature of 54.5° C., a smectic A to nematic liquid crystal phase transition temperature of 67.0° C. and a nematic to isotropic phase transition temperature of 80.0° C. Other desirable Licrilite® liquid crystal mixtures include BL003, BL004, BL009, BL011, BL012, BL032, BL036, BL037, BL045, BL046, ML-1001, ML-1002, as well as TL202, TL203, TL204 and TL205, all obtainable from E. Merck, supra.

TOTN404, available from Hoffman-LaRoche, Basel, Switzerland and Nutley, N.J., is a liquid crystal mixture similar to E7 but with added pyrimidines. It contains approximately 30 weight percent of 4-carbonitrile, 4'-pentyloxy-1,1'-biphenyl commonly known as 50CB, 15 weight percent of 4-carbonitrile,4'-octyloxy-1,1'-Biphenyl, commonly known as 80CB, 10 weight percent of 4-carbonitrile-4"-pentyl-1,1', 4', 1"-terphenyl, commonly known as 5CT, 10 weight percent of 4-(5-pentyl-2-pyrimidimyl)-benzonitrile, commonly known as RO-CP-7035, 20 weight percent of 4-(5-heptyl-2-pyrimidimyl)-benzonitrile, commonly known as RO-CP-7037, and 15 weight percent of 4-[5-(4-butylphenyl)-2-pyrimidinyl] benzonitrile, commonly known as RO-CM-7334.

ROTN-570, available from Hoffman-LaRoche is a cyanobiphenyl liquid crystal mixture comprises 51 weight percent of 4-cyano-4'-pentylbiphenyl, 25 weight percent of 4-cyano-4'-heptylbiphenyl, 16 weight percent of 4-cyano-4'-octyloxybiphenyl, and 8 weight percent of 4-cyano-4'-pentyl-p-terphenyl. Another desirable liquid crystal mixture from Hoffman-LaRoche is TNO623.

The invention encompasses non-homogeneous mixtures of the metallo organic mesogen and the conventional liquid crystals (the non-organometallic liquid crystals). This is accomplished by keeping the different liquid crystals in separate phases. Such phase distinction can be effected by encapsulating either or both of the types of liquid crystals (organometallic liquid crystals vs. non-organometallic liquid crystals) in a polymeric medium. A convenient way of doing this is to encapsulate the liquid crystals, one type or the other, or both types, by NCAP techniques, such as those described above. The NCAP'd liquid crystals can be mixed with the non-encapsulated liquid crystals and the combination, or the NCAP'd mixture alone, can be conventionally polymer dispersed as described herein.

The polymers used in making the composites are from two categories, thermosetting polymers and thermoplastic polymers. The thermosetting polymers undergo a cure reaction where they are transformed from a lower molecular weight composition with heat, with or without catalyst, hardeners, modifiers, and the like, into a higher molecular weight cured thermoset resin. Thermosetting is the act of using heat to transform the lower molecular weight precursor to the cured product. The temperature needed to accomplish this is dependent upon the time given to the reaction, catalysts employed, the relative reactivities of the complementary functional groups in the precursor, i.e., the general and common knowledge of those skilled in the thermosetting resin art. The thermosetting resin may be any of them known in the art.

The thermosetting matrix resin suitable for use in the invention comprise epoxies curing at temperature from $\geq 350°$ F. (177° C.), or higher, to $\geq 250°$ F. (121° C.) are the most common matrix resins, but matrices of bismaleimide (BMI), phenolic, polyester, PMR-15 polyimide and acetylene terminated resins, typical of high performance thermosetting resins, are usable in the practice of the invention. The invention includes as well, other thermosetting resins such as thermosetting resins from acrylics, polyurethanes, free-radically induced thermosetting resin, and the like, in making the composites of the invention. The typical thermosetting resin is an A-stage resin. In some cases, it may be desirable to utilize a B-stage resin but in the typical case, such is done in combination with an A-stage resin. Such B-stage resin will affect the viscosity of the resin formulation.

Epoxy resins are a particularly preferred material in making PDLC compositions. There are a variety of epoxy resins suitable for use in practicing the invention. All epoxy resins start with an epoxy precursor that is capable of homopolymerization reaction that is catalytically initiated, or coreacted with complementary functional compositions such as compounds with active hydrogen groups or other reactive groups capable of reacting with an epoxy resin so as to cause the molecular weight of the epoxy resin to increase. The performance of the cured epoxy resin is dependent upon the degree of functionality of the resin and the coreactant, the degree of aromaticity of the resin, the molecular weight of the epoxy resin and any coreactant prior to reaction and the level of cure of the resin. The coreactant can be a curing agent and/or hardener.

Illustrative of suitable epoxy resin in making the composite of the invention may be employed include the following:

1. The epoxidized ester of the polyethylenically unsaturated monocarboxylic acids, such as epoxidized linseed, soybean, perilla, oiticica, tung, walnut and -dehydrated castor oil, methyl linoleate, butyl linoleate, ethyl 1,12-ctadecadienoate, butyl 9, 12, 15-octadecatrienoate, butyl oleostearate, monoglycerides of tung oil fatty acids, monoglycerides of soybean, sunflower, rapeseed, hempseed, sardine, or cottonseed oil. and the like.

2. The epoxidized esters of unsaturated monohydric alcohols and polycarboxylic acids, such as, for example, di(2,3-epoxybutyl) adipate, di(2,3-epoxybutyl)oxalate, di(2,3-epoxyhexyl)succinate, di(3,4-epoxybutyl maleate, di(2,3-epoxyoctyl)pimelate, di(2,3-epoxybutyl)phthalate, di(2, 3-epoxyoctyl) tetrahydrophthalate, di(4,5-epoxydodecyl)maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tartrate, di(4,5-epoxytetradecyl)maleate, di(2,3-epoxybutyl) azelate, di(3,4-epoxybutyl)citrate, di(5,6-epoxyoctyl) cyclohexane 1,2-dicarboxylate, di (4, 5-epoxyoctadecyl) malonate.

3. Epoxidized esters of unsaturated alcohols and unsaturated carboxylic acids, such as 2,3-epoxybutyl 3,4-epoxypentanoate, 3,4-epoxyhexyl, 3,4-epoxypentanoate, 3,4-epoxycyclohexyl 3,4-epoxycyclohexanoate, 3,4-epoxycyclohexyl 4,5-epoxyoctanoate, 2,3-epoxycyclohexylmethyl, epoxycyclohexane carboxylate.

4. Epoxidized derivatives of polyethylenically unsaturated polycarboxylic acids, such as, for example dimethyl 8,9,12,13-diepoxyeicosanedioate, dibutyl 7,8,11, 12-diepoxyoctadecanedioate, dioctyl 10,11 diethyl-8,9, 12,13-diepoxy-eicosanedioate, dihexyl 6,7,10,11-diepoxyhexadecanedioate, didecyl 9-epoxy-ethyl 10, 11-epoxyoctadecanedioate, dibutyl 3-butyl 3,4,5,6-diepoxycyclohexane 1,2-dicarboxylate, dicyclohexyl 3,4,5,6-diepoxycyclohexane-1,2-dicarboxylate, dibenzyl 1,2,4,5-diepoxycyclohexane -1,2-dicarboxylate and diethyl 5,6,10, 11-diepoxyoctadecyl succinate.

5. Epoxidized polyesters obtained by reacting an unsaturated polyhydric alcohol and/or unsaturated polycarboxylic acid or anhydride groups, such as for example, the polyester obtained by reacting 8,9,12, 13-eicosanedienedioic acid with ethylene glycol, the polyester obtained by reacting diethylene glycol with 2-cyclohexene -1,4-dicarboxylic acid and the like, and mixtures thereof.

6. Epoxidized polyethylenically unsaturated hydrocarbons, such as epoxidized 2,2-bis (2-cyclohexenyl) propane, epoxidized vinyl cyclohexene and epoxidized dimer of cyclopentadiene.

7. Epoxidized polymers and copolymers of diolefins, such as butadiene. Examples of this include, among others, butadieneacrylonitrile copolymers (nitrile rubbers), butadiene-styrene copolymers and the like.

8. Glycidyl-containing nitrogen compounds, such as diglycidyl aniline and di- and triglycidylamine.
9. Particularly useful epoxy resins for utilizing the curing agents of the invention are the glycidyl ethers and particularly the glycidyl ethers of polyhydric phenols and polyhydric alcohols. The glydicyl ethers of polyhydric phenols are obtained by reacting epichlorohydrin with the desired polyhydric phenols in the presence of alkali. Reaction products of epichlorohydrin with 2,2-bis(4-hydroxyphenyl)propane [bisphenol A] and bis(4-hydroxyphenyl)-propane are good examples of polyepoxides of this type. Other examples include the polyglycidyl ether of 1,1, 2,2-tetrakis(4-hydroxyphenyl) ethane (epoxy value of 0.45 eq./100 g. and melting point 85° C.), polyglycidyl ether of 1,1, 5,5-tetrakis(hydroxyphenyl) pentane (epoxy value of 0.514 eq./100 g.) and the like, and mixtures thereof. Other examples include the glycidated novolacs as obtained by reacting epichlorohydrin with phenolic novolac resins obtained by condensation of formaldehyde with a molar excess of phenol or cresol.

Illustrative of preferred epoxy resin are those listed below. Each of them may be used alone, as the sole epoxy resin component, or in combinations with another epoxy resin. The epoxy resins containing aromatic and cycloaliphatic groups contribute to higher $T_g$s, tensile strengths, toughness, and the like properties. Aliphatic epoxy resins are typically combined with the aromatic types and contribute to the toughness of the resulting cured product. By mixing epoxy resins, with or without hardeners, and careful selection of catalyst, resins with optimized properties for making the composites of the invention are achieved.

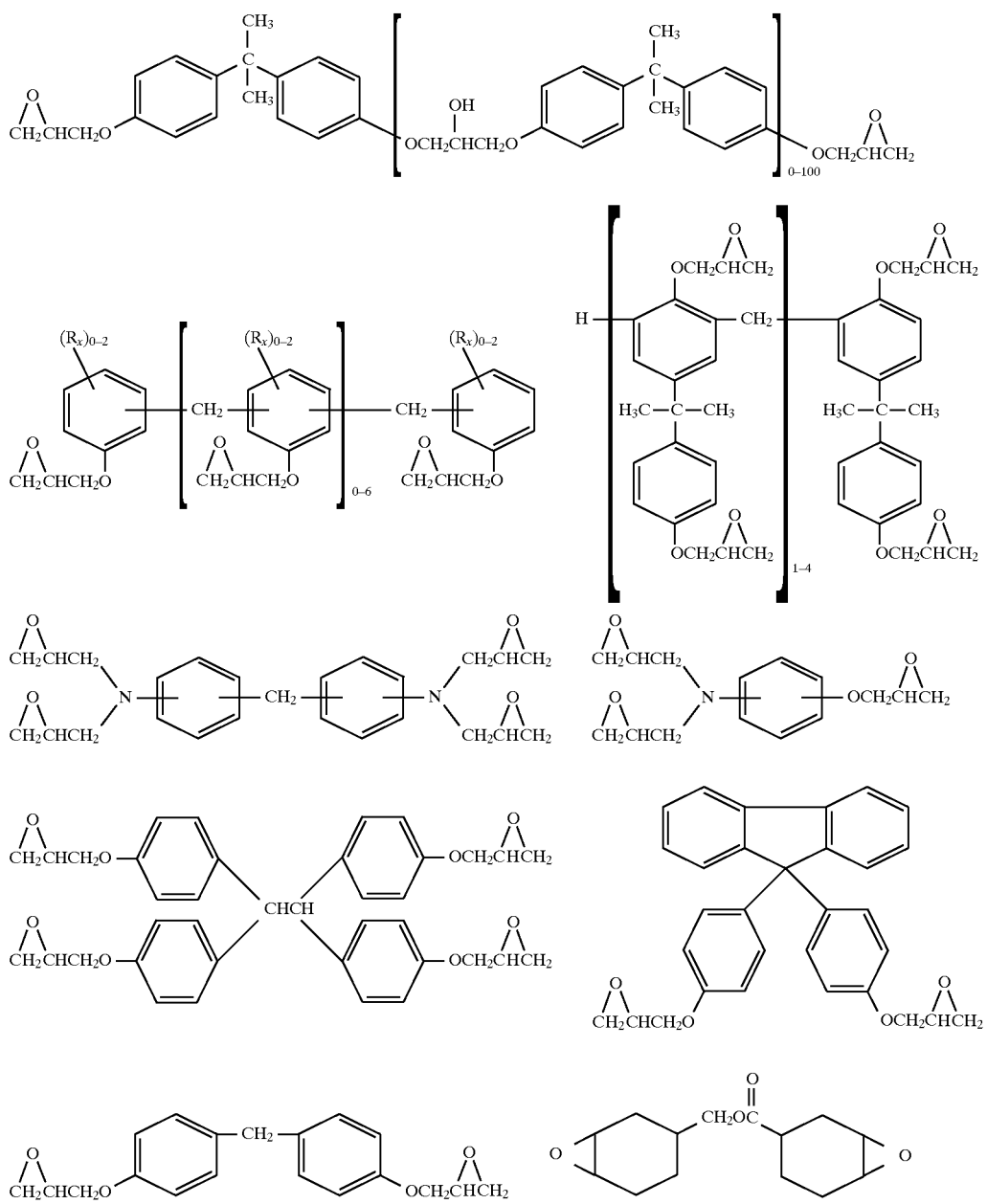

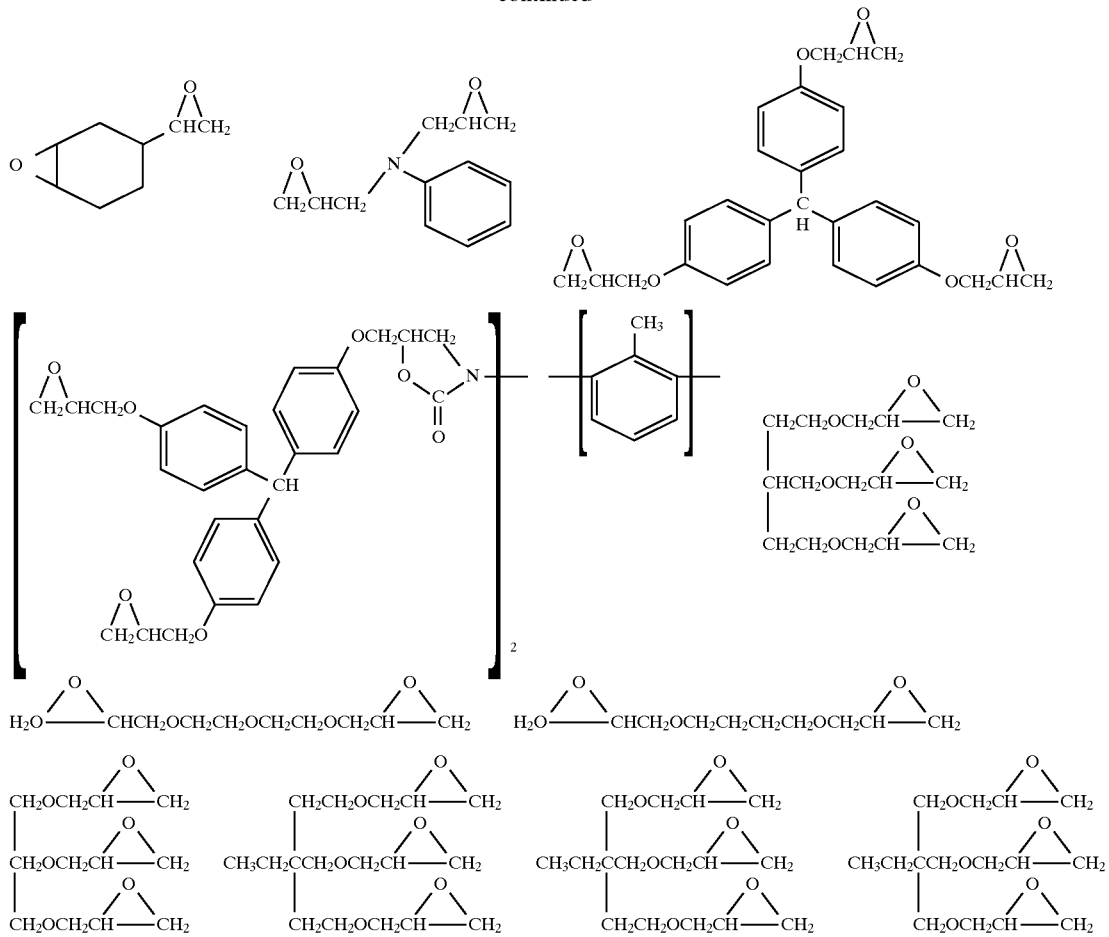

The epoxy resin can be cured into a variety of thermoset cured product by the selection of coreactants, catalyst, curing agent or hardener. If any of the coreactants is capable of curing a three dimensional network structure, then the cured epoxide will be highly crosslinked. If the coreactant is capable of a two dimensional network structure, curing with an epoxy resin will result in a lesser crosslinked structure. If the stoichiometry is carefully controlled, it is possible, but difficult, to make a thermoplastic cured epoxide. For example, the reaction of epichlorohydrin and Bisphenol A can be reacted to produce phenoxy resins, which are thermoplastics. Because the reaction of the oxirane will generate a hydroxyl group and this is sufficient for subsequent reaction with more oxirane to produce a crosslinked network, there are few situations where truly thermoplastic polymers are possible with cured epoxy resins. The least crosslinked structure requires the presence of monofunctional reactants that cap the chain growth through polymerization, or to use a high molecular weight difunctional reactant that introduces the minimum amount of crosslinked structure in the cure product.

Thermal properties of epoxy resins take into consideration the glass transition temperature ($T_g$) of the cured resin. That property is dependent upon the crosslinked density per unit of reactive epoxy, of the cured resin. The higher the crosslinked density coupled with amenable structural characteristics of the resin, the higher will be the resin's $T_g$. A high $T_g$ means that the resin can be used in applications where the product is put to high use temperatures. However, the very nature of high crosslinked density suggests the resin will tend to be brittle, which means the resin will probably be deficient in tensile strength and elongation. The reason for not positively asserting a direct correlation between crosslink density and brittleness, with a deficiency in tensile strength and elongation, derives from the anomalies present in this field that dampens one's positive assertions on correlations of structure with properties.

High ductility in an epoxy resin depends on a resin that is not overly crosslinked because the properties sought, e.g., unrecoverable deformation., plastic flow. i.e., elasticity, pliability, flexibility, etc., is the opposite of brittleness which is a product of high crosslinkage. Tensile strength is the resistance of the cured epoxy resin to a force tending to tear it apart. A truly ductile resin will exhibit a high tensile strength.

The epoxy resins are typically combined with hardeners which cure the resin to a thermoset condition. The preferred hardeners are amine compounds, ranging from dicyandiamide, to ureas, to aliphatic and aromatic amines. An useful class of hardeners are the aromatic amines encompassed by the formula:

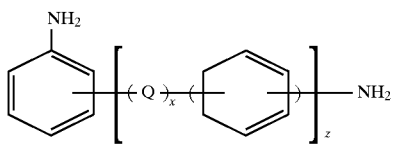

Q is one or more of a divalent group such as —SO$_2$—, —O—, —RR'C—, —NH—, —CO—, —CONH—, —OCONH—, and the like, R and R' may each independently be one or more of hydrogen, phenyl, alkyl of 1 to about 4 carbon atoms, alkenyl of 2 to about 4 carbon atoms, fluorine, cycloalkyl of 3 to about 8 carbon atoms, and the like, x may be 0 or 1, y may be 0 or 1 and is 1 when x is 1, and z may be 0 or a positive integer, typically not greater than about 5.

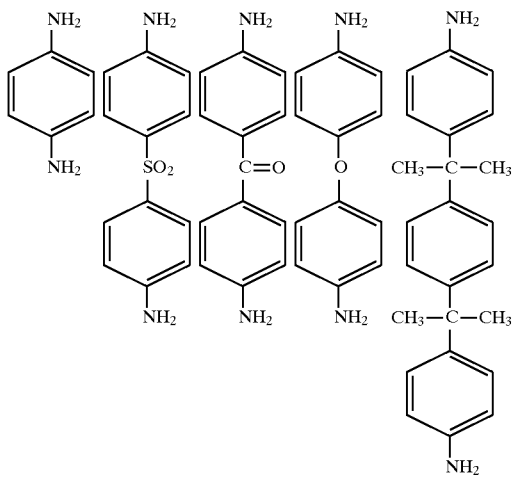

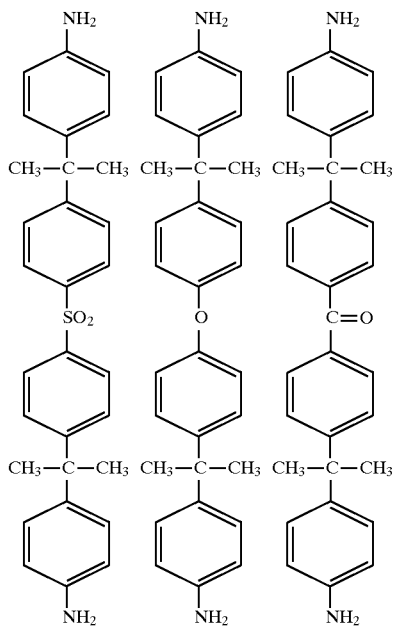

Another preferred class of hardeners are the aliphatic amines such as the alkyleneamines. Illustrative of suitable alkyleneamines are the following: monoethanolamine, ethylenediamine, N-(2-aminoethyl)-ethanolamine, diethylenetriamine, piperazine, N-(2-aminoethyl)-piperazine, triethylenetetramine, tetraethylenepentamine, pentaethylenehexamine, diaminoethylpiperazine, piperazinoethylethylenediamine, 4-aminoethyltriethylenetetramine, tetraethylenepentamine, aminoethylpiperazinoethylethylenediamine, piperazinoethyldiethylenetriamine Another class of hardeners, but which can also be used as extender of the epoxy resin, are the higher molecular weight poly(oxyalkylene) polyamines such as those of the following formulas:

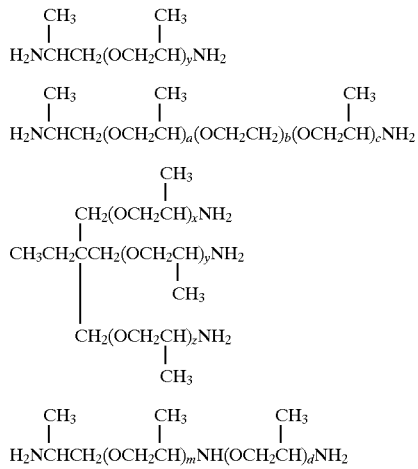

where y is 2–40, a+c is about 2.5 and b is 8–45, x, y and z range from about 2–40, and m+t is about 82–86.

The hardener may be a monoamine such as aniline, paraaminophenol, and alkylated versions of them.

A further class of desirable hardeners are the reaction products of dialkylamines, such as dimethylamine, diethylamine, methylethylamine, di-n-propylamine, and the like, with a variety of mono and diisocyanates to form mono and diureas. Any of the polyisocyanates listed below may be so reacted for use as a hardener. Specific illustration of useful hardeners are those encompassed by the following formulas and descriptions:

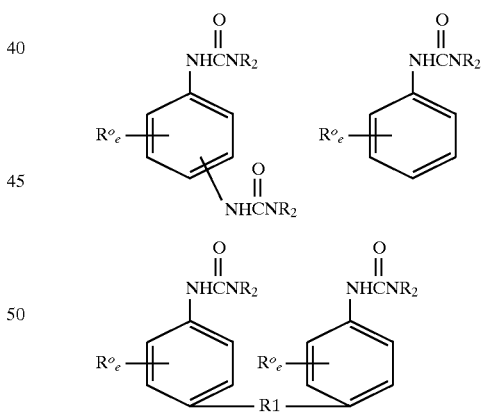

where R is a monovalent organic group; R$^o$ is alkyl, halo, alkoxy, and the like; R1 is methylene, isopropylidene, ethylidene, or a covalent bond; and e is 0–4.

Preferred urea hardeners are those that are the reaction products of dimethylamine with mixtures of 80% 2,4-tolylene diisocyanate and 20% 2,6-tolylene diisocyanate, polymeric isocyanate, p-chlorophenylisocyanate, 3,4-dichlorophenylisocyanate or phenylisocyanate.

A class of hardeners that are widely employed in coating or adhesive epoxy resin systems are the urea-formaldehyde and melamine-formaldehyde resins, including their capped ether derivatives. Such resins have a low degree of polymerization.

The amount of the hardener employed is usually stoichiometrically equivalent on the basis of one amine group per epoxy group in the resin. If the epoxide is a triepoxide and the hardener is a diamine, then the molar ratio of hardener to epoxide would typically be about 2.5/3 or 0.83. A typical formulation would have a weight ratio of epoxy resin to hardener of about 3/2 to about 4/1. Where any of the hardeners serve primarily as extenders of the epoxide resin, then the amount of the hardener in the typical case will be less than that generally employed for hardening the epoxide. Mixtures the above hardeners and with other hardeners are within the contemplation of this invention.

Suitable cure may be obtained by UV mechanisms, where a conventional UV photoinitiator is incorporated into the polymer components, and the composite is subjected to UV radiation. UV cure conventionally operates at lower temperatures. Cure or polymerization is achieved by directing a light of appropriate wavelength and intensity toward the solution. Ultraviolet light is typically used. A mercury lamp which emits light in the 300 to 500 nanometer wavelength range, with the greatest intensity at about 365 nanometers, is preferred. With the assistance of the light energy and the photoinitiator, the monomer polymerizes in a time ranging from a few seconds to a few minutes. The photoinitiator is preferably benzophenone or 2,2-diethoxyacetophenone, but may be any appropriate photoinitiator for the acrylate or acrylate mixture chosen. An effective amount of the photoinitiator, typically about 2 percent, by volume or weight, is supplied.

The solution of the composite's components is stirred until full solution is attained. The solution is then placed into a form that defines its shape upon polymerization of the acrylate. The solution is typically a slightly viscous liquid, so that application to the form is not difficult. The form might be a dish with sides, the space between the electrodes, or otherwise as appropriate.

The composite material active element is prepared by first forming a solution of three components, the liquid crystal material, a monomer that is subsequently polymerized to a polymer that forms the matrix, and a small amount of a photoinitiator that aids in photopolymerization of the monomer. The volume fraction of the liquid crystal is the fraction determined by dividing the volume of liquid crystal added to the solution by the total volume of the solution of liquid crystal, monomers, and photoinitiator, prior to polymerization of the monomers. The volume fraction preferably ranges from about 0.10 (10 percent) to about 0.60 (60 percent). The fraction of the volume of the total solid occupied by liquid crystal droplets, after photopolymerization, is approximately the same as the volume fraction herein defined. However, in some cases it will be slightly lower, as some (up to about 15 percent) of the liquid crystal may remain in solution in the polymer or be trapped within the polymer and not reach the liquid crystal droplets. This slight difference is encompassed within the term "about" as used herein to describe the volume fraction.

The monomer is a monomer of an acrylate, herein defined as a molecule containing the acryloyl group, $CH_2=CHCO-$. Most preferably, the polymer material is polymerized from one or more of the three classes of acrylate monomers that are presently preferred. One is an ester derived from acrylic acid having the structure

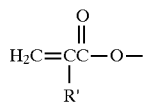

where R is selected from the group consisting of alkyl, aryl, hydroxyalkyl, and epoxyalkyl, R' is hydrogen or methyl. A third monomer for the reaction may be an amide derived from acrylic acid and having the structure

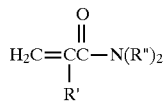

where R" is alkyl, aryl, hydroxyalkyl, and/or epoxyalkyl. Such monomers can be polymerized to the corresponding polymers, in the presence of the photoinitiator, in a relatively short time with ultraviolet light. Mixtures of acrylates can also be used, to achieve particular properties of the matrix.

Additional description of UV cure can be found in Vaz, et al., *Mol. Cryst. Liq. Cryst.*, 146, pp. 1–15 (1987), U.S. Pat. No. 4,944,576 and U.S. Pat. No. 4,971,719. In addition, the cure may be effected by electron beam radiation, as described in U.S. Pat. No. 4,971,719. This technique avoids the use of photoinitiators and utilizes mercaptan activated allyl compounds such as triallyl isocyanurate and and pentaerythritol tetrakis(2-mercapto-propanoate) to form the cured composite.

A commercially available UV curable polymer for polymer dispersed liquid crystal films is SAM114, obtainable from Merck, supra. It is recommended to be used with BL036 and BL038 liquid crystal mixtures. Such a system benefits from the inclusion in the liquid crystal component of MOMs as defined herein.

The polyurethanes typically comprise the reaction of a polyisocyanate, a polyol, alone or with another active hydrogen compound, generally in the presence of a catalyst, such as an amine catalyst. The polyurethane can be the reaction product of a mixture of a blocked polyisocyanate, such as the reaction product of a mono-ol or monohydroxy phenolic compound with a polyisocyanate that is an organic polyisocyanate. This includes an organic compounds that contain at least two isocyanato groups and include the hydrocarbon diisocyanates (e.g., the alkylene diisocyanates and the arylene diisocyanates), as well as known triisocyanates and polymethylene poly(phenylene isocyanates).

Illustrative polyisocyanates for use in making the polyurethanes and the blocked isocyanates are: 2,4'-diisocyanatotoluene, 2,6-diisocyanatotoluene, methylene bis(4-cyclohexyl isocyanate), 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethypentane, 1,9-diisocyanatononane, 1,10-disocyanatopropyl)ether of 1,4-butylene glycol, 1,11-diisocyanatoundecane, 1, 12-diisocyanatododecane, bis (isocyanatohexyl) sulfide, 1,4-diisocyanatobenzene, 2,4-diisocyanatotolylene, 2,6-diisocyanatotolylene, 1,3-diisocyanato-o-xylene, 1,3-diisocyanato-m-xylene, 1,3-diisocyanato-p-xylene, 2,4-diisocyanato-1-chlorobenzene, 2,4-diisocyanato-1-nitrobenzene, 2,5-diisocyanato-1-nitrobenzene, 4,4-diphenylmethylene diisocyanate, 3,3- diphenyl-methylene diisocyanate, polymethylene poly (phenyleneisocyan-ates), isophorone diisocyanate, and mixtures of them.

The preferred polyisocyanates are mixture of 80% 2,4-tolylene diisocyanate and 20% 2,6-tolylene diisocyanate and polymeric isocyanate. The blocked isocyanates comprise any of the above polyisocyanates reacted with a monofunctional hydroxy containing compound. The resultant blocked polyisocyanate is unreactive towards hydroxyl compounds at room temperature but, at elevated temperatures, will function as an isocyanate to crosslink the hydroxyl compounds to form the thermoset resin. For example, an adduct of tolylene diisocyanate and trimethylolpropane is first prepared in solution, followed by the addition of phenol to block the remaining isocyanate groups. Illustrative of such a blocked polyisocyanate is a phenol blocked toluene diisocyanate in cellosolve acetate sold by Mobay Chemical Co., as Mondur S.

The polyols used in forming the polyurethane may be an organic diol, triol, tetraol, pentaol, and the like. Illustrative are the following compounds: ethylene glycol, diethylene glycol, triethylene glycol, tetraethylene glycol, 1,2-propylene glycol, di-1,2-propylene glycol, tri-1,2-propylene glycol, tetra-1,2-propylene glycol, 1,4-butanediol, 1,3-propanediol, and the like; or formed from by the alkoxylation of a starter polyol, such as the class of polyols characterized; or formed from reaction of the above diols, triols, etc., with caprolactone. The resulting ester polyols ("Tone's") are widely used in reactions with isocyanate. Desirable alkoxylated polyols are alkylene oxide adducts of a hydroxylated alcohols of the formula:

$$A(OH)_{>1}$$

and preferably a "starter" diol, triol, tetraol and higher hydroxylated alcohols, of the formula:

$$A(OH)_{\geq 2-6}$$

wherein A is a polyvalent organic moiety, the free valence of which is 2–6 or greater, or an average value equal thereto, as the case may be.

Illustrative of suitable compounds embraced by the "starter" $A(OH)_{\geq 2-6}$ alcohol are the following: ethylene glycol, diethylene glycol, 1,2-propylene glycol, polyethylene glycol, polypropylene glycol, glycerine, pentaerythritol, sorbitol, diether of sorbitol, mannitol, diether of mannitol, arabitol, diether or arabitol, sucrose, mixtures thereof, and the like.

The starter $A(OH)_{\geq 2-6}$ is first reacted with 1,2-alkylene oxide in an amount and under conditions sufficient to convert its hydroxyl groups to hydroxyalkyl groups. The amount of 1,2-alkylene oxide reacted is sufficient to achieve the ultimate molecular weight of the alkoxylated polyol adduct. The molecular weight of the alkoxylated polyol adduct should be relatively high, preferably above about 4000 (number average) and, more preferably, above about 5000. The minimum molecular weight of the alkoxylated polyol adduct may be about 2000. The preferred 1,2-alkylene oxides are lower 1,2-alkylene oxides, such as ethylene oxide, 1,2-propylene oxide, 1,2-butylene oxide, and the like. The resulting polyol may be hydroxyethyl capped by reaction with 1,2-ethylene oxide to provide assurance of primary hydroxyl content in the polyol especially if the alkoxylated polyol adduct is subsequently coupled, not polymerized, with an organic polyisocyanate. Such alkoxylation reactions, with consequent adduct formation, is well known in the art. Adduct reactions may be base or acid catalyzed, with base catalyzation preferred.

The organic polyol may be a polyester polyol, such as a polyester of a dicarboxylic acid, acid halide or anhydride and a polyol, such as those characterized above. In this case, it is desirable to allow the polymer to be hydroxyl terminated, and conventional procedures in the art are useful for this purpose. A polyol is also employed to produce the polyester. Such polyols include ethylene glycol, diethylene glycol, propylene glycol, dipropylene glycol, butylene glycols, neopentyl glycol, glycerol and 1,1,1-trimethylolpropane.

Polyester resins usable as the thermosetting matrix resin, are typically reaction products of a dicarboxylic acid, acid halide or anhydride, with a polyhydric alcohol. The dicarboxylic acids or anhydrides that are employed to produce the polyester, either singly or in combination, include those that contain olefinic unsaturation, preferably wherein the olefinic unsaturation is alpha, beta- to at least one of the carboxylic acid groups, saturated aliphatic, heteroaliphatic and aromatic polycarboxylic acids, and the like. Such acids include maleic acid or anhydride, fumaric acid, methyl maleic acid, and itaconic acid (maleic acid or anhydride and fumaric acid are the most widely used commercially), saturated and/or aromatic dicarboxylic acids or anhydrides such as phthalic acid or anhydride, terephthalic acid, hexahydrophthalic acid or anhydride, adipic acid, isophthalic acid, and "dimer" acid (i.e., dimerized fatty acids). They may be cured by providing a polymerization initiator and low viscosity crosslinking monomers in the formulation. Where the resin is a unsaturated polyester or vinyl ester, it is preferred that the monomers contain ethylenic unsaturation such that the monomer is copolymerizable with the polyester and terminally unsaturated vinyl ester resins. Useful monomers include monostyrene, alkyl acrylates and methacrylates such as $C_{1-12}$ alkyl acrylates and methacrylates, substituted styrenes such as α-methyl styrene, α-chlorostyrene, 4-methylstyrene, and the like, divinylbenzene, acrylonitrile, methacrylonitrile, and the like. Styrene is the preferred monomer in commercial practice today, although others can be used. Suitable polymerization initiators include t-butyl hydroperoxide, t-butyl perbenzoate, benzoyl peroxide, cumene hydroperoxide, methyl ethyl ketone peroxide, and others known to the art. The polymerization initiator is employed in a catalytically effective amount, such as from about 0.3 to about 2 to 3 weight percent, based on the weight of polyester and the crosslinking monomer.

In another embodiment hereof, a material capable of forming liquid crystals is incorporated in a polymeric binder by dissolving or dispersing the former material in a polymer solution or molten polymer, then fabricating the polymer by a suitable technique (solution casting, molding, extrusion, etc.). Following solvent evaporation and/or cooling of molten polymer, the polymer will act as a binder and protective matrix for the liquid crystals. Composites of the invention are obtainable from the use of thermoplastics, in which the organometallic liquid crystal composition, alone or in combination with non-metallic liquid crystals, are dissolved in a melt of the polymer or a solvent solution of the polymer. Suitable thermoplastic materials for use as this polymeric matrix would include the following: polyethylene; polypropylene; poly(1-butene); poly(4-methyl-1-pentene); polyisobutylene; polystyrene; polybutadiene; polychloroprene; poly(methyl methacrylate); poly(ethyl methacrylate); poly (n-butyl methacrylate); poly(vinyl acetate); poly(vinyl alcohol); poly(vinyl chloride); poly(vinylidene chloride); poly(vinyl fluoride); poly(vinylidene fluoride); poly (caprolactam); poly(hexamethyleneadipamide); poly (ethylene terephthalate); polyoxymethylene; poly(ethylene oxide); poly(propylene oxide); poly(phenylene oxide); Bisphenol A polycarbonate; dimethyl polysiloxane; poly(N-vinylpyrrolidinone); poly(ethyleneimine); ethyl cellulose; methyl cellulose; hydroxyethyl cellulose; hydroxypropyl cellulose; sodium carboxymethyl cellulose; cellulose nitrate; cellulose acetate; poly(acrylic acid) and its salts; poly (methacrylic acid) and its salts; polyacrylamide; polyacrylonitrile; poly(methacrylonitrile); poly(caprolactone); phenoxy resins; 2-hydroxyethyl methacrylate polymers; 2-hydroxypropyl methacrylate polymers; acrylonitrile 2-hydroxyethylacrylate copolymers; acrylonitrile 2-hydroxypropylmethacrylate copolymers; ethylene-ethyl acrylate copolymers; ethylenepropylene copolymers; ethylene-vinyl acetate copolymers; vinyl chloride-vinyl acetate copolymers; styrene-butadiene copolymers; styrene-isoprene copolymers; styrene-acrylonitrile copolymers; styrene-methyl methacrylate copolymers; polyvinyl format; polyvinyl butyral; poly(methyl acrylate); poly(ethyl acrylate); poly(-vinyl propionate); ethylene-acrylic acid copolymers and their salts; cellulose acetate; cellulose propionate; cellulose acetate butyrate; poly(diallyl phthalate); poly(decamethylene adipamide) poly(11-aminoundecanoic acid); poly(12-aminododecanoic acid); poly(methyl vinyl ether); poly(isobutyl vinyl ether); and the like. Needless to say, the refractive indices of the liquid crystal components and the polymer has to essentially match to the extent taught in the art in order to obtain operative the electrooptical devices contemplated by the invention.

Other classes of thermoplastic polymers that may be used to encapsulate the liquid crystal combination are described in U.S. Pat. No. 4,913,845. They encompass thermoplastic polymers that exhibit nonlinear optical response. One type is a wholly aromatic polymer containing a recurring benzimidazole, benzthiazole or benzoxazole structure, such as poly-2,2'-(m-phenylene)-5,5'-bibenzimidazole, poly [benzol(1,2-d:4,5-d') bisthiazole-2,6-diyl]-1,4-phenylene, poly[benzol(1,2-d:4,5-d')bisoxazole-2,6-diyl]-1,4-phenylene), and the like, as disclosed in U.S. Pat. Nos. 4,423,202; 4,225,700; 4,463,167; 4,487,735; and 4,579,915.

Another type of suitable thermoplastic polymer is illustrated by a polyacetylenic structure as disclosed in U.S. Pat. No. 4,605,869, which is characterized by the repeating unit:

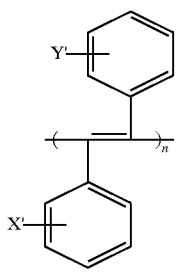

where Y' is an electron-withdrawing substituent such as nitro or cyano; X' is an electron-donating substituent such as dialkylamino or alkoxy, and n is an integer of at least 3.

Another type of suitable thermoplastic polymer is illustrated by a recurring monomeric unit corresponding to the formula:

where P' is a polymer main chain unit, S' is a flexible spacer group having a linear chain length of between about 0–20 atoms, M' is a pendant group which exhibits nonlinear optical response, and where the pendant groups comprise at least about 10 weight percent of the polymer.

Polymers corresponding to the above formula are disclosed in U.S. Pat. No. 4,694,066, such as poly[6-(4-nitrobiphenyloxy)hexyl methacrylate]; poly[4-[N-(2-methacroyloxyethyl)-N-methylamino]-4'-nitrostilbene]; poly [4-(4-methacroyloxypiperidyl)-4'-nitrostilbene]; and the like.

Other applicable thermoplastic polymers are the electrical conductive polymers described in SPIE, 682, 77 (1986), and in Macromolecules, 20, 2023 (1987).

A polymer system that can be viewed as thermosplastic or thermosetting is one which employs a linear polymer that contains pendant functional groups, through which crosslinking can be effected. For example, poly (glycidylmethacrylate) can be a linear polymer with a high molecular weight. It can be melt mixed with an epoxy hardener, such as the urea-formaldehyde or melamine-formaldehyde resin, with a delayed reacting catalyst, or without a catalyst, and in that form, function as a thermoplastic in blending in the organometallic liquid crystal containing component to form the uncured composite. The composite may then be heated sufficient high enough to kick off the reaction between the epoxy resin and the hardener, thereby curing the epoxy resin. Many such polymers exist. They may contain hydroxyl, epoxy, amine, isocyanato, and the like, functionality and the hardener contain a complementary functional group that will crosslink the polymer. U.S. Pat. No. 5,116,528 describes the use of a linear polyisocyanate that is crosslinked. Many of the NCAP resin systems are amenable to such crosslinking. For example, copolymers of ethyl acrylate and 2-hydroxyethylacrylate or the methacrylate version, are a particularly suitable class of thermoplastics that can be crosslinked by a variety of complementarily functional compositions, such as polyisocyanates, urea-formaldehyde or melamine-formaldehyde resins, and the like.

The NCAP system encompasses an encapsulating material for maintaining the droplet size of the liquid crystal. The encapsulating material may be one or a combination of a gelatin-gum arabic system (with or without aldehydic crosslinking agents), a polyvinyl alcohol-based system, a zein-based system, or phenol-plast or amino-plast condensates, e.g., phenol-formaldehyde, resorcinol-formaldehyde, urea-formaldehyde-based systems, etc. After encapsulation, a variety of natural and synthetic polymeric materials can be employed to constitute the polymeric binder matrix of the encapsulated liquid crystal layer component. Any transparent or substantially transparent polymeric material can be used. Usually such binder has an index of refraction in the range of about 1.40 to about 1.70. Suitable polymeric materials for this purpose include, but are not limited to, the following: poly(alkyl acrylates) and poly(alkyl methacrylates), e.g., poly(methylacrylate), poly (ethylacrylate), poly(n-butylacrylate), poly (methylmethacrylate), poly(n-butylmethacrylate), etc.; poly (vinylalcohol); gelatin; latex (natural rubber and synthetic rubber latexes); zein, polyethylene homo-and copolymers; poly-propylene homo-and copolymers; and the like. The encapsulated liquid crystals can be associated intimately with the polymer binder in a variety of ways. For example, the capsule-binder mixture can be deposited onto a polymer film, e.g., as a coating simply by spraying from a dispersion or emulsion of the encapsulated liquid crystal in a binder or by screen printing.

The devices of the invention encompass a thermally, electrically, magnetically and/or electromagnetically addressable liquid crystal optical/display cell. For example, in the case of an liquid crystal electro-optical cell, it has a volume of the liquid crystal-polymeric composite of the invention between two closely spaced electrodes in which the liquid crystal discontinuous phase is responsive to an applied voltage between the electrodes, such that light transmittance through the liquid crystal material is selectable depending upon the resulting electric field strength, current flow, or change passed through the cell. The cells typically contain sealant layers, support layers of transparent, electrically conductive film having sufficient supporting strength to maintain the structural integrity of the cell; polarizer elements when desirable; and associated adhesives, and the like.

The electro-optical liquid crystal cells can be conveniently fabricated by a variety of techniques known in the art. The present invention is particularly well suited for the preparation of large pieces of the composite material, from which smaller pieces can be later cut and used in fabricating a cell. For example, the cell can consist of two plastic sheet electrodes made conductive by means of a tin oxide coating, separated by a melt or solution-formed microdispersion of liquid crystal composite-forming material, the preparation of which is described by P. S. Drzaie, "Polymer Dispersed Nematic Liquid Crystal For Large Area Displays and Light Valves", J. Appl. Phys. 60(6) Sept. 15, 1986. Alternately, one electrode of the electro-optical liquid crystal cells can result from a conductive coating, such as tin oxide, applied to a glass pane. This conducting glass pane can then be coated by the composite composition which is then covered with a conductive plastic sheet to complete the cell. The organometallic liquid crystal need not be solely included in a microdispersion resulting in the desired composite but can also be deposited as a distinct layer above, below and/or between layer of the composite, provided with its electro elements, conceptionally similar to that described in "Topics in Applied Physics", Vol. 40, "Display Devices", edited by J. I. Pankove, Springer-Verlag, New York (1980).

The device of the invention with organometallic liquid crystals in the discontinuous phase, typically in the shape of microdroplets, having an index of refraction $n_s$, in a continuous phase polymeric matrix, will either scatter or transmit incident light depending on the relationship among the indices of refraction and dependent upon the microdroplets being of a size to scatter incident light, e.g., on the order of 0.1 to 10 microns. In the absence of an applied field, the optic axes of the microdroplets have no preferred direction, and the incident light encounters a mismatch between the $n_p$ of the matrix and the $n_{eff}$ of the microdroplets. This results in light being scattered and the device appears opaque. With application of an electric field across the sheet of organometallic liquid crystalline-polymeric composite material, the optic axes aligns parallel to the field and normal to the surface of a sheet of the composite. Incident light detects no mismatch between $n_o$ and $n_p$ and is transmitted so that the device appears transparent.

The liquid crystal devices of the invention may or may not have an image memory. Images formed by contrasting opaque and clear areas are displayed on these devices by the constant application of a field to those areas desired to appear clear. Once the field is removed, the clear areas switch back to opaque in less than about 200 milliseconds, typically less than about 150 milliseconds and in a preferred embodiment, less than about 50 milliseconds. The liquid crystal-polymer composite of the invention can have optical memory in that light scattering devices that include the composite can be manipulated to display contrasting opaque and clear areas which are field independent. Memory is made possible by the selection of a liquid crystal which remains in the liquid crystalline state at temperatures above the softening temperature of the polymer. The liquid crystal is in the liquid crystalline state while the polymer is soft and as a result, the optic axes of the discontinuous phase microdroplets can be aligned by an external field. Maintaining the external field in the course of rehardening the polymer provides a composite in which the microdroplets exposed to the field remain aligned upon the field's removal. With an external field applied to the entire surface of the composite film during hardening of the thermoplastic results in a wholly transparent material; a patterned field as, fo instance, an alphanumeric character, applied during hardening of the polymer will result in a material displaying a clear transmitting character in an opaque (scattering) field. The clear area or areas will remain so until the random alignment of the optic axes is restored by reheating the material and cooling it in the absence of a field.

The novel liquid crystal-polymer composite display material of the invention exhibit low millisecond switching times and an electrooptic memory operating at reduce their turn-on times and voltages as compared conventional NCAP and polymer dispersed liquid crystal materials. This is illustrated in the following table:

| Standard Epoxy PDLC Film* With Commercial Liquid Crystal Mixture. (A) | Additive** To (A) | | $\tau_{on}$ | $\tau_{off}$ |
|---|---|---|---|---|
| Sample No. | Type | % wt. | msec | msec |
| 1 | 0 | 0 | 46 | 160 |
| 2 | 0 | 0 | 46 | 150 |
| 3 | 0 | 0 | 63 | 110 |
| 4 | Formula (2a) with Ni | 1.0 | 35 | 145 |
| 5 | Formula (2a) with Ni | 6.5 | 7 | 130 |
| 6 | Formula (2a) with Pd | 1.0 | 59 | 90 |
| 7 | Formula (2a) with Pd | 6.5 | 11 | 48 |
| 8 | Formula (2a) with Cu | 10.0 | 25 | 105 |
| 9 | Formula (13) With Ir | 1.0 | 17 | 35 |

*The epoxy resin film has a thicknesses of d = 10 μm and made from Epon 828, a diglycidyl ether of Bisphenol A, Capcure 3800, having the formula R—[—O—(C$_3$H$_6$—O)$_2$—CH$_2$—CH(OH)—CH$_2$—SH]$_3$ as the hardener, Heloxy5048, having the formula:

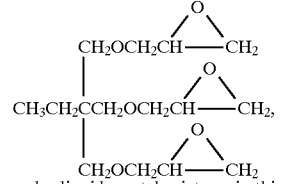

and a liquid crystal mixture, in this case, TNO623.

The switching time of the polymer dispersed liquid crystal is affected by the microdroplet size and the relative larger microdroplet sizes and values of $n_s$ and $n_o$. For instances, values of $n_s$ greater than $n_o$ generally yield longer switching times. Normally, the indices of refraction of liquid crystals cannot be altered without significantly altering their other properties and rendering them less useful for display purposes. The material of the present invention allows for the fine adjustment of the index of refraction $n_s$ of the plastic in which the liquid crystal is entrapped. The index of refraction $n_s$ of the plastic can be adjusted to match, or to mismatch in a specified way, the ordinary index of refraction $n_o$ of the liquid crystal. This adjustment regulates transparencies and switching times of the materials to optimize materials for specific applications.

Pleochroic dyes (viz., dichroic, trichroic) have been mixed with liquid crystals to form a solution therewith. The molecules of the dyes generally align with the molecules of liquid crystals, so that the application of the electric field affects not only the predominant alignment of the liquid crystals, but also of the dye. As the extent of the absorption of incident light by the dye depends on its orientation relative to the incident light, the application of an external stimulus to a liquid crystal-dye combination also provides a means for the controlled attenuation of light. These dyes may be used in encapsulated liquid crystals, as described in the aforementioned Fergason patents, or in non-encapsulated systems, as described in Goldmacher et al., U.S. Pat. No. 3,499,702 (1970) and Heilmeier, U.S. Pat. No. 3,551,026 (1970). Thus, color images can be created by using the dyes, with arrays of individually colored pixels within each layer being created by selective deposition, for example by screen printing. Thus, a layer capable of displaying colored images can be formed by depositing side by side red, blue, and green pixels. Alternatively, for a monochromic (sometimes called black and white) display, the pixels need not be colored, and can simply switch between a substantially transparent state and a substantially non-transparent state which is black or gray. Preferably, at least two of the display material layers are the same; that is, have pixels with the same chromatic characteristics-all black-and-white pixels, all pixels of the same color, or the same groupings of red, green, and blue pixels. More preferably, each of the display material layers in the display are the same.

However, there is an inherent disadvantage to the use of such dyes. With time, they become unstable. With instability comes a fading of the color in the composite. This inherent color instability is overcome in this invention because many of the organometallic liquid crystals are colored.

Epoxy resins are probably the most thoroughly studied polymer dispersed liquid crystal binders. They are convenient to use for several reasons. It is easy to mix epoxy resins having different refractive indices to produce a binder with a refractive index precisely matched with the ordinary refractive index of the liquid crystal. A common epoxy resin for this application is a mixture of a diglycidyl ether of bisphenol A (i.e., 2,2-bis (4-hydroxyphenyl)propane) and the triglycidylether of trimethylolpropane, cured with a trifunctional mercaptan terminated liquid polymer. The components are mixed starting with the most viscous, the trifunctional mercaptan terminated liquid polymer and ending with the least viscous. Finally, the appropriate amount of liquid crystal is added. The liquid crystal will either be the organometallic mesogen or a mixture of the organometallic mesogen and another non-metallic organic liquid crystal. The components are thoroughly mixed. Thorough mixing is important for uniform results. The mix is then degassed, such as by centrifugation. This usually takes several minutes.

Shutters of the invention are fabricated using conducting glass substrates. Glass or polystyrene spacers are used to control film thickness. The spacers are sprinkled over one substrate prior to pouring onto it the polymer dispersed liquid crystal formulation. The electrooptical cells are drop filled with an excess of the polymer dispersed liquid crystal formulation being poured on the glass substrate and a second glass substrate is added, pressing until it contacts the spacers. For small shutters (1 in$^2$), manual pressing may be used to place the top substrate. Contact of the glass spacers can be easily felt. A vacuum press should be used for larger polymer dispersed liquid crystal films. In each instance, the samples are cured with no external pressure.

The polymer dispersed liquid crystal shutter is cured in a convection oven set to the appropriate temperature. For example, the polymer dispersed liquid crystal shutter is placed on a thick (>¼inch) aluminum sheet covered with aluminum foil. Adhesive tape is used to hold the shutters in position during cure. The droplet size of the polymer dispersed liquid crystals depends on the cure temperature. It is important that the samples be left in long enough for droplet formation and growth and polymer gelation. In general, the samples cannot be over cured.

Once the polymer dispersed liquid crystal has cured, the samples are cleaned. Excess material is removed with a razor blade and the surfaces are cleaned with a cloth and acetone.

A slightly different technique is used to make polymer dispersed liquid crystal with a thermoplastic polymers. For example, polymer dispersed liquid crystals can be made with polymethylmethacrylate and the liquid crystal mixture of the invention. First, the thermoplastic is dissolved in an appropriate solvent such as chloroform or methylene chloride. Usually, a 5–20 weight % solution of the thermoplastic is made. Then the appropriate amount of the liquid crystal component of the invention is added. Usually, more liquid crystal is added in thermoplastics (50–75%) than in epoxies (30–45%).

The resulting thermoplastic liquid crystal solution is poured on a conducting substrate. The solvent is allowed to evaporate. Usually, the solvent is removed at room temperature followed by heating to about 100° C. on a hot plate for several minutes to drive off any residual solvent. Spacers are then sprinkled over the substrate and a second substrate is added. The sandwich is heated to the point where the formulation melts (for example, polymethylmethacrylate containing a liquid crystal mix of E7 and an organometallic liquid crystal will melt at about 100° C). Pressure is applied to contact the two substrates with the spacers. The film is then cooled at a controlled rate; the faster the cooling, the smaller the droplets. Once cooled to room temperature the shutter is cleaned and is ready for characterization. The thermoplastic polymer dispersed liquid crystal shutters can be reprocessed by warming above the melting point and recooling. The droplet size can be changed by changing the cooling rate.

In the case of thermoplastics that can be subsequently crosslinked such as through residual hydroxyl groups, by reaction with a diisocyanate additive, the crosslinking occurs slowly so that the polymer dispersed liquid crystal can be formed using the simple techniques of a thermoplastic. Over several days the thermoplastic crosslinks and the morphology of the polymer dispersed liquid crystal is permanently locked in.

The easiest polymer dispersed liquid crystals to make are the photo-cured systems. The liquid crystal is mixed with a photo-cured monomer and the resulting low viscosity solution is sandwiched between two substrates with spacers to control thickness. UV irradiation results in polymerization of the photo-cured monomer and droplet formation. In this case the droplet size of the polymer dispersed liquid crystal film depends on temperature and the intensity of the radiation used to cure the film. In general, the higher the intensity, the smaller the droplets.

As can be appreciated by virtue of the significant property differences between MOMs and the conventional liquid crystal, the control over kinetics of phase separation and resin curing in the process of making the polymer dispersed liquid crystal composite allows one to improve the contrast ratio (transparency/opacity) of polymer dispersed liquid crystal films by controlling (i) the solubility of liquid crystal in the resin, (ii) the rate of droplet formation, (iii) controlling the rate of polymer solidification, and (iv) controlling the liquid crystal droplet morphology (size, density). The extra variable imparted by the presence of the MOM in the discontinuous phase, which in the normal situation, will migrate to some extent into the polymer phase, will affect all of the components of the composite allowing a unique control over droplet formation and polymer solidification.

Last, but not least, it is the objective of the invention to improve the electrooptical performances of polymer dispersed liquid crystal films by frequency variations through frequency modulated resistivity changes in polymer dispersed liquid crystals.

In measuring the electrooptic performance of the polymer dispersed liquid crystal shutters, it is desirable to measure the driving voltage, switching speeds and contrast. One can apply a variety of pulses ranging from DC pulses to high frequency gated sign waves. The electrooptic performance is often a sensitive function of the driving pulse. Both white light and laser light sources may be used in this measurement.

The electrophotometric system of Peregrine Optifilm Inc., DePere, Wis. 54115 was used for measurement of the electro-optics of the polymer dispersed liquid crystal composition of the examples that follow. In the examples, with exception of the liquid crystal component, the composition for the epoxy resin ("EP resin" in the examples) was 9.1 wt. % Epon-828 (Shell Chemical Co., distributed by Miller-Stephenson Chemical Co., Morton Grove, Ill. 60053, U.S.A.), 33.8 wt. % Capcure 3800 (Miller-Stephenson Chemical Co., Morton Grove, Ill. 60053, U.S.A.), 17.1 Heloxy WC-97 (Wilmington Chemical Corp., Wilmington, Del. 19899 U.S.A.), with the remainder, 40 wt. % being the liquid crystal mixture of choice, e.g., as stated in the examples. The components of the formulation are mixed to form a solution, and then centrifuged to remove air bubbles. Glass or polystyrene spacer bids (~20 microns thick) are sprinkled on a surface of ITO-coated glass plate. The solution is poured on the glass plate surface and is sandwiched with another ITO-coated glass plate. The film is cured at 100° C. in an oven for at least 30 minutes, typically for 2 hours. Phase separation occurs during curing. The liquid crystal microdroplets are formed during curing and their size and distribution depend on the curing temperature and time. After curing, the film is cooled at room temperature and is ready for testing and characterization.

A suitable solvent cast thermoplastic polymer dispersed liquid crystal formulation would include 4.0 wt. % polymethacrylate with an average molecular weight of about 12,000, 6.0 wt. % of the liquid crystal mixture of choice, such as the mixtures stated in the examples, and 90 wt. % of chloroform. The formulation is coated on ITO-coated glass with spacers, the solvent is evaporated by heating on a hot plate at 150°–200° C. and then another ITO-coated glass sheet is pressed on the film. Droplet size is controlled by cooling rate as noted above.

A suitable UV-cured polymer dispersed liquid crystal film is made from 50 wt. % Norland Optical Adhesive, such as NOA65 (Norland Products, Inc., New Brunswick, N.J. 08902 U.S.A) and 50 wt. % of the liquid crystal of choice such as those stated in the examples. Glass spacers (~20 microns) are added to the solution. The mixed solution is centrifuged to remove air bubbles and then left in a 100° C. oven for about 2 minutes to about 1 hour. The coating procedure employed above, without solvent evaporation, is used followed by curing by exposure to UV light in a UV oven with constant radiation intensity for about 30 minutes.

The examples that follow are not intended to limit the scope of the invention. They are intended only for exemplification of the invention.

EXAMPLE 1

A polymer dispersed liquid crystal film sample made by formulating EP resin and E7 liquid crystal mixture into a film according to the above procedure with a thicknesses of d=10 $\mu$m were prepared under the same curing conditions, with and without a copper-complex metalloorganic mesogen (organometallic liquid crystal) of formula (2A), supra, where n=9 and m=8 ("additive"). The composition of organometallic liquid crystal relative to liquid crystal E7 were within 1–10% w/w range. The electro optical responses of these polymer dispersed liquid crystal films, as tabulated below, showed improvements in the operating voltages and Of/On-state transmittances with respect to those of the sample without organometallic liquid crystal (see Example 2):

| Sample | Additive (% w/w) | $V_{10}$ (volts) | $V_{90}$ | $T_{Off}$ Transmission (%) | $T_{On}$ |
|---|---|---|---|---|---|
| 1a | 0 | 14 | 31 | 1.6 | 97.1 |
| 1b | 1% | 9 | 16 | 1.3 | 99.9 |
| 1c | 2% | 10 | 14 | 0.5 | 99.8 |
| 1d | 7% | 11 | 23 | 0.9 | 96.0 |

EXAMPLE 2

A polymer dispersed liquid crystal film samples made by mixing and curing EP resin and TNO623 liquid crystal and the thickness of d=10 $\mu$m were prepared as described above, under the same curing conditions, with and without polystyrene (PS) additives having the molecular weights within 875–5970 range. The composition of PS relative to liquid crystal TNO623 was 1% w/w. The electro-optical responses of these polymer dispersed liquid crystal samples, as tabulated below, showed increase in the operating voltages and decrease in opacity and transmittance with respect to those of the sample without PS (compare with Example 1):

| Sample | Additive (M.W.) | $V_{10}$ (volts) | $V_{90}$ | $T_{Off}$ Transmission (%) | $T_{On}$ |
|---|---|---|---|---|---|
| 2a | 0 | 16 | 25 | 0.9 | 91.6 |
| 2b | PS (875) | 17 | 27 | 0.8 | 93.2 |
| 2c | PS (2350) | 17 | 37 | 0.9 | 88.4 |
| 2d | PS (5970) | 16 | 37 | 1.5 | 72.6 |

EXAMPLE 3

Polymer dispersed liquid crystal film sample made by formulating EP resin and TNO623 liquid crystal into a film according to the above procedure with a thicknesses of d=10 $\mu$m were prepared under the same curing conditions, with and without a copper-complex metalloorganic mesogen (organometallic liquid crystal) of formula (2A), supra, where n=7 and m=8 ("additive"). The composition of organometallic liquid crystal relative to liquid crystal TNO623 were within 1–7% w/w range. The electro-optical responses of these polymer dispersed liquid crystal samples, as tabulated below, showed improvements in the operating voltages with respect to those of the sample without organometallic liquid crystal (see Example 4):

| Sample | Additive (% w/w) | $V_{10}$ (volts) | $V_{90}$ | $T_{Off}$ Transmission (%) | $T_{On}$ |
|---|---|---|---|---|---|
| 3a | 0 | 16 | 25 | 0.9 | 91.6 |
| 3b | 1% | 8 | 14 | 1.1 | 91.6 |
| 3c | 2% | 8 | 13 | 0.7 | 89.4 |
| 3d | 7% | 8 | 14 | 1.3 | 76.5 |

EXAMPLE 4

Polymer dispersed liquid crystal film samples with the formulation EP resin and E7 liquid crystal and the thickness of d=10 μm were prepared under the same curing conditions, with and without polystyrene (PS) additive having the molecular weight of 2350. The composition of PS relative to liquid crystal E7 were within 1–5% w/w range. The electro-optical responses of these polymer dispersed liquid crystal samples, as tabulated below, showed increase in the operating voltages and decrease in opacity and transmittance with respect to those of the sample without PS (compared with Example 3):

| Sample | Additive (% w/w) | $V_{10}$ (volts) | $V_{90}$ | $T_{Off}$ Transmission (%) | $T_{On}$ |
|---|---|---|---|---|---|
| 4a | 0 | 16 | 35 | 0.4 | 96.5 |
| 4b | 1% | 19 | 40 | 0.7 | 94.9 |
| 4c | 2% | 20 | 43 | 0.8 | 82.5 |
| 4d | 5% | 18 | 46 | 1.3 | 70.2 |

EXAMPLE 5

Polymer dispersed liquid crystal film samples with the formulation EP resin and TNO623 liquid crystal and the thicknesses of d=10 μm were prepared under the same curing conditions, with and without a Palladium-complex metalloorganic mesogen (organometallic liquid crystal) of formula (2A), supra, where n=8 and m=1. The composition of organometallic liquid crystal relative to liquid crystal TNO623 were within 0.5–6% w/w range. The electro-optical responses of these polymer dispersed liquid crystal samples, as tabulated below, showed improvements in the operating voltages and Off/On-state transmittances with respect to those of the sample without organometallic liquid crystal:

| Sample | Additive (% w/w) | $V_{10}$ (volts) | $V_{90}$ | $T_{Off}$ Transmission (%) | $T_{On}$ |
|---|---|---|---|---|---|
| 5a | 0 | 12 | 20 | 0.5 | 88.1 |
| 5b | 0.5% | 10 | 16 | 0.6 | 91.3 |
| 5c | 1% | 8 | 14 | 1.1 | 91.4 |
| 5d | 2% | 11 | 18 | 0.6 | 91.0 |
| 5e | 6% | 15 | 24 | 1.6 | 93.9 |

EXAMPLE 6

Polymer dispersed liquid crystal film samples with the formulation of EP resin and TNO623 and the thicknesses of d=10 μm were prepared under the same curing conditions. The samples contained 1% w/w metalloorganic mesogens (organometallic liquid crystal) each having the structure of formula (2A), supra, containing Copper (Cu), Nickel (Ni) or Palladium (Pd) metal complexes (with the indicated n-m values) with respect to TNO623. The electro-optical responses and LC droplet sizes (<D>) of these polymer dispersed liquid crystal samples were studied and, as tabulated below, showed improvements in their operating voltages with respect to those of the sample without organometallic liquid crystal:

| Sample | Metal Complex | $V_{10}$ (volts) | $V_{90}$ | $T_{Off}$ Transmission (%) | $T_{On}$ | <D> (μm) |
|---|---|---|---|---|---|---|
| 6a | 0 | 10 | 16 | 1.8 | 95.3 | 1.6 |
| 6b | 7-8Cu | 7 | 12 | 1.9 | 88.7 | 1.5* |
| 6c | 9-8Cu | 8 | 14 | 1.1 | 91.6 | 1.7 |
| 6d | 8-1Ni | 9 | 15 | 1.3 | 94.1 | 0.94 |
| 6e | 8-1Pd | 10 | 17 | 1.7 | 94.8 | 0.98 |

*Estimated value.

Polymer dispersed liquid crystal film samples with the formulation of EP resin and TNO623 and the thickness of d=10 μm were prepared under the same curing conditions. The samples contained a) 1% w/w metalloorganic mesogens with Copper (Cu) complex of formula (2A) where n=7 and m=8, b) 1% w/w Polystyrene (PS) having NW=2350, and c) a standard without any additive. The resistivity of the samples as a function of applied frequency studies and, as tabulated below, showed that the frequency-dependency of resistivity in the sample with organometallic liquid crystal is reduced, whereas that with PS is increased, with respect to the frequency-dependency of resistivity in the standard.

| 7a) (TNO623 + 1% 7-8Cu): | | | | | | | |
|---|---|---|---|---|---|---|---|
| f(kHz): | 0.1 | 0.2 | 0.5 | 1 | 2 | 5 | 10 |
| ρ($10^9$0.m): | 13.5 | 13.4 | 12.3 | 9.8 | 6.3 | 2.4 | 1.0 |
| 7b) (TNO623 + 1% PS-2350): | | | | | | | |
| f(kHz): | 0.1 | 0.2 | 0.5 | 1 | 2 | 5 | 10 |
| ρ($10^9$0.m): | 21.0 | 20.0 | 17.1 | 13.0 | 7.7 | 2.7 | 1.1 |
| 7c) (TNO623): | | | | | | | |
| f(kHz): | 0.1 | 0.2 | 0.5 | 1 | 2 | 5 | 10 |
| ρ($10^9$0.m): | 17.6 | 16.9 | 14.5 | 10.8 | 6.4 | 2.2 | 0.9 |

EXAMPLE 8

Polymer dispersed liquid crystal film samples with the formulation EP resin and E7 and the thickness of d=10 μm were prepared under the same curing conditions. The samples contained a) 2% w/w metalloorganic mesogens with Copper (Cu) complex of formula (2A) where n=9 and m=8, b) 2% w/w Polystyrene (PS) having MW=2350, and c) a standard without any additive. The resistivity of the samples as a function of applied frequency studied and, as tabulated below, showed that the frequency-dependency of resistivity in the sample with organometallic liquid crystal is reduced, whereas that with PS is increased, with respect to the frequency-dependency of resistivity in the standard.

| 8a) (E7 + 2% 9-8Cu): | | | | | | | |
|---|---|---|---|---|---|---|---|
| f(kHz): | 0.1 | 0.2 | 0.5 | 1 | 2 | 5 | 10 |
| ρ($10^9$0.m): | 8.8 | 8.8 | 8.5 | 7.5 | 5.6 | 2.4 | 0.9 |

-continued

| 8b) (E7 + 2% PS-2350): | | | | | | | |
|---|---|---|---|---|---|---|---|
| f(kHz): | 0.1 | 0.2 | 0.5 | 1 | 2 | 5 | 10 |
| $\rho(10^6 \Omega.m)$: | 14.2 | 13.8 | 12.4 | 10.2 | 6.7 | 2.7 | 1.1 |
| 8c) (E7): | | | | | | | |
| f(kHz): | 0.1 | 0.2 | 0.5 | 1 | 2 | 5 | 10 |
| $\rho(10^6 \Omega.m)$: | 12.3 | 12.4 | 11.3 | 9.2 | 6.0 | 2.3 | 0.9 |

EXAMPLE 9

Polymer dispersed liquid crystal film samples with the formulation EP resin and E7 and the thickness of d=10 μm were prepared under the same curing conditions, with and without a copper-complex metalloorganic mesogen (organometallic liquid crystal) of formula (2A) where n=7 and m=8. The composition of organometallic liquid crystal relative to liquid crystal E7 were within 1–6.5% w/w range. The On-state transmittance as a function of the angle of ortation of the films. The electro-optical responses, as presented in the following and figure, indicate an increase of on-state transmittance at larger in the polymer dispersed liquid crystal films with organometallic liquid crystal compared to that without additive.

EXAMPLE 10

Polymer dispersed liquid crystal film samples with the formulation EP resin and TNO623 and the thickness of d=10 μm were prepared under the same curing conditions. The samples contained 1% w/w metalloorganic mesogens (organometallic liquid crystal) of the structure of formula (2A) containing Copper (Cu), Nickel (Ni) and Palladium (Pd) (with n-m indicated in the tables below) with respect to TNO623. The electro-optical responses of these films were studies and, as presented in the following table and figure below, show improvements in their on-state transmittance with respect to that in the sample without additive.

The Effects of Metalloorganic mesogens on the Angular Dependence of the Electro-Optical Properties of Polymer Dispersed Liquid Crystal Films (d = 10 μm, f = 100 Hz)

| Angle[a] | Voltage (Volts) | | Transmission (%) | |
|---|---|---|---|---|
| (Degree) | $V_{10}$ | $V_{90}$ | $T_{Off}$ | $T_{On}$ |
| 10a (TNO623): | | | | |
| 0 | 10 | 16 | 1.84 | 95.3 |
| 10 | 10 | 17 | 1.59 | 91.7 |
| 20 | 10 | 18 | 1.51 | 92.4 |
| 30 | 10 | 21 | 1.45 | 88.7 |
| 40 | 10 | 25 | 1.34 | 76.2 |
| 50 | 11 | 28 | 1.19 | 57.2 |
| 60 | 10 | 28 | 1.02 | 41.5 |
| 70 | 10 | 28 | 1.03 | 31.6 |
| 10b (TNO623 + 1% 7-8Cu): | | | | |
| 0 | 7 | 12 | 1.88 | 88.7 |
| 10 | 7 | 12 | 1.87 | 88.8 |
| 20 | 7 | 13 | 1.80 | 90.1 |
| 30 | 7 | 15 | 1.35 | 89.5 |
| 40 | 8 | 18 | 1.54 | 84.8 |
| 50 | 8 | 23 | 1.39 | 73.6 |
| 60 | 8 | 28 | 1.15 | 58.4 |
| 70 | 8 | 31 | 1.11 | 43.8 |
| 10c (TNO623 + 2% 7-8Cu): | | | | |
| 0 | 7 | 13 | 1.90 | 92.0 |
| 10 | 7 | 13 | 1.91 | 92.0 |
| 20 | 7 | 14 | 1.81 | 94.0 |
| 30 | 8 | 16 | 1.68 | 93.0 |
| 40 | 8 | 19 | 1.59 | 88.8 |
| 50 | 8 | 25 | 1.45 | 76.3 |
| 60 | 8 | 27 | 1.17 | 59.9 |
| 70 | 8 | 29 | 0.94 | 51.2 |
| 10d (TNO623 + 6.5% 7-8Cu) | | | | |
| 0 | 9 | 16 | 1.99 | 86.2 |
| 10 | 9 | 16 | 2.03 | 87.5 |
| 20 | 9 | 16 | 1.91 | 89.8 |
| 30 | 9 | 18 | 1.81 | 89.7 |
| 40 | 10 | 22 | 1.59 | 82.4 |
| 50 | 10 | 27 | 1.51 | 66.1 |
| 60 | 10 | 30 | 1.29 | 49.5 |
| 70 | 10 | 32 | 1.06 | 37.5 |
| 10e (TNO623 + 1% 9-8Cu): | | | | |
| 0 | 8 | 14 | 1.05 | 91.6 |
| 10 | 8 | 15 | 1.11 | 93.1 |
| 20 | 8 | 16 | 1.08 | 94/4 |
| 30 | 9 | 18 | 1.00 | 95.0 |
| 40 | 9 | 22 | 1.02 | 90.0 |
| 50 | 10 | 27 | 0.97 | 76.7 |
| 60 | 10 | 31 | 0.96 | 61.0 |
| 70 | 10 | 33 | 0.74 | 40.3 |
| 10f (TNO623 + 1% 8-1Ni): | | | | |
| 0 | 10 | 16 | 1.32 | 92.2 |
| 10 | 10 | 16 | 1.33 | 93.5 |
| 20 | 10 | 17 | 1.29 | 95.6 |
| 30 | 10 | 20 | 1.31 | 95.6 |
| 40 | 10 | 25 | 1.21 | 88.3 |
| 50 | 10 | 29 | 1.08 | 73.3 |
| 60 | 11 | 31 | 1.02 | 55.4 |
| 70 | 11 | 32 | 0.89 | 43.3 |
| 10g (TNO623 + 1% 8-1Pd): | | | | |
| 0 | 14 | 21 | 0.72 | 88.3 |
| 10 | 14 | 22 | 0.71 | 89.3 |
| 20 | 14 | 23 | 0.69 | 91.2 |
| 30 | 14 | 27 | 0.65 | 90.3 |
| 40 | 15 | 32 | 0.63 | 80.5 |
| 50 | 15 | 35 | 0.64 | 64.6 |
| 60 | 15 | 36 | 0.60 | 47.4 |
| 70 | 15 | 35 | 0.64 | 36.6 |

[a]Measurements were done with hot-stage optical microscopy at the heating rate of 3° C./min.

EXAMPLE 11

All polymer dispersed liquid crystal films prepared with organometallic liquid crystal additives at concentration of larger than about 5% w/w with respect to the other liquid crystal were colored at off-on-state. The color of these types of polymer dispersed liquid crystal films, in contrast to that with dichroic or conventional dyes, are extremely stable and the range of their color absorption depends on the chemical structure and the nature of the metal in the complexation.

For example, the organometallic liquid crystal materials utilized to prepare samples Example 1d, Example 3d and Example 5e, are all dark green and dark yellow, respectively, and their polymer dispersed liquid crystal films exhibit a pale yellow reflection in the off-state, and yellowish appearance in the on-state. Polymer dispersed liquid crystal films with different colors could be prepared, where the color type and intensity will depend upon the type of the complexed metal, its absorption wavelength in the visible range and its concentration in the film formulation.

EXAMPLE 12

This data was generated by determining the nematic-isotropic transition temperatures ($T_{ni}$) of the LC and its "biphasic spread"($T_n$ and $T_i$) as a function of the concentration of organometallic liquid crystal.

The following table showing the chemical structures of a number of metallorganic compounds it was observed that metallorganic non-mesogens (MONM), such as

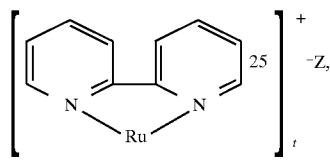

were not sufficiently soluble in the liquid crystal mixture used in the experiment. In these cases the phase separation and resin curing was not appropriate to provide a polymer dispersed liquid crystal film with acceptable properties.

Where the additive was a metalloorganic mesogen (organometallic liquid crystal), the electro-optical properties of the polymer dispersed liquid crystal films were improved for those showing solubility in the non-metallorganic liquid crystal mixture. In particular, the Pd compound of formula

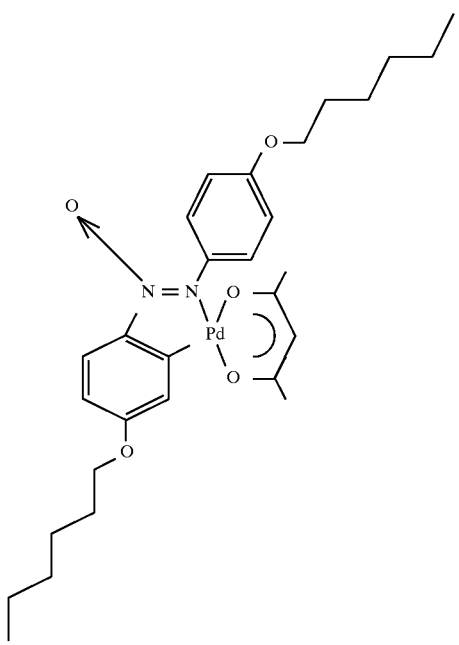

and m/nCu of formula (2A) series showed good solubilities and, hence, improved electro-optical responses.

The following examples using EP resin and the indicated liquid crystals, show the $T_n$ and $T_i$ of the liquid crystal TN0623 as a function of the concentrations of the above Pd compound of formula (15), the 7/8Cu compounds of formula (2A), the $C_{12}$ Ag compound of the formula

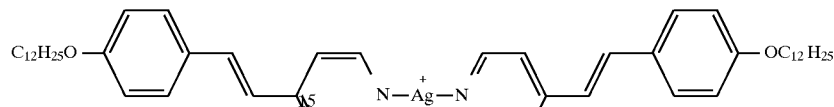

and the Ir compound of formula (15) having the formula:

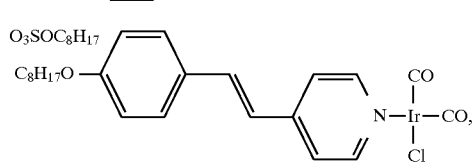

respectively:

| Solubility of Metalloorganic mesogens in Liquid Crystal | | | |
|---|---|---|---|
| Concentration Of Organometallic Liquid Crystal | "Biphasic Spread" of TNO623[a] | | |
| (% w/w) | $T_n$ (°C.) | $T_i$ (°C.) | $T_i$-$T_n$ |
| TNO623: | | | |
| 0.0 | 101.7 | 105.7 | 4.0 |
| Pd/TNO623 | | | |
| 1.0 | 102.3 | 104.8 | 2.5 |
| 2.0 | 102.2 | 104.8 | 2.6 |
| 3.0 | 101.5 | 103.8 | 2.3 |
| 4.0 | 101.2 | 104.0 | 2.8 |
| 5.0 | 100.4 | 103.3 | 2.9 |
| 10.0 | 99.6 | 102.4 | 2.8 |
| 7/8Cu/TNO623: | | | |
| 0.6 | 102.9 | 105.8 | 2.9 |
| 1.0 | 103.2 | 106.4 | 3.2 |
| 3.8 | 103.1 | 106.1 | 3.0 |
| 6.5 | 103.2 | 106.0 | 2.8 |
| Ag—C$_{12}$/TNO623: | | | |
| 1.0 | 100.9 | 103.7 | 2.8 |
| 2.0 | 99.1 | 102.6 | 3.5 |
| 3.0 | 98.4 | 102.3 | 3.9 |
| 4.0 | 98.3 | 102.3 | 4.0 |
| 5.0 | 97.1 | 100.8 | 3.7 |
| 10.0 | 94.5 | 97.6 | 3.1 |
| Ir—C$_8$/TNO623: | | | |
| 1.0 | 101.2 | 104.0 | 2.8 |
| 2.0 | 100.6 | 103.6 | 3.0 |
| 3.0 | 98.7 | 102.6 | 3.9 |
| 4.0 | 97.4 | 101.7 | 4.3 |
| 5.0 | 96.7 | 101.0 | 4.3 |
| 10.0 | 92.5 | 98.7 | 6.2 |

[a]Measurements were done with hot-stage optical microscopy at the heating rate of 3° C./min.

EXAMPLE 13

PDLC films were prepared by mixing EP resin and liquid crystal (TN 0623), as describes above (Example 1), with and without the organo-metal compounds: 7–8 NCu (formula 2A, where M is copper, n is 7, and m is 8), 9-8 NCu (Formula 2A, where n is and m is 8), Pd UC (Formula 19, where m is 12 and n is 6). The electro-optical properties were measured at various time points to study the effect of aging on switching voltages of PDLC. As shown below, the saturation voltage ($V_{90}$) of PDLC film with organo-metallic compound is more stable with time than the saturation voltage of PDLC without

| | | V 90 (Volts) | | |
|---|---|---|---|---|
| Age (days) | TNO623 | TNO623 + 1% 7-8NCu | TNO623 + 2% 7-8NCu | TNO623 + 6.5% 7-8NCu |
| 1 | 18 | 12 | 13 | 14 |
| 15 | 20 | 14 | 14 | 16 |
| 30 | | 14 | 15 | 15 |
| 90 | | | | 15 |
| 120 | | 18 | 16 | 16 |
| 150 | 32 | | 17 | |
| 240 | | 19 | | 18 |
| 250 | 40 | | | |
| 260 | | | 21 | |

| | | V 90 (Volts) | | |
|---|---|---|---|---|
| Age (days) | TNO623 | TNO623 + 1% 7-8NCu | TNO623 + 1% 9-8NCu | TNO623 +1% Pd UC |
| 1 | 18 | 12 | 14 | 14 |
| 15 | 20 | 14 | | 14 |
| 30 | | 14 | | |
| 60 | | | 16 | |
| 90 | | | 18 | |
| 120 | | 18 | | 19 |
| 150 | 32 | | 18 | 22 |
| 240 | | 19 | 22 | |
| 250 | 40 | | | 18 |
| 260 | | | 23 | |

EXAMPLE 14

Polymer dispersed liquid crystal films were prepared by mixing and curing a suitable UV-cureable resin NOA 65 and TN0623 liquid crystal, as described above, with and without the copper-complex metalloorganic mesogen CuLC 1, Formula 25 described above. The percentage of CuLC1 is 7.5% with respect to the liquid crystal. The thickness of the film is d=10μm. The intensity of UV radiation is 7 and 12 mW/cm$^2$. As shown in the table below, the metalloorgano compound reduces the switching voltages of PDLC films.

| Sample | Additive (CuLC1) (% w/w) | $V_{10}$ Volts | $V_{90}$ Volts |
|---|---|---|---|
| | I = 7 mW/cm$^2$ | | |
| a | 0 | 7 | 33 |
| | 7.5 | 7 | 14 |
| | I = 12 mW/cm$^2$ | | |
| | 0 | 13 | 68 |
| | 7.5 | 6 | 21 |

EXAMPLE 15

PDLC films were prepared by melting and curing EP resin and TN0623 liquid crystal, according to the procedure above described ( see Example 1) with a thickness of d=10 μm, with and without a palladium complex metalloorganic mesogen designated Pd Azo UC (Formula 15, where m=6) in a percentage of 5% with respect to liquid crystal weight.

The UV-near IR spectrum shown in FIG. 1 (Perkin Elmer UV/VIS Spectrometer Lambda 2) shows the different absorbtion in the 300–1100 range of wavelength (nm) for PDLC films with and without metalloorgano compounds. The difference of absorption is due to the color obtained with the organometallic liquid crystal Pd Azo UC.

EXAMPLE 16

Polymer dispersed liquid crystal films were prepared by mixing EP resin and liquid crystal TN0623, as described above, with and without organometallic liquid crystal (Pd UC, Formula 19, where m is 12 and n is 6). The percentage of Pd UC, respect to liquid crystal, is in the range 1–6%. The on state transmission ($T_{on}$) of the films was measured at different viewing angles. The results show an improvement in the angular transmission of PDLC films which contain the organometallic liquid crystal compound.

| angle | Standard $T_{on}$ | Pd UC 1% $T_{on}$ (%) | Pd UC 2% $T_{on}$ (%) | Pd UC 5% $T_{on}$ (%) | Pd UC 6% $T_{on}$ (%) |
|---|---|---|---|---|---|
| 0 | 90.5 | 94 | 94.6 | 94.2 | 95.4 |
| 15 | 91.5 | 93.7 | 94.8 | 94.8 | 95.2 |
| 30 | 86.3 | 92.1 | 92.5 | 92.6 | 93.8 |
| 45 | 68.8 | 77.9 | 79.5 | 82.9 | 82.4 |
| 60 | 46.9 | 58.6 | 60.6 | 68.7 | 67.8 |

EXAMPLE 17

Different mixtures of metalloorgano liquid crystal (CuLCl, Formula 25 described above and nematic liquid crystal (TN0623) were prepared. The solubility of CuLCl in TN0623 was determined by measuring the nematic-isotropic transition temperatures of this mixture using a DSC (scanning rate 3K/min). As shown in the table below, more than 20% of CuLCl is soluble in TN0623. The solution obtained is stable and does not crystallize, as indicated from after several days.

| % (w/w) CuLCl | $T_{NI}$ (°C.) | days |
|---|---|---|
| 0 | 104.3 | |
| 4.8 | 103.2 | 1 |
| 9.3 | 102.9 | 3 |
| 16.8 | 101.3 | 9 |
| 23.2 | 100.4 | 14 |

EXAMPLE 18

Figure 2:
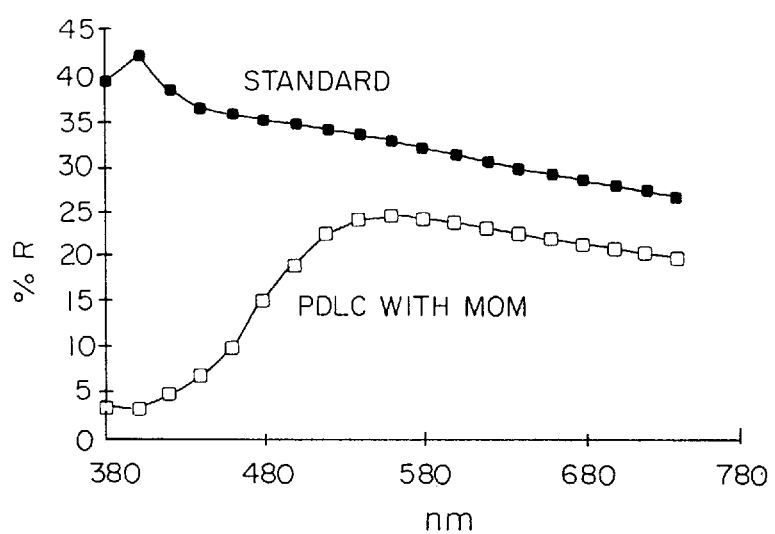

From the standpoint of color, the effect of an object on light can be described by its reflectance curve for opaque materials. These curves show the percentage of light, with respect to a standard, reflected by the material at each wavelength in the visible range. Colored materials reflect light of their own color and absorb light of other colors. FIG. 2 shows a comparison between the reflectance curves of a standard PDLC film and a film with a metalloorgano compound, in the opaque state.

The PDLC films were prepared by mixing EP resin and liquid crystal, as described above, with and without the compound Pd UC (formula 19, where m is 12 and n is 6) at 5% weight with respect to liquid crystal. The curves were obtained by using a Colorimeter (Macbeth M2020). The standard is a white object. The difference in the spectrum is due to the color of PDLC film containing metalloorgano liquid crystal (PDLC without MOM are white). As shown in FIG. 2 from the spectrum, the PDLC with MOM reflect light in the range of yellow.

EXAMPLE 19

Polymer dispersed liquid crystal films were prepared by mixing EP resin and TN0623 liquid crystal, according to the above procedure (Example 1), and adding a Pd complex metalloorganic liquid crystal (Pd Azo UC, formula 15, where m=6) in one sample (5% respect to TN0623, thickness d=15 $\mu$m) and a dicroic dye (DYE—Y2, (available from Hoffman-LaRoche) 0, 1% respect to TN0623, d=10 $\mu$m) in another sample. The results show that at the same switching voltage ($V_{90}$) and opacity ($T_{off}$) an increase in the forward angular transmittance and a reduction of switching times occur for the sample with metalloorgano liquid crystal, as shown below.

| sample | $V_{90}$ | $T_{off}$ (%) | Ton 0° (%) | Ton 60° (%) | Rise/Decay (ms) |
|---|---|---|---|---|---|
| EP + Pd azo UC | 32 | 0.41 | 87.9% | 52.8% | 50/45 |
| EP + dye | 31 | 0.12 | 81.2% | 38.1% | 63/63 |

EXAMPLE 20

The properties of a mixture of two different metalloorgano liquid crystals 12–8 NCu (formula 2A, where M is copper, n is 12 and m is 8), and 6–8 NCu (formula 2A, where M is copper, n is 6 and m is 8) were determined. Melting and nematic isotropic transition temperatures $T_M$ and $T_{NI}$ were measured by using a Differential Scanning Calorimetry (Perkin Elmer DSC7, scanning rate 5° C./min). The experiments indicate that the mixtures with about 25% of 12–8 NCu and 75% 6–8 NCu shows a eutectic point, i.e. minimum $T_M$=71.2° C. The results are shown below.

| 12-8NCu (w/w%) | $T_M$ (°C.) | $T_{NI}$ (°C.) |
|---|---|---|
| 0 | 81.6 | 116.0 |
| 25 | 71.2 | 117.7 |
| 50 | 80.8 | 122.0 |
| 75 | 90.8 | 124.4 |
| 100 | 103.5 | 129.0 |

EXAMPLE 21

A. The properties of a mixture of two different metalloorgano liquid crystals (copper (II)2-(4-octyloxyphenacyl)-5-octyloxypyridine (formula 21, where R and $R_1$ are —$OC_8H_{17}$, referred to as 12 Cu) and copper (II) 2-(4-hexyloxyphenacyl)-5-hexyloxypyridine (formula 21, where R and $R_1$ are -$OC_6H_{13}$, referred to as 13 Cu)) were determined. Melting and nematic-isotropic transition temperatures, $T_M$ and $T_{NI}$ were measured by using an optical microscope with a heating apparatus. The that the binary mixture with about 25% of 12 Cu and 75% 13 Cu shows an eutectic point with a minimum $T_M$=132° C. The results are shown

| 12Cu (w/w%) | $T_M$ (°C.) | $T_{NI}$ (°C.) |
|---|---|---|
| 0 | 152 | 190 |
| 25 | 146 | 186 |
| 50 | 140 | 185 |
| 75 | 132 | 179 |
| 100 | 137 | 172 |

B. The properties of a mixture of three different metalloorgano liquid crystals were determined. The mixture was obtained by mixing the eutectic composition of Example 21(A) above (75% 12 Cu and 25% 13 Cu, referred to as EM), and the metalloorgano compound copper (II) 2-phenacyl-5-octyloxypyridine (formula 21 where R is —$OC_8H_{17}$ and $R_1$ is H, referred to as 11 Cu). The latter compound shows only a melting temperature, without showing a nematic-isotropic transition temperature. Melting and nematic-isotropic transition temperatures, $T_M$ and $T_{NI}$, were measured by using an optical microscope with a heating apparatus. The experiments indicate that the tertiary mixture with about 50% of 11 Cu and 50% EM shows a eutectic point with a minimum $T_M$=107° C. The results are shown in the table below.

| 11Cu (w/w%) | $T_M$ (°C.) | $T_{NI}$ (°C.) |
|---|---|---|
| 0 | 132 | 179 |
| 25 | 130 | 181 |
| 50 | 107 | 153 |
| 75 | 125 | 154 |
| 100 | 143 | 143 |

I claim:

1. A polymer dispersed liquid crystal composite comprising a polymer continuous phase and a liquid crystal discontinuous phase wherein the liquid crystal discontinuous phase comprises a metalloorganic mesogen as a compatible component of that phase in sufficient amount to provide improved electrooptical properties for the composite.

2. The polymer dispersed liquid crystal composite of claim 1 wherein the composite is a stable colored polymer dispersed liquid crystal film.

3. The polymer dispersed liquid crystal composite of claim 1 wherein the composite possesses an improved contrast ratio caused by controlling (i) the solubility of liquid crystal in the polymer, (ii) the rate of formation of the discontinuous phase, (iii) controlling the rate of polymer solidification, and (iv) controlling the liquid crystal droplet morphology.

4. The polymer dispersed liquid crystal composite of claim 1 wherein the polymer is a thermoset resin.

5. The polymer dispersed liquid crystal composite of claim 1 wherein the polymer is thermoplastic.

6. The polymer dispersed liquid crystal composite of claim 1 wherein the polymer is a UV cured type.

7. The polymer dispersed liquid crystal composite of claim 2 wherein the polymer is a thermoset resin.

8. The polymer dispersed liquid crystal composite of claim 2 wherein the polymer is thermoplastic.

9. The polymer dispersed liquid crystal composite of claim 2 wherein the polymer is a UV cured type.

10. The polymer dispersed liquid crystal composite of claim 3 wherein the polymer is a thermoset resin.

11. The polymer dispersed liquid crystal composite of claim 3 wherein the polymer is thermoplastic.

12. The polymer dispersed liquid crystal composite of claim 3 wherein the polymer is a UV cured type.

13. The polymer dispersed liquid crystal composite of claim 1 wherein the discontinuous phase further comprises a non-metal containing liquid crystal.

14. The polymer dispersed liquid crystal composite of claim 2 wherein the discontinuous phase further comprises a non-metal containing liquid crystal.

15. The polymer dispersed liquid crystal composite of claim 3 wherein the discontinuous phase further comprises a non-metal containing liquid crystal.

16. The polymer dispersed liquid crystal composite of claim 4 wherein the discontinuous phase further comprises a non-metal containing liquid crystal.

17. The polymer dispersed liquid crystal composite of claim 5 wherein the discontinuous phase further comprises a non-metal containing liquid crystal.

18. The polymer dispersed liquid crystal composite of claim 6 wherein the discontinuous phase further comprises a non-metal containing liquid crystal.

19. The polymer dispersed liquid crystal composite of claim 7 wherein the discontinuous phase further comprises a non-metal containing liquid crystal.

20. The polymer dispersed liquid crystal composite of claim 8 wherein the discontinuous phase further comprises a non-metal containing liquid crystal.

21. The polymer dispersed liquid crystal composite of claim 9 wherein the discontinuous phase further comprises a non-metal containing liquid crystal.

22. The polymer dispersed liquid crystal composite of claim 10 wherein the discontinuous phase further comprises a non-metal containing liquid crystal.

23. The polymer dispersed liquid crystal composite of claim 11 wherein the discontinuous phase further comprises a non-metal containing liquid crystal.

24. The polymer dispersed liquid crystal composite of claim 12 wherein the discontinuous phase further comprises a non-metal containing liquid crystal.

25. The polymer dispersed liquid crystal composite of claim 13 wherein the metalloorganic mesogen is present in the discontinuous phase in an amount ranging from about 0.01 to about 99.99 weight percent of the weight of the discontinuous phase and the non-metal containing liquid crystal is present in the discontinuous phase in an amount ranging from about 99.99 to about 0.01 weight percent of the weight of discontinuous phase.

26. The polymer dispersed liquid crystal composite of claim 14 wherein the metalloorganic mesogen is present in the discontinuous phase in an amount ranging from about 0.01 to about 99.99 weight percent of the weight of the discontinuous phase and the non-metal containing liquid crystal is present in the discontinuous phase in an amount ranging from about 99.99 to about 0.01 weight percent of the weight of discontinuous phase.

27. The polymer dispersed liquid crystal composite of claim 15 wherein the metalloorganic mesogen is present in the discontinuous phase in an amount ranging from about 0.01 to about 99.99 weight percent of the weight of the discontinuous phase and the non-metal containing liquid crystal is present in the discontinuous phase in an amount ranging from about 99.99 to about 0.01 weight percent of the weight of discontinuous phase.

28. The polymer dispersed liquid crystal composite of claim 16 wherein the metalloorganic mesogen is present in the discontinuous phase in an amount ranging from about 0.01 to about 99.99 weight percent of the weight of the discontinuous phase and the non-metal containing liquid crystal is present in the discontinuous phase in an amount ranging from about 99.99 to about 0.01 weight percent of the weight of discontinuous phase.

29. The polymer dispersed liquid crystal composite of claim 17 wherein the metalloorganic mesogen is present in the discontinuous phase in an amount ranging from about 0.01 to about 99.99 weight percent of the weight of the discontinuous phase and the non-metal containing liquid crystal is present in the discontinuous phase in an amount ranging from about 99.99 to about 0.01 weight percent of the weight of discontinuous phase.

30. The polymer dispersed liquid crystal composite of claim 18 wherein the metalloorganic mesogen is present in the discontinuous phase in an amount ranging from about 0.01 to about 99.99 weight percent of the weight of the discontinuous phase and the non-metal containing liquid crystal is present in the discontinuous phase in an amount ranging from about 99.99 to about 0.01 weight percent of the weight of discontinuous phase.

31. The polymer dispersed liquid crystal composite of claim 19 wherein the metalloorganic mesogen is present in the discontinuous phase in an amount ranging from about 0.01 to about 99.99 weight percent of the weight of the discontinuous phase and the non-metal containing liquid crystal is present in the discontinuous phase in an amount ranging from about 99.99 to about 0.01 weight percent of the weight of discontinuous phase.

32. The polymer dispersed liquid crystal composite of claim 20 wherein the metalloorganic mesogen is present in the discontinuous phase in an amount ranging from about 0.01 to about 99.99 weight percent of the weight of the discontinuous phase and the non-metal containing liquid crystal is present in the discontinuous phase in an amount ranging from about 99.99 to about 0.01 weight percent of the weight of discontinuous phase.

33. The polymer dispersed liquid crystal composite of claim 21 wherein the metalloorganic mesogen is present in the discontinuous phase in an amount ranging from about 0.01 to about 99.99 weight percent of the weight of the discontinuous phase and the non-metal containing liquid crystal is present in the discontinuous phase in an amount ranging from about 99.99 to about 0.01 weight percent of the weight of discontinuous phase.

34. The polymer dispersed liquid crystal composite of claim 22 wherein the metalloorganic mesogen is present in the discontinuous phase in an amount ranging from about 0.01 to about 99.99 weight percent of the weight of the discontinuous phase and the non-metal containing liquid crystal is present in the discontinuous phase in an amount ranging from about 99.99 to about 0.01 weight percent of the weight of discontinuous phase.

35. The polymer dispersed liquid crystal composite of claim 23 wherein the metalloorganic mesogen is present in the discontinuous phase in an amount ranging from about 0.01 to about 99.99 weight percent of the weight of the discontinuous phase and the non-metal containing liquid crystal is present in the discontinuous phase in an amount ranging from about 99.99 to about 0.01 weight percent of the weight of discontinuous phase.

36. The polymer dispersed liquid crystal composite of claim 24 wherein the metalloorganic mesogen is present in the discontinuous phase in an amount ranging from about 0.01 to about 99.99 weight percent of the weight of the discontinuous phase and the non-metal containing liquid crystal is present in the discontinuous phase in an amount ranging from about 99.99 to about 0.01 weight percent of the weight of discontinuous phase.

37. The polymer dispersed liquid crystal composite of claim 1 wherein the metalloorganic mesogen is uniformly distributed in the discontinuous phase.

38. The polymer dispersed liquid crystal composite of claim 37 wherein the discontinuous phase further comprises a non-metal containing liquid crystal, wherein the discontinuous phase comprises a major amount of the non-metal containing liquid crystal and a minor amount of the metalloorganic mesogen in the forms of an eutectic mixture.

39. The polymer dispersed liquid crystal composite of claim 1 wherein a minimal but effective amount of the metalloorganic mesogen is present in the continuous phase.

40. The polymer dispersed liquid crystal composite of claim 1 wherein the metal of the metalloorganic mesogen is from Groups 43–19 of the Periodic Table of Elements, new notation.

41. The polymer dispersed liquid crystal composite of claim 40 wherein the metal is at least one of the metals selected from the group consisting of vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, the lanthanides, and uranium.

42. The polymer dispersed liquid crystal composite of claim 40 wherein the metalloorganic mesogen is a polycyclic containing structure having one or more aromatic groups and a metallic moiety that is covalently-, ionically-, or coordination complex-bonded therewith.

43. The polymer dispersed liquid crystal composite of claim 42 wherein at least one of the aromatic groups is an unsaturated heterocyclic structure.

44. The polymer dispersed liquid crystal composite of claim 42 wherein the aromatic structures are part of a fused ring system and are interbonded to another aromatic structure or to an alicyclic structure.

45. The polymer dispersed liquid crystal composite of claim 44 wherein the fused ring system is interbonded to another aromatic structure or to an alicyclic structure through at least one of a covalent bond, a polyfunctional organic group, and an inorganic polyfunctional group.

46. The polymer dispersed liquid crystal composite of claim 45 wherein the polyfunctional organic group is selected from the group consisting of alkylene, alkenylene, alkylidene, alkenylidene, alkylidyne, alkynylidene, alkynylene, carbonyloxy ester, carbonylimino, azomethine, and the inorgano polyfunctional group is selected from the group consisting of amino, azino, azo, azoxy, diazoamino, sulfide disulfide, polysulfide, ether (oxy), keto, and diketo.

47. The polymer dispersed liquid crystal composite of claim 44 wherein the metalloorganic mesogen contributes color to the discontinuous phase.

48. The polymer dispersed liquid crystal composite of claim 42 wherein the metalloorganic mesogen contains at least two aromatic groups covalently joined to each other, either directly or through polyvalent organic or inorganic connecting groups.

49. The polymer dispersed liquid crystal composite of claim 48 wherein the metalloorganic mesogen has the following formula:

$$R^1-R^2-R^3 \qquad (1)$$

where $R^1$ and $R^3$ are the same or different moieties, each of which has at least one covalently joined aromatic group, and $R^2$ contains a polyvalent metal bonded to $R^1$ and $R^3$ by covalent, ionic or weaker bonding forces.

50. The polymer dispersed liquid crystal composite of claim 49 wherein $R^2$ may contain a ring atom of a saturated structure or an unsaturated heterocyclic structure that constitutes part of the aromaticity of the composition.

51. The polymer dispersed liquid crystal composite of claim 50 wherein the polyvalent metal is one or more metals from Groups 43–49 of the Periodic Table of Elements, new notation.

52. The polymer dispersed liquid crystal composite of claim 51 wherein the metals are selected from the group consisting of vanadium, niobium, tantalum, chromium, molybdenum, tungsten, manganese, technetium, rhenium, iron, ruthenium, osmium, cobalt, rhodium, iridium, nickel, palladium, platinum, copper, silver gold, rare earth metals and uranium.

53. The polymer dispersed liquid crystal composite of claim 49 wherein compound (1) is an anionic or a cationic component of a salt having a counter ion with a structure that does not adversely affect the liquid crystal properties of said compound (1) or said counter ion combines with compound (1) to provide the liquid crystal properties.

54. The polymer dispersed liquid crystal composite of claim 50 wherein compound (1) is an anionic or a cationic component of a salt having a counter ion with a structure that does not adversely affect the liquid crystal properties of said compound (1) or said counter ion combines with compound (1) to provide the liquid crystal properties.

55. The polymer dispersed liquid crystal composite of claim 51 wherein compound (1) is an anionic or a cationic component of a salt having a counter ion with a structure that does not adversely affect the liquid crystal properties of said compound (1) or said counter ion combines with compound (1) to provide the liquid crystal properties.

56. The polymer dispersed liquid crystal composite of claim 52 wherein compound (1) is an anionic or a cationic component of a salt having a counter ion with a structure that does not adversely affect the liquid crystal properties of said compound (1) or said counter ion combines with compound (1) to provide the liquid crystal properties.

57. The polymer dispersed liquid crystal composite of claim 1 wherein the metalloorganic mesogen is at least one of the compounds of the formulae:

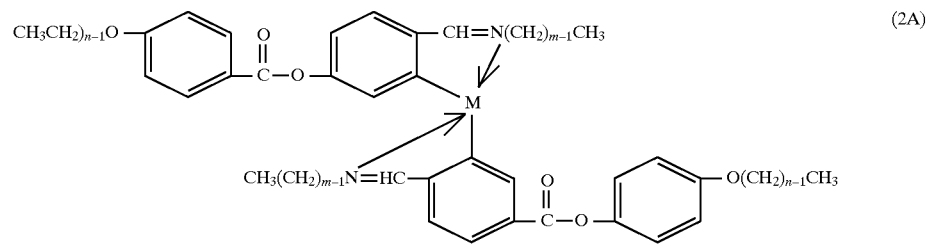

(2A)

-continued
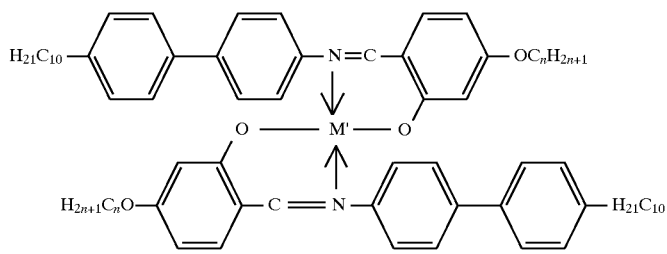
(2B)
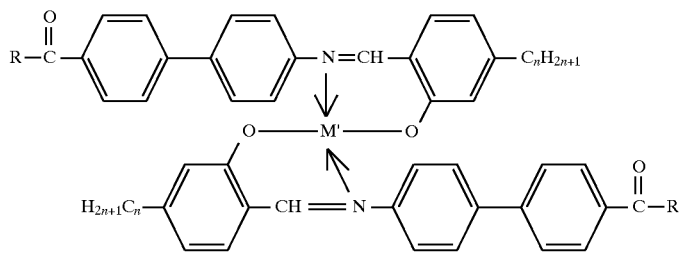
(2C)
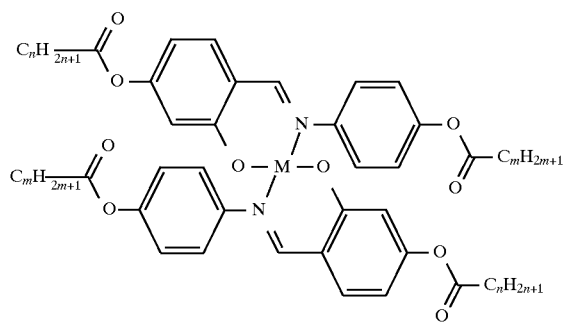
(2D)
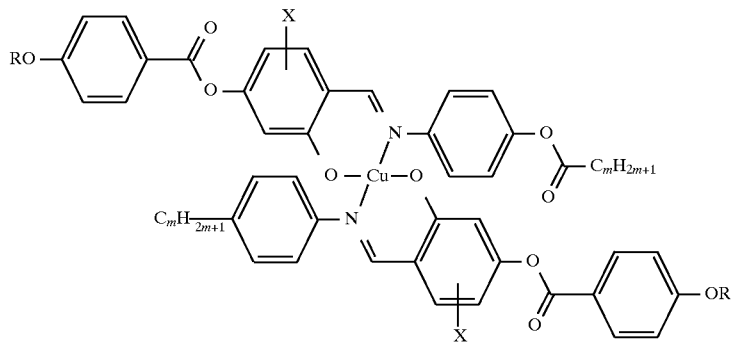
(2E)
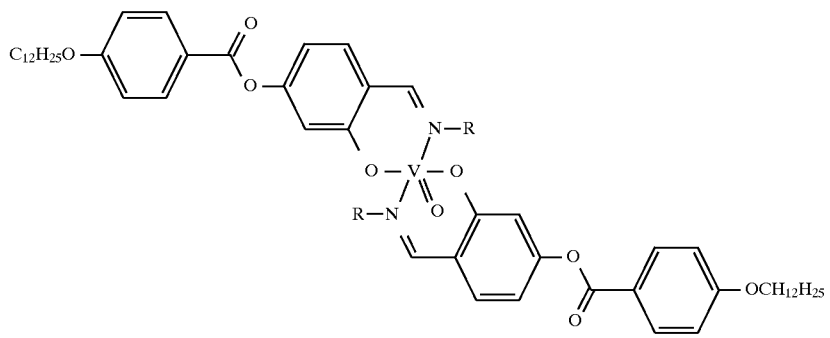
(2F)
and -continued

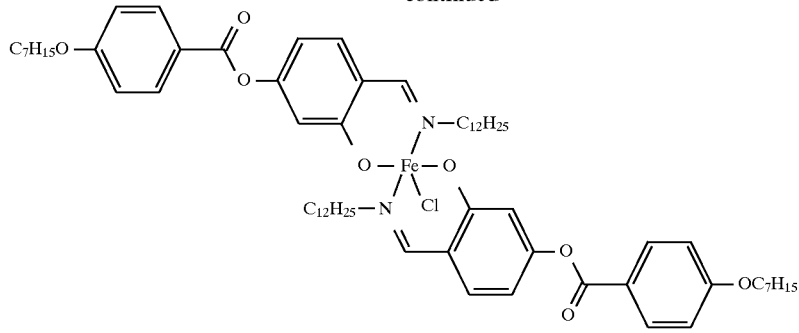

(2G)

in which M is copper, nickel, vanadyloxide and palladium and n and m are positive numbers of a value such that the compound is a liquid crystal, M' is oxyvanadium and platinum, R is aryl, alkyl and alkoxyaryl and X is alkyl.

58. The polymer dispersed liquid crystal composite of claim 43 wherein the metalloorganic mesogen is a compound of the formula:

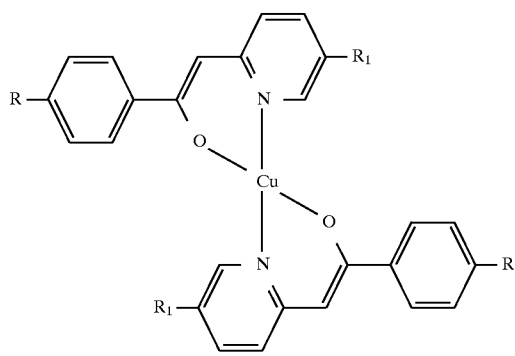

wherein R and $R_1$ may be the same or different, and where each of R and $R_1$ is selected from the group consisting of H, $-OC_6H_{13}$, and $-OC_8H_{17}$, or mixtures thereof.

59. The polymer dispersed liquid crystal composite of claim 42 wherein the metalloorganic mesogen is a compound of the formula:

60. The polymer dispersed liquid crystal composite of claim 42 wherein the metalloorganic mesogen is a compound of the formula:

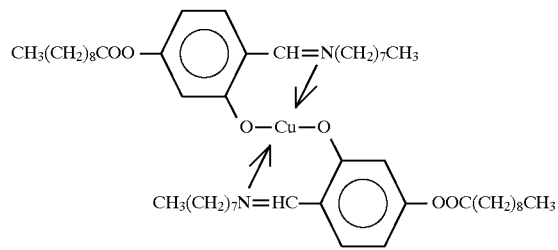

61. The polymer dispersed liquid crystal composite of claim 42 wherein the metalloorganic mesogen is a compound of the formula:

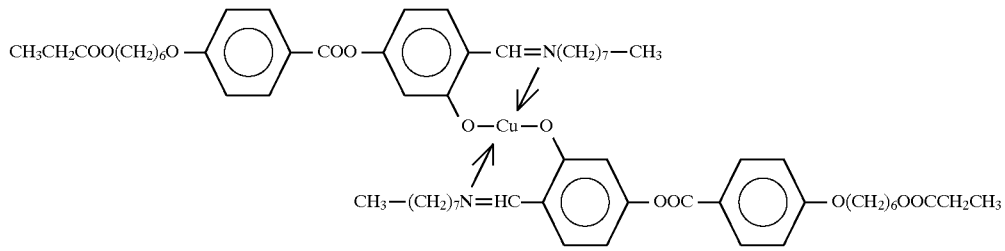

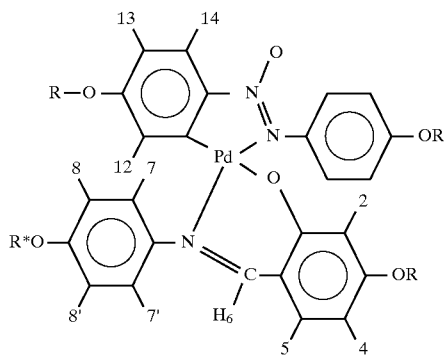

where R is $CH_3(CH_2)_m-$, where m=1–20, and where R* is $CH_3(CH_2)_n CH_3 CH (CH_2)_p-$, where n and p=1–10.

62. The polymer dispersed liquid crystal composite of claim 43 wherein the metalloorganic mesogen is a compound of the formula:

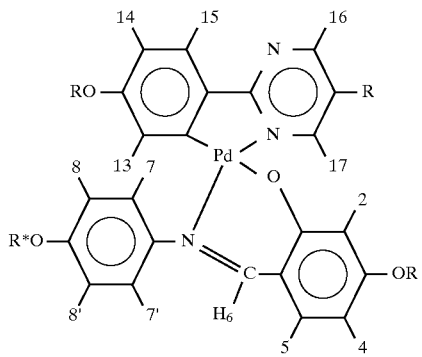

where R is $CH_3(CH_2)_m-$, where m=1–20, and where R* is $CH_3 (CH_2)_n CH_3 CH (CH_2)_p-$, where n and p=10.

63. The polymer dispersed liquid crystal composite of claim 42 wherein the metalloorganic mesogen is a compound of the formula:

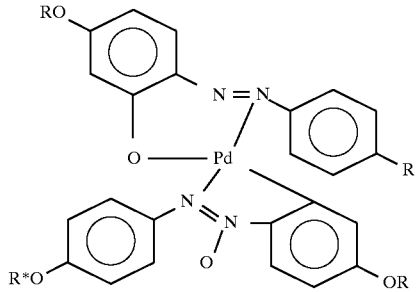

where R is $CH_3(CH_2)_m-$, where m=1–20, and where R* is $CH_3 (CH_2)_n CH_3 CH (CH_2)_p-$, where n and p=1–10.

64. The polymer dispersed liquid crystal composite of claim 42 wherein the metalloorganic mesogen is a compound of the formula:

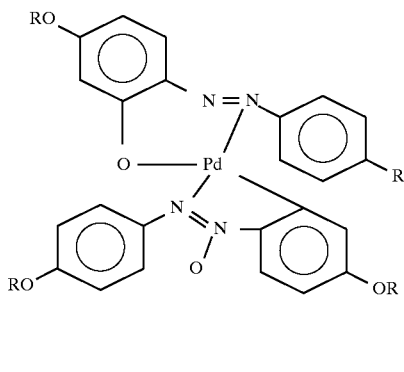

where R is $CH_3(CH_2)_m-$, where m=1–20.

65. The polymer dispersed liquid crystal composite of claim 43 wherein the metalloorganic mesogen is a compound of the formula

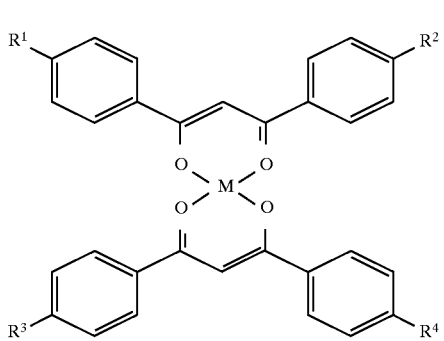

(10A)

where $R^1$—$R^4$ are the same or different and are alkyl ($C_{1-30}$), aryloxy or cyano, and M is selected from the group consisting of vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, the lanthanides, and uranium.

66. The polymer dispersed liquid crystal composite of claim 42, wherein the metalloorganic mesogen is at least one compound of the formulae

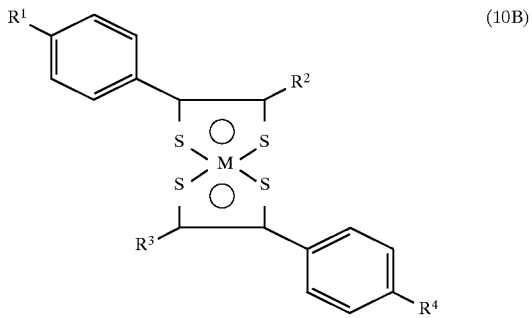

(10B)

-continued

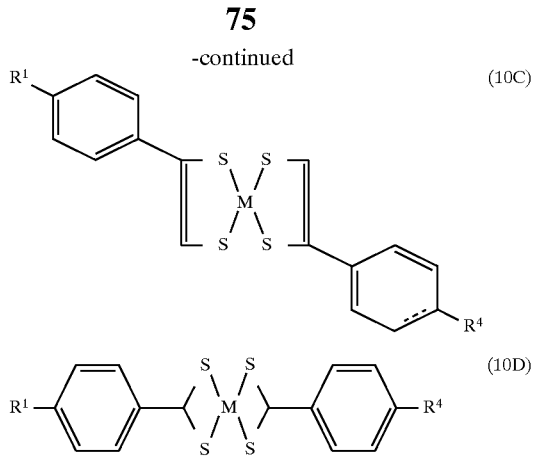
(10C)

(10D)

where $R^1$ and $R^4$ are the same or different and are alkyl ($C_{1-14}$), alkoxy ($C_{1-14}$) or aryl groups, $R^2$ and $R^3$ are hydrogen or the same or different alkyl ($C_{1-14}$) groups and M is selected from the group consisting of vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, the lanthanides, and uranium.

67. The polymer dispersed liquid crystal composite of claim 44, wherein the metalloorganic mesogen is at least one compound of the formulae

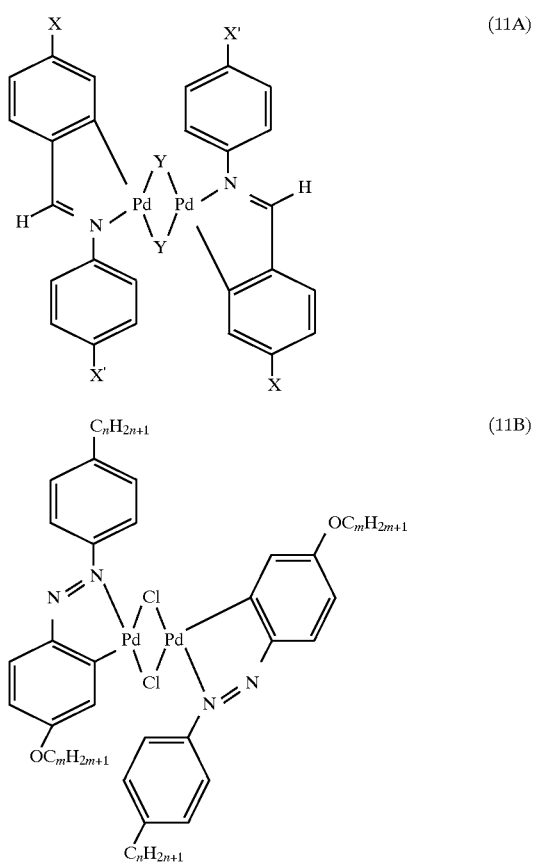
(11A)

(11B)

where Y is halogen, X is hydrogen, alkyl ($C_{1-14}$), alkoxy ($C_{1-14}$), halogen, cyano, and nitro, and X' is alkyl ($C_{1-14}$), or alkoxy ($C_{1-14}$), and n and m are 0 to 8.

68. The polymer dispersed liquid crystal composite according to claim 45 wherein the metalloorganic mesogen is a compound of the formula

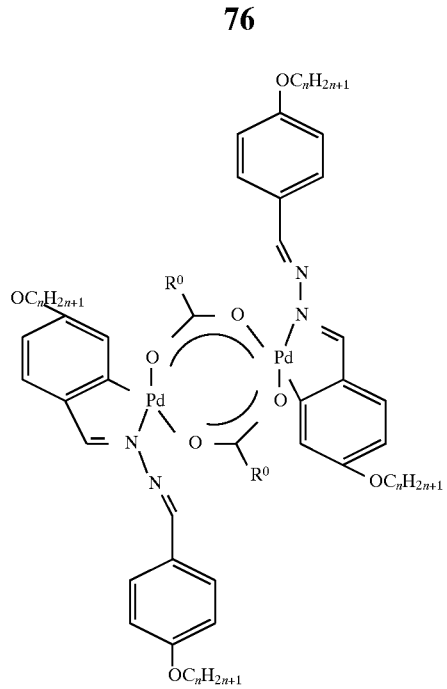

where $R^0$ is

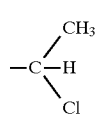

or $OC_mH_{2m+1}$, where m is 1 through 20.

69. The polymer dispersed liquid crystal composite according to claim 45 wherein the metalloorganic mesogen is at least one of the compounds of the formulae

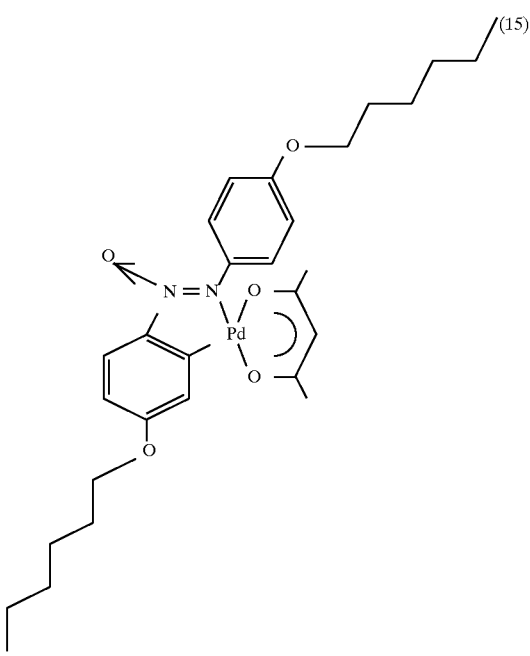
(15)

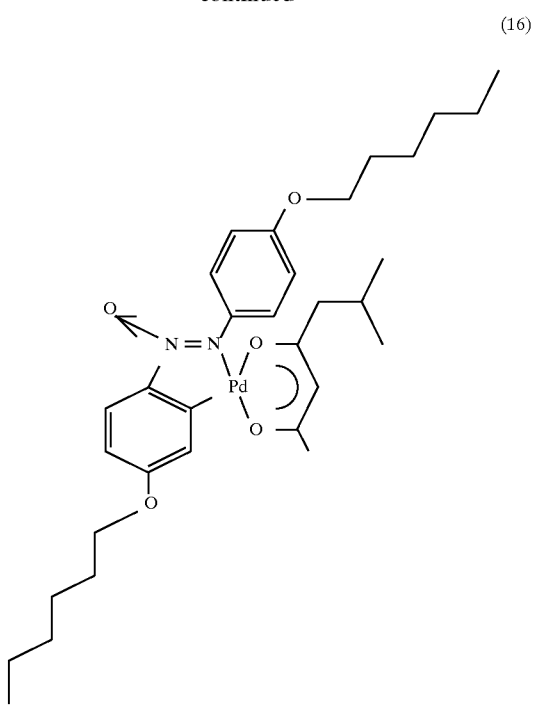
(16)

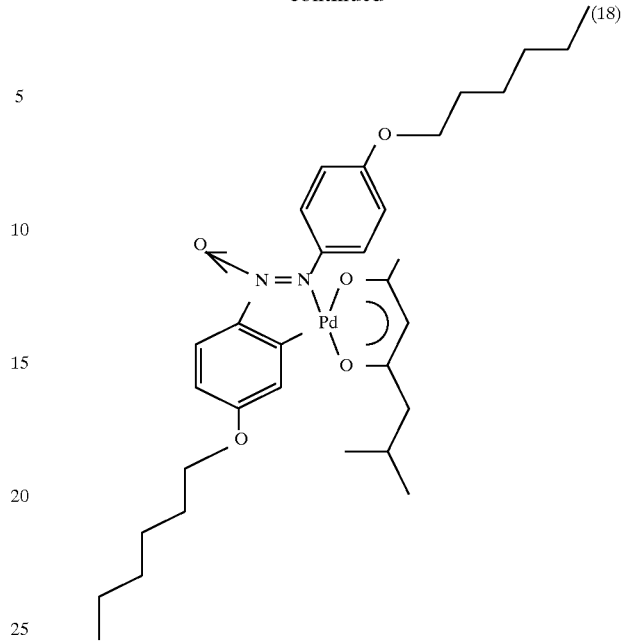
(18)

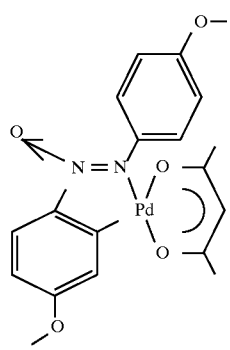
(17)

70. The polymer dispersed liquid crystal composite of claim 57 in the form of a film.

71. An electrooptical device comprising the film of claim 2.

72. An electrooptical device comprising the film of claim 70.

73. The polymer dispersed liquid crystal composite of claim 1 wherein the improvement in electrooptical properties is improved index matching of the liquid crystal in the discontinuous phase and the polymer in the continuous phase with a reduction the residual angular scattering.

74. The polymer dispersed liquid crystal composite of claim 1 having an operating temperature of the nematic-isotropic transition temperature of the composite that is modified by the presence of the metalloorganic mesogen in the discontinuous phase.

* * * * *

UNITED STATES PATENT AND TRADEMARK OFFICE
CERTIFICATE OF CORRECTION

PATENT NO. : 5,843,333
DATED : December 1, 1998
INVENTOR(S) : Hassan-Ali Hakemi

It is certified that error appears in the above-identified patent and that said Letters Patent is hereby corrected as shown below:

Column 58, line 24, replace "94/4" with --94.4--.
Column 1, line 1, add --a-- between "is" and "371"; line 56, replace "casee" with --case--.
Column 60, lines 6-15, reposition formula of the $C_{12}Ag$ compound so that it is not superimposed over text of line 16.

Column 61, line 7, add --MOM.-- after "without"; line 52, "I = 7mW/cm$^2$" repositioned to be under "Sample" column of the table; line 55, "I = 12mW/cm$^2$" repositioned to be under "Sample" column of the table.

Signed and Sealed this

Sixteenth Day of May, 2000

Attest:

Q. TODD DICKINSON

*Attesting Officer*          *Director of Patents and Trademarks*